United States Patent [19]
Takahashi

[11] Patent Number: 5,793,339
[45] Date of Patent: Aug. 11, 1998

[54] VISUAL DISPLAY APPARATUS

[75] Inventor: Koichi Takahashi, Hachioji, Japan

[73] Assignee: Olympus Optical Co., Ltd., Tokyo, Japan

[21] Appl. No.: 337,825

[22] Filed: Nov. 8, 1994

[30] Foreign Application Priority Data

Nov. 11, 1993 [JP] Japan ................................ 5-282495
Feb. 23, 1994 [JP] Japan ................................ 6-025395

[51] Int. Cl.$^6$ .................................................... G09G 5/00
[52] U.S. Cl. ........................................ 345/7; 359/630
[58] Field of Search .................. 345/7, 8, 9; 340/980; 348/53, 115; 359/630, 631, 13, 728; 434/44

[56] References Cited

U.S. PATENT DOCUMENTS

| | | |
|---|---|---|
| 4,669,810 | 6/1987 | Wood . |
| 4,826,287 | 5/1989 | Cook et al. . |
| 5,153,569 | 10/1992 | Kawamura et al. ............ 345/8 |
| 5,276,471 | 1/1994 | Yamauchi et al. ............ 345/8 |
| 5,513,041 | 4/1996 | Togino . |
| 5,539,578 | 7/1996 | Togino et al. ............ 345/8 |

FOREIGN PATENT DOCUMENTS

| | | |
|---|---|---|
| 2-138975 | 11/1990 | Japan . |
| 5-21208 | 2/1993 | Japan . |
| 5-134208 | 5/1993 | Japan . |
| 5-241122 | 9/1993 | Japan . |

*Primary Examiner*—Regina Liang
*Attorney, Agent, or Firm*—Cushman Darby & Cushman IP Group of Pillsbury Madison & Sutro LLP

[57] ABSTRACT

A compact and lightweight visual display apparatus which enables observation of an image that is clear throughout the image field at a field angle of 120° when the user observes with both eyes, and which has a large exit pupil diameter. The visual display apparatus has a two-dimensional image display device (6) for displaying an image for observation, a relay optical system (5) for projecting a real image of the two-dimensional image display device (6) in the air, an ocular magnifier (3) for projecting the real image in the air as an enlarged image and for reflectively bending an optical axis, and a decentered correcting optical system (4) disposed between the relay optical system (5) and the ocular magnifier (3) and having surfaces (41 and 42) decentered with respect to each other. The decentered correcting optical system (4) is arranged such that the vertex (43) of the surface (41) which is closer to the ocular magnifier (3) lies inward of the visual axis (7) after it has been reflected by the ocular magnifier (3), and the ocular magnifier-side surface (41) is an aspherical surface formed from such a curved surface that the refractive power reaches a maximum in the vicinity of the surface vertex (43) and becomes weaker as the distance from the vertex (43) increases toward the outer side. The apparatus may be arranged to correct the diopter by making at least one optical element movable.

18 Claims, 36 Drawing Sheets

FIG. 7(a)
Right-eyed vision
FIG. 7(b)
Left-eyed vision
FIG. 7(c)
Binocular vision
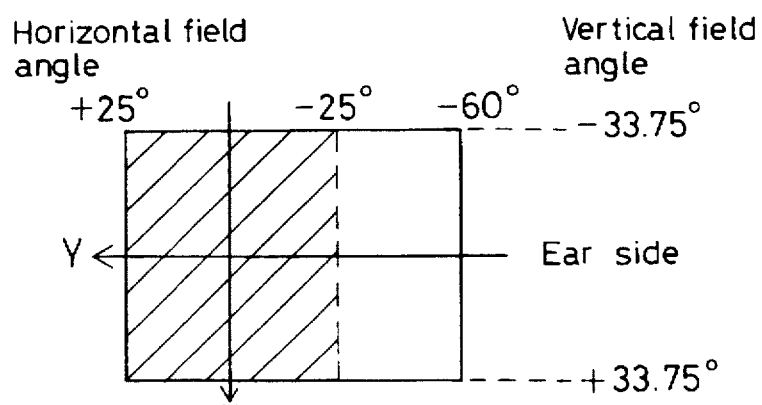
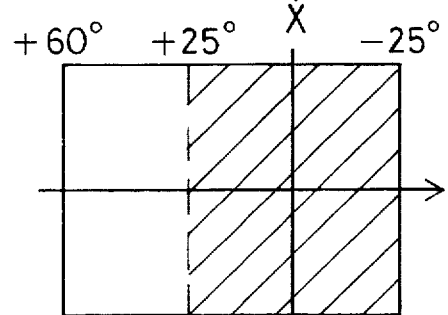
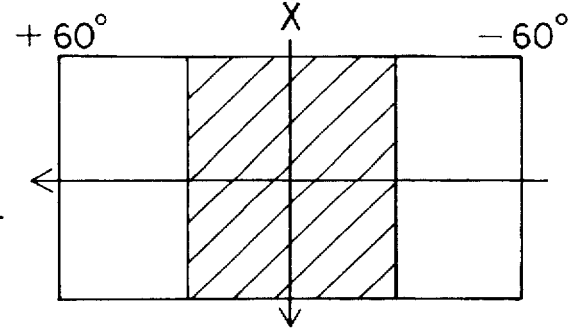

VISUAL DISPLAY APPARATUS

BACKGROUND OF THE INVENTION

The present invention relates to a visual display apparatus and, more particularly, to a head- or face-mounted visual display apparatus that can be retained on the observer's head or face.

Hitherto, display units, e.g., CRT, LCD, etc., for displaying television or computer images have been demanded to have a wider display screen and a higher resolution in order to satisfy observers' desire to enjoy watching even more powerful images in an even more absorbed state. In recent years, various large-sized display units have been developed to provide the effect of virtual reality. These display units are also required to have a wide field angle and high resolution.

Even with a small-sized display unit, if an image of the display screen can be observed as an enlarged image, the field angle of observation becomes large, so that the observation image becomes powerful and enables the observer to get absorbed in watching it, and the virtual reality effect can be obtained. Accordingly, a variety of compact head-mounted visual display apparatuses have been developed.

As a related art, a head-mounted visual display apparatus that uses a decentered concave ocular magnifier and a decentered relay optical system is disclosed in Japanese Patent Application Laid-Open (KOKAI) No. 05-134208 (1993) by the present applicant. FIG. 39 is a sectional view of one embodiment of the disclosed head-mounted visual display apparatus. In the figure, reference symbols denote elements or portions as follows: P is the center of rolling of an observer's eyeball 33; C is the observer's visual axis when he or she looks straight forward; $Q_1$ is the position of the observer's pupil; $S_8$ is a spheroid having O as the center of revolution; 16 is a reflecting surface of the spheroid; 17 is an optical axis of a relay optical system; $Q_2$ is the focal point of the spheroid; 15 is the relay optical system; and 14 is a two-dimensional image display device.

FIG. 40 is a sectional view of one embodiment a prior application (Japanese Patent Application No. 5-21208 (1993); U.S. patent application Ser. No. 08/193,858) by the present applicant, which uses a decentered ocular magnifier, a decentered relay optical system, and a decentered correcting optical system. In FIG. 40, reference numeral 22 denotes the position of an observer's pupil, 23 an ocular concave mirror, 24 the observer's visual axis, 28 a decentered correcting optical system, 34 a two-dimensional image display device, and 35 a relay optical system.

In a head-mounted visual display apparatus, it is necessary to ensure a wide field angle in order to enhance the feeling of being at the actual spot which is given to the observer when viewing the displayed image. In particular, the stereoscopic effect of the image presented is determined by the angle at which the image is presented (see *The Journal of the Institute of Television Engineers of Japan* Vol. 45, No. 12, pp. 1589–1596 (1991)).

It is known that it is necessary in order to present an absorbing, stereoscopic and powerful image to the observer to ensure a field angle of 40° (±20°) or more in the horizontal direction, and that the stereoscopic and other effects are saturated in the vicinity of 120° (±60°). In other words, it is preferable to select a field angle for observation which is not smaller than 40° and which is as close to 120° as possible.

Further, to give the observer the feeling of being at the actual spot when viewing the displayed image and also the virtual reality effect, it is essential for a visual display apparatus to have a wide field angle and high resolution and to provide as large a pupil diameter as possible in a case where the exit pupil of the optical system lies at the observer's pupil position so that the visual field is not eclipsed by the rolling movement of the eye when the user tries to observe a peripheral region of the image field.

However, it has heretofore been impossible with the conventional technique to realize a high-resolution visual display apparatus that provides a wide field angle of 120° when the user observes with both eyes, as described above.

Further, when a decentered magnifier is used as an ocular optical system in a head-mounted visual display apparatus as described above, the distance from the observer's pupil position to the ocular optical system is preferably not shorter than 30 mm, which is a spacing at which no mechanical interference occurs around the observer's eye and at which the observer feels no sensation of pressure when wearing this visual display apparatus. On the other hand, to realize a wide field angle and high resolution with a compact structure, the distance from the observer's pupil position to the ocular optical system should preferably be shortened as much as possible. The angle between the visual axis immediately behind the observer's pupil and the visual axis after it has been reflected by the ocular optical system must be 40° or more in order to avoid interference between the visual display apparatus and the observers' face or head, but on the other hand, aberration produced by the optical system reduces as the above-described angle decreases.

In the case of a visual display apparatus that uses an ocular optical system having the above-described conditions, it is expected to some extent that spectacles which the observer is wearing will interfere with the optical system or block the optical path. Therefore, there may be cases where it is difficult for the user to observe an electronic image of a two-dimensional image display device with his/her spectacles on. Accordingly, it is important to correct the diopter of the visual display apparatus in conformity to the observer's visual acuity. However, no diopter correction method has heretofore been realized for a visual display apparatus that provides a wide field angle and high resolution and that has a relatively complicated optical system arrangement, which is composed of an ocular optical system, a decentered correcting optical system, a relay optical system, and a two-dimensional image display device, as shown above in connection with the description of the related art.

SUMMARY OF THE INVENTION

The present invention has been made to solve the above-described problems of the background art, and it is a first object of the present invention to provide a compact and lightweight visual display apparatus which enables observation of an image that is clear throughout the image field at a field angle of 120° when the user observes with both eyes, and which has a large exit pupil diameter.

It is a second object of the present invention to provide a visual display apparatus which enables diopter correction to be realized simply by moving at least one of optical elements constituting an optical system of the apparatus, that is, an ocular optical system, a decentered correcting optical system, a relay optical system, and a two-dimensional image display device.

To attain the above-described objects, the present invention provides a visual display apparatus having a two-dimensional image display device for displaying an image for observation, a relay optical system for projecting a real image of the two-dimensional image display device in the air, an ocular magnifier for projecting the real image in the air as an enlarged image and for reflectively bending an optical axis, and a decentered correcting optical system disposed between the relay optical system and the ocular magnifier and having surfaces decentered with respect to each other. The decentered correcting optical system is arranged such that the vertex of a surface thereof which is closer to the ocular magnifier lies inward of a visual axis after it has been reflected by the ocular magnifier, and the ocular magnifier-side surface is an aspherical surface which is formed from such a curved surface that the refractive power reaches a maximum in the vicinity of the surface vertex and becomes weaker as the distance from the surface vertex increases toward the outer side.

In this case, it is preferable to satisfy the following condition:

$$1.3 < |R_{ym}/E_{xp}| < 2.6 \quad (1)$$

where $R_{ym}$ is the radius of curvature in a horizontal cross-section of the ocular magnifier containing the observer's visual axis when he or she looks straight forward, and $E_{xp}$ is the distance from the exit pupil position of the visual display apparatus to the center of the ocular magnifier in the direction of the observer's visual axis when he or she looks straight forward.

Further, it is preferable to satisfy the following condition:

$$-10° < \theta_1 < 30° \quad (2)$$

where $\theta_1$ is the angle of inclination of the ocular magnifier-side surface of the decentered correcting optical system with respect to the visual axis after it has been reflected by the ocular magnifier.

Further, it is preferable to arrange the decentered correcting optical system such that it is relatively thick in wall thickness in the vicinity of the vertex of the ocular magnifier-side surface and relatively thin at the outer side thereof.

Further, it is preferable that all lenses constituting the relay optical system should be coaxial with respect to each other.

The two-dimensional image display device may be tilted with respect to the center axis of the relay optical system.

Further, it is preferable to satisfy the following condition:

$$0.4 < R_{y1}/R_{y2} < 1.2 \quad (3)$$

where $R_{y1}$ is the radius of curvature in a YZ-plane of the ocular magnifier-side surface of the decentered correcting optical system, and $R_{y2}$ is the radius of curvature in the YZ-plane of the relay optical system-side surface of the decentered correcting optical system.

Further, either the ocular magnifier or the decentered correcting optical system may have an anamorphic surface.

Further, either the ocular magnifier or the decentered correcting optical system may have an aspherical surface.

In addition, the present invention provides a visual display apparatus having a two-dimensional image display device for displaying an image for observation, a relay optical system for projecting a real image of the two-dimensional image display device in the air, an ocular magnifier for projecting the real image in the air as an enlarged image and for reflectively bending an optical axis, and a decentered correcting optical system disposed between the relay optical system and the ocular magnifier and having surfaces decentered with respect to each other. At least one of the following optical elements, that is, the screen of the two-dimensional image display device, an optical surface of the relay optical system, an optical surface of the decentered correcting optical system, and the ocular magnifier, is movably provided so that the diopter can be corrected.

In this case, the at least one movable optical element may be any one or more of the optical elements: the screen of the two-dimensional image display device, an optical surface of the relay optical system, an optical surface of the decentered correcting optical system, and the ocular magnifier.

The visual display apparatus may be arranged such that even if the at least one movable optical element is moved, there is no change in the distance from the observer's pupil to the two-dimensional image display device.

The at least one movable optical element may move with an eccentricity from the optical axis.

It should be noted that the present invention includes an arrangement in which any of the above-described visual display apparatuses is accommodated in the body of an image display apparatus and has a support member whereby the image display apparatus body can be fitted on the observer's face.

In this case, the image display apparatus body may be further provided with a device for transmitting sound to the observer. The image display apparatus body may further have a reproducing device for transmitting image and sound signals to the two-dimensional image display device and the sound transmitting device, respectively.

The reason for adopting the above-described arrangements and the functions thereof will be explained below.

The general arrangement of the apparatus according to the present invention will be explained with reference to FIG. 1. FIG. 1 is an illustration of the visual display apparatus of the present invention fitted for the observer's right eye as viewed from above the observer. The optical arrangement is illustrated by backward tracing in which light rays are traced from the observer's pupil 1 toward the two-dimensional image display device 6 for the convenience of description. In FIG. 1, reference numeral 1 denotes an observer's pupil, 8 an observer's eyeball, 2 the observer's visual axis when he or she looks straight forward, 12 the observer's nose, and 13 an observer's ear. The visual display apparatus of the present invention is composed of a two-dimensional image display device 6 for displaying an image for observation, a relay optical system 5 for projecting a real image of the two-dimensional image display device 6 in the air, an ocular magnifier 3 for projecting the real image in the air as an enlarged image and for bending an optical axis, and a decentered correcting optical system 4 disposed between the relay optical system 5 and the ocular magnifier 3 and having surfaces decentered with respect to each other.

The vertex 43 of the ocular magnifier-side surface (first surface) 41 of the decentered correcting optical system 4 lies inward of (closer to the nose than) the visual axis 7 after it has been reflected by the ocular magnifier 3, and the first surface 41 is an aspherical surface which has such a curved surface configuration that the power is strongest in the vicinity of the vertex 43 and becomes weaker as the distance from the vertex 43 increases toward the outer side (the ear side).

The reason for adopting such an arrangement and the function thereof will be explained below. First, how the decentered correcting optical system 4 contributes to the formation of a pupil image will be explained. In the following description of the present invention, a coordinate system is defined as follows: The horizontal direction of the observer is taken as Y-axis, where the leftward direction is defined as positive direction; the direction of the observer's visual axis 2 is taken as Z-axis, where the direction toward the ocular magnifier 3 from the observer's eyeball 8 is defined as positive direction; and the vertical direction of the observer is taken as X-axis, where the downward direction is defined as positive direction. FIG. 2 illustrates a pupil ray trace in the YZ-plane of the apparatus shown in FIG. 1. In the figure, reference numeral 1 denotes a pupil position, 3 an ocular magnifier, 4 a decentered correcting optical system, 5 a relay optical system, 45 a position where a pupil image is formed, 51 inner pupil rays, and 52 outer pupil rays.

Formation of a pupil image by the inner rays (i.e., rays closer to the nose) 51 in the YZ-plane will be explained below. FIG.3(a) illustrates a trace of the inner pupil rays 51 in the YZ-plane when the rays 51 pass via only the ocular magnifier 3. FIG. 3(b) illustrates a trace of the inner pupil rays 51 in the YZ-plane when the rays 51 pass via both the ocular magnifier 3 and the decentered correcting optical system 4. FIGS. 4(a) and 4(b) similarly illustrate pupil ray traces in the XZ-plane. However, it should be noted that the reflecting surface in FIGS. 4(a) and 4(b) is not coincident with the sectional reflecting surface because the rays are reflected in an off-axis manner, and the ocular magnifier 3 and the decentered correcting optical system 4 are each decentered. Further, since each decentered optical element and the optical axis are projected on the XZ-plane, the pupil conjugate position and the optical path length are different from those of the actual system.

As will be clear from FIG. 3(a), since the inner rays 51 emanating from the pupil 1 are immediately reflected by the ocular magnifier 3, the reflected pupil rays 51 form an image at a relatively distant position 46 (46') [see FIGS. 3(a) and 4(a)]. Therefore, in order to form a pupil image at the pupil conjugate position 45, which is in the relay optical system 5 at a side thereof which is closer to the ocular magnifier 3, the decentered correcting optical system 4 must have a positive power in both the YZ- and XZ-planes [see FIGS. 3(b) and 4(b)].

Next, the outer pupil rays (i.e., rays closer to the ear) 52 in the YZ-plane will be explained with reference to FIGS. 5(a) and 5(b), which illustrate a pupil ray trace in the YZ-plane in the same way as in FIGS. 3(a) and 3(b) for the inner pupil rays 51, and with reference to FIGS. 6(a) and 6(b), which illustrate a pupil ray trace in the XZ-plane in the same way as in FIGS. 4(a) and 4(b) for the inner pupil rays 51.

The outer rays 52 emanating from the pupil 1 are reflected by the ocular magnifier 3 and form an image at a relatively near position 47 (47') [see FIGS. 5(a) and 6(a)] because the distance from the pupil 1 to the point on the ocular magnifier 3 where the rays 52 are reflected is relatively long. That is, in order to form a pupil image at the pupil conjugate position 45 in the relay optical system 5 at a side thereof which is closer to the ocular magnifier 3, the decentered correcting optical system 4 must have either an exceedingly weak positive power or a negative power in both the YZ- and XZ-planes [see FIGS. 5(b) and 6(b)].

To satisfy these conditions, it is essential to dispose the vertex 43 of the first surface 41 in the vicinity of the visual axis 7 in the YZ-plane. If the vertex 43 of the first surface 41 of the decentered correcting optical system 4 lies closer to the ear, it is difficult to allow the decentered correcting optical system 4 to have a weak positive power or a negative power in the vicinity of the outer most portion thereof while maintaining a wedge shape, which is an important condition imposed on the decentered correcting optical system 4 (described later). The arrangement in which the vertex 43 of the first surface 41 lies closer to the nose than the visual axis 7 makes it easy to increase the power of the inner side of the decentered correcting optical system 4. Further, in order to form the decentered correcting optical system 4 so that the wall thickness thereof decreases as the distance from the vertex 43 increases toward the outer side and the outermost portion has a weak positive power or a negative power, it is essential to arrange the decentered correcting optical system 4 so that the first surface 41 is an aspherical surface formed from such a curved surface that the curvature is the strongest at the center and becomes weaker as the distance from the center increases toward the periphery thereof.

In the present invention, an image surface formed by the ocular magnifier 3, which is disposed in a decentered position, has relatively large inclination and curvature. The inner image is formed at a position closer to the ocular magnifier 3, while the outer image is formed at a position closer to the relay optical system 5. Therefore, an effective way of correcting the inclination of the image surface is to form the decentered correcting optical system 4 such that the inner side thereof is relatively thick in terms of wall thickness, while the outer side thereof is relatively thin. With such a wedge-shaped lens, the optical path length can be made asymmetrical according to the field angle. Thus, the image 10 formed by the ocular magnifier 3 can be effectively placed to lie in a direction perpendicular to the center axis 9 of the relay optical system 5. However, since the field angle is wide, the corrected image surface 11 cannot completely be made perpendicular to the center axis 9. Therefore, in order to correct the inclination of the image surface 11, it is even more preferable to tilt the two-dimensional image display device 6 with respect to the center axis 9 of the relay optical system 5.

Further, it is preferable that the second surface 42 of the decentered correcting optical system 4 should have a concave surface directed toward the relay optical system 5. If the second surface 42 is formed from a curved surface directed in the same direction as the curved first image surface, the optical path length becomes relatively long in the vicinity of the optical axis and relatively short at the peripheries. Accordingly, this arrangement is also effective in correcting the curvature of field.

The relationship between the ocular magnifier 3 and the exit pupil position 1 is concerned with the pupil image formation and influences the overall size of the apparatus. Accordingly, it is preferable to satisfy the following condition:

$$1.3 < |R_{ym}/E_{xp}| < 2.6 \tag{1}$$

where $R_{ym}$ is the radius of curvature in the YZ-plane of the ocular magnifier 3, and $E_{xp}$ is the distance from the position of the exit pupil 1 to the center of the ocular magnifier 3 in the direction of the Z-axis.

If $|R_{ym}/E_{xp}|$ is not larger than the lower limit of the condition (1), i.e., 1.3, the ray height at the decentered correcting optical system 4 reduces, resulting in a reduction in the aberration correcting effect by the optical system 4. If $|R_{ym}/E_{xp}|$ is not smaller than the upper limit of the condition (1), i.e., 2.6, the position 45 conjugate to the pupil 1 shifts from the position in the relay optical system 5 that is closer to the two-dimensional image display device 6 to a position which is closer to the ocular magnifier 3, resulting in an increase in the size of the relay optical system 5.

Further, it is preferable to satisfy the following condition:

$$-10° < \theta_1 < 30° \tag{2}$$

where $\theta_1$ is the angle of inclination in the YZ-plane of the first surface 41 of the decentered correcting optical system 4 with respect to the optical axis 7 (the counterclockwise direction is defined as positive direction).

The condition (2) must be satisfied in order to change the inclination of the center axis of the first surface 41 of the decentered correcting optical system 4 so that the center axis of the first surface 41 lies in the same direction as the visual axis 7 after it has been reflected by the ocular magnifier 3. If $\theta_1$ is not larger than the lower limit of the condition (2), i.e., if the vertex 43 of the first surface 41 lies 10° or more outward of the visual axis 7 after it has been reflected by the ocular magnifier 3, the curvature center of the first surface 41 is disposed at the outer side, resulting in an increase in the wall thickness of the outer side of the decentered correcting optical system 4. Accordingly, it becomes impossible to satisfactorily correct the inclination and curvature of the image surface at the outer side of the image field. If $\theta_1$ is not smaller than the upper limit of the condition (2), i.e., 30°, the decentered correcting optical system 4 undesirably projects toward the nose, resulting in an increase in the size, and giving rise to the problem that the optical system may interfere with the observer's face.

Further, it is preferable that the power ratio of the surfaces of the decentered correcting optical system 4 should be set within the following range as a condition to be satisfied in order to correct aberrations in the whole optical system:

$$0.4 < R_{y1}/R_{y2} < 1.2 \qquad (3)$$

where $R_{y1}$ is the radius of curvature in the YZ-plane of the ocular magnifier-side surface (first surface) 41 of the decentered correcting optical system 4, and $R_{y2}$ is the radius of curvature in the YZ-plane of the relay optical system-side surface (second surface) 42 of the decentered correcting optical system 4.

The condition (3) expresses the power in the YZ-plane of the decentered correcting optical system 4 and is an important condition for correcting the inclination and curvature of the image surface formed by the ocular magnifier 3. Since the surfaces constituting the decentered correcting optical system 4 are decentered, it is impossible to strictly define the power of this optical element. However, if $R_{y1}/R_{y2}$ is not larger than the lower limit of the condition (3), i.e., 0.4, the power difference between the first surface 41 and the second surface 42 becomes large, causing higher-order coma and astigmatism to increase to such an extent that the aberrations cannot be corrected by other optical system. If $R_{y1}/R_{y2}$ is not smaller than the upper limit of the condition (3), i.e., 1.2, it is impossible to obtain asymmetry required to correct the inclination and curvature of the image surface over the whole image field. If it is intended to correct the inclination of the image surface by decentering of the relay optical system 5 and to correct the curvature by the field curvature of the relay optical system 5, then the relay optical system 5 is heavily loaded, and this causes the relay optical system 5 to become large in size and complicated in arrangement in cooperation with the increase in the pupil diameter.

Further, since the ocular magnifier 3 is decentered with respect to the optical axis, astigmatism which is not rotationally symmetric with respect to the optical axis occurs. Particularly, there is a large difference between the sagittal and meridional image surfaces. To correct the astigmatism, it is preferable that either the ocular magnifier 3 or the decentered correcting optical system 4 should have an anamorphic surface. To realize high resolution as far as the edges of the image field, it is preferable that the surface of the ocular magnifier 3 and the surfaces of the decentered correcting optical system 4 should be aspherical surfaces.

Further, it is preferable that all the lenses of the relay optical system 5 should be disposed coaxially with respect to each other. If all the lenses of the relay optical system 5 are coaxial with respect to each other, the relay optical system 5 can be loaded in an ordinary lens barrel. Thus, it is possible to facilitate the production and assembly of the constituent elements of the apparatus.

As has been described above, it is possible to realize a visual display apparatus which satisfies the demand for high resolution while ensuring a wide field angle for observation and a large pupil diameter by using an optical system composed of the decentered ocular magnifier 3, the decentered correcting optical system 4 having two surfaces decentered with respect to each other, in which the first surface 41 is formed from an aspherical surface having the vertex 43 at a position closer to the observer's nose, and the relay optical system 5, which is compact in size and relatively simple in arrangement.

Next, the reason for adopting the above-described arrangement to attain the second object of the present invention and the function thereof will be explained on the basis of the principle of the arrangement.

FIG. 15 illustrates an optical ray trace of the optical system of the visual display apparatus (Example 5, described later) according to the present invention. As shown in FIG. 15, the optical system is composed of a two-dimensional image display device 6 for displaying an image for observation, a relay optical system 5 for projecting a real image of the two-dimensional image display device 6 in the air, an ocular magnifier 3 for projecting the real image in the air as an enlarged image, and a decentered correcting optical system 4 disposed between the relay optical system 5 and the two-dimensional image display device 6 and having surfaces decentered with respect to each other. The decentered correcting optical system 4 is provided to correct the inclination and curvature of an image surface formed by the ocular magnifier 3, which is decentered with respect to the visual axis 7 after it has been reflected by the ocular magnifier 3, and to tilt the optical axis.

Incidentally, diopter correction may be effected by a diopter correcting lens or the like which is inserted in the optical path. However, it is difficult to adopt this method for a visual display apparatus having the above-described arrangement. It is impossible to insert anything but a contact lens in the space between the observer's pupil 1 and the ocular magnifier 3. Nothing can be inserted in the space between the ocular magnifier 3 and the decentered correcting optical system 4 because rays pass in all directions in this space. There is no spatial room between the decentered correcting optical system 4 and the relay optical system 5 and also between the relay optical system 5 and the two-dimensional image display device 6. On the contrary, if a room for inserting a diopter correcting element is provided in either space, the apparatus undesirably becomes large in size and complicated in arrangement.

Accordingly, if the apparatus is arranged such that the power distribution to the whole optical system can be changed so as to effect diopter correction simply by moving any one of the optical elements basically constituting the optical system, value added can be attached to the visual display apparatus at low cost without increasing the overall size of the apparatus.

Next, the behavior of rays when an optical element having power, which is a diopter correcting element of the visual display apparatus of the present invention that has a diopter correcting function, is moved will be explained by employing the paraxial theory using a thin lens. FIG. 14 illustrates a paraxial ray trace through a thin lens. It is assumed that the focal length of the thin lens L is f, and the power thereof is Φ. As shown in FIG. 14, the object point P and the image point P' are conjugate to each other, and it is assumed that the distances from the lens L to the object and image points P and P' are s (which is minus in the illustrated example) and s', respectively, the inclinations of the paraxial ray at the object and image points P and P' are u (which is minus in the illustrated example) and u', respectively, and the ray height at the lens L is h. In this case, fundamental expressions of image formation are as follows:

$$u' = u + h\Phi \quad (4)$$

$$1/s' = 1/s + 1/f \quad (5)$$

The ray when the lens L is moved toward the object point side by Δs, for example, is shown by the broken line in FIG. 14. It is assumed that as a result of the movement of the lens L, the ray height lowers by Δh, the inclination at the image point side becomes u", and the distance from the lens L to the image point becomes S". Regarding the inclination, since h in equation (4) becomes h−Δh, u" is expressed by $$u'' = u + (h + \Delta h)\Phi \quad (6)$$

Since h>0, Δh>0, and Φ>0, the following expression may be said to be valid by comparison of equations (4) and (6):

$$u' > u'' \quad (7)$$

Regarding the distance from the lens L to the image point, on the other hand, since s in equation (5) becomes s−Δs, s" is expressed by $$1/s'' = 1/(s - \Delta s) + 1/f \quad (8)$$

Since s<0 and Δs<0, the following expression may be said to be valid by comparison of equations (5) and (8):

$$s' < s'' \quad (9)$$

It may be considered that the ray height, inclination and so forth change with the movement of each optical element on the basis of equations (4) and (5) in the same way as in the above-described example.

Next, how a standard of the amount of movement of a diopter correcting element is determined according to the amount of diopter correction will be explained by taking a relay optical system as an example. It is assumed that the focal length of the entire optical system is $f_a$, the distance from the object-side focal point to the object point is z (which is minus in the illustrated example), and the distance from the image-side focal point to the image point is z'. In FIG. 14, the relationship between $f_a$ and z is shown with the lens L regarded as the entire optical system of the visual display apparatus according to the present invention. The expression of image formation based on the focal points is given by $$z \cdot z' = -f_a^2 \quad (10)$$

Assuming that the focal length of the relay optical system is $f_l$, and the magnification of other optical element is β, $f_a$ is expressed by $$f_a = f_l \times \beta \quad (11)$$

Diopter D, which indicates dioptic power, is expressed by $$D = -z'/1000 \quad (12)$$

Let us assume that the relay optical system is a diopter correcting element, and the amount of movement for correction is Δz. With z in equation (10) replaced by Δz, equation (10) may be rearranged according to equations (11) and (12) as follows:

$$\Delta z = -f_a^2/z' = -D \times (f_l \times \beta)^2/1000 \quad (10)$$

Therefore, to effect diopter correction for −2diopters, for example, under the conditions that $f_l$=30 mm, and β=0.7, the relay optical system should be moved toward the image side by about 0.9 mm.

Next, the power distribution to the entire optical system of the visual display apparatus according to the present invention will be described, together with a diopter correcting method for nearsightedness and farsightedness.

FIG. 8 shows the power distribution to the entire optical system and also illustrates a paraxial ray trace. In the figure, reference numeral 1 denotes a pupil, 3 an ocular reflecting optical system, 4 a decentered correcting optical system, 5 a relay optical system, 6 a two-dimensional image display device (object surface), 20 a real image formed by the relay optical system 5, 21 an object paraxial ray, and 27 a pupil paraxial ray. For the sake of description, the rays are traced backward from the pupil 1 toward the two-dimensional image display device 6.

In the case of nearsightedness, the refractive power of the crystalline lens in the eyeball is too strong, so that only an image of a near object can be formed on the retina. Therefore, rays which behave as if they had a positive refractive power at the pupil must be formed by an optical system. In the case of farsightedness, conversely, rays which behave as if they had a negative refractive power at the pupil must be formed. FIG. 9 illustrates a ray trace in the case of nearsightedness. FIG. 10 illustrates a ray trace in the case of farsightedness. As will be clear from FIGS. 9 and 10, in the case of nearsightedness, the object position 61 lies closer to the pupil 1 than in the case of the normal eyesight, while, in the case of farsightedness, the object position 62 lies remoter from the pupil 1 than in the case of the normal eyesight. Diopter correction is an operation of matching the displaced object position 61 or 62 with the object position 60 in the case of the normal eyesight, where the two-dimensional image display device 6 lies, by moving an element of the optical system.

The following description of diopter correction will be made for nearsightedness only. This is because it may be considered that diopter correction for farsightedness is usually effected by movement reverse to that in the case of nearsightedness with regard to the paraxial rays.

FIG. 11 illustrates a ray trace when the ocular optical system 3 is used as a diopter correcting element. In the figure, the ray trace before the diopter correction is shown by the solid line 25, and the ray trace after the correction is shown by the dotted line 26. It should be noted that the position of each element after the corrective movement is described by putting the symbol ' or " to the reference numeral. As shown in the figure, the movement of the ocular optical system 3 away from the pupil 1 causes an increase in the distance between the pupil 1 and the ocular optical system 3 and also in the distance between the decentered correcting optical system 4 and the ocular optical system 3. The ray height at the ocular optical system 3 lowers, and the angle of refraction decreases. The decentered correcting optical system 4 shifts to 4'. Since the angle of incidence is small, the angle of refraction decreases. The position of the following relay optical system 5 shifts to 5', and the position of the two-dimensional image display device 6 shifts to 6', but there is no change in the power distribution. Accordingly, the object position coincides with the previous object position 6' (see FIG. 9) as shown by the dotted line 26 in the figure.

FIG. 12 illustrates a ray trace when the decentered correcting optical system 4 is used as a diopter correcting element. The arrangement in the figure is the same as that in FIG. 11. As shown in FIG. 12, movement of the decentered correcting optical system 4 to a position 4" closer to the pupil 1 causes the real image position to come closer to the decentered correcting optical system 4, and the ray height lowers. Accordingly, the angle of refraction decreases, and the object position can be shifted to a position away from the pupil 1.

FIG. 13 illustrates a ray trace when the relay optical system 5 is used as a diopter correcting element. As shown in the figure, movement of the relay optical system 5 to a position 5" closer to the pupil 1 causes the refraction position to come closer to the real image 20 (see FIGS. 8 to 10). Accordingly, the angle of refraction decreases, and the object position can be shifted to a position away from the pupil 1. Diopter correction can also be effected by moving the lenses of the relay optical system 5 in combination or alone. Movement of a certain lens of the relay optical system 5 causes the position of the principal point of the relay optical system 5 to change. Thus, the object position can be moved so as to effect diopter correction.

It will be clear that when the two-dimensional image display device 6 is used as a diopter correcting element, the two-dimensional image display device 6 should be moved to either of the object positions 61 and 62 according to whether the user is nearsighted or farsighted, as shown in FIGS. 9 and 10. That is, when the user is nearsighted, the two-dimensional image display device 6 is moved to the object position 61, which is formed at a position closer to the pupil 1, whereas, when the user is farsighted, the two-dimensional image display device 6 is moved to the object position 62, which is formed at a position away from the pupil 1.

Diopter correction can also be effected by combining together the above-described diopter correcting elements, as a matter of course. In a case where the field angle for observation is wide and each optical element is decentered, the paraxial theory is often inapplicable to the circumstances. Therefore, the amount of aberration produced in the optical system may increase unless a plurality of diopter correcting elements are used in combination. In a case where each optical element is disposed in a decentered position, the diopter correcting element should preferably move eccentrically with a view to effectively suppressing the occurrence of aberrations.

If diopter correction can be effected by moving only the diopter correcting element without changing the distance from the pupil 1 to the two-dimensional image display device 6, there is no change in the overall size of the apparatus. Accordingly, the external appearance of the apparatus is simple, and the movable portion for diopter correction can be made compact. Therefore, such an arrangement is even more preferable.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 7(a), 7(b) and 7(c) are views for explanation of a method of setting a field angle for observation.

DESCRIPTION OF THE PREFERRED EMBODIMENTS

Figure 1:
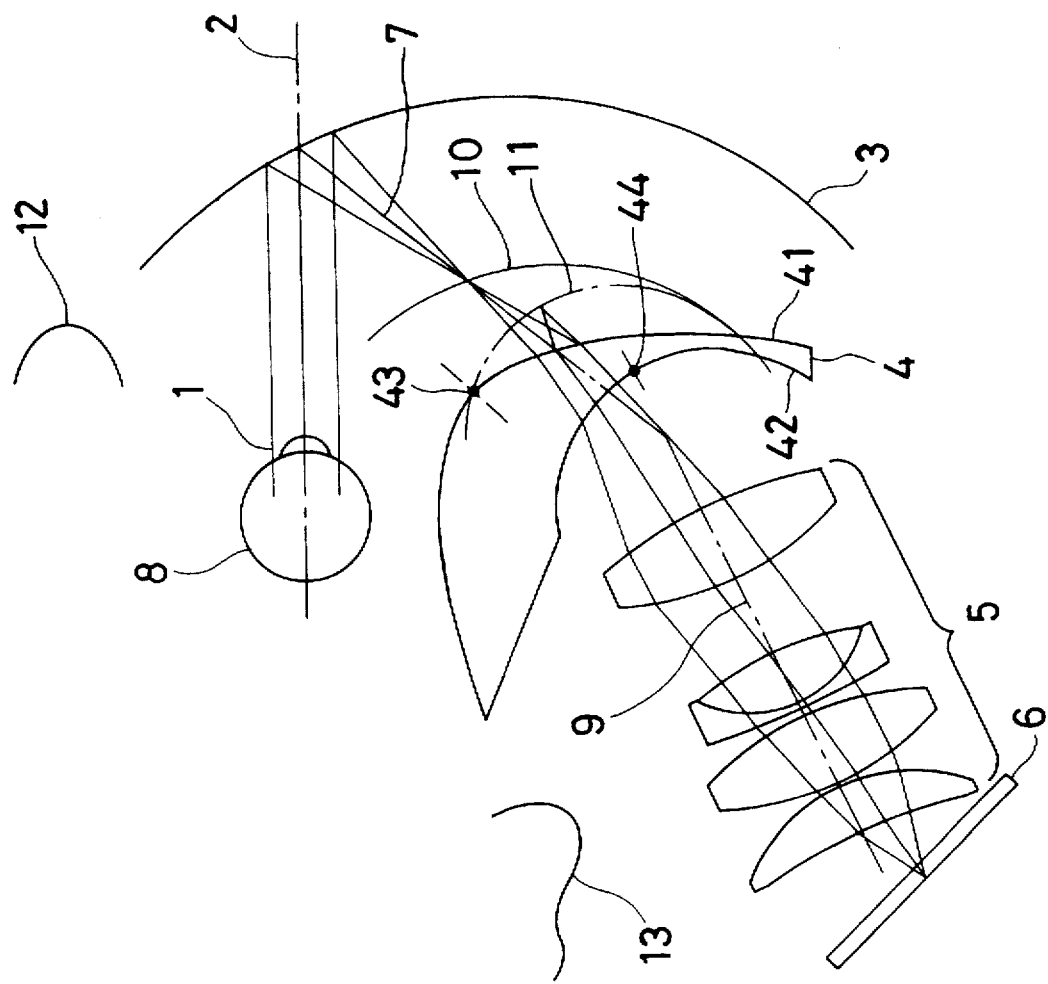
FIG. 1 is a view for explanation of the general arrangement of the visual display apparatus according to the present invention.
Figure 2:
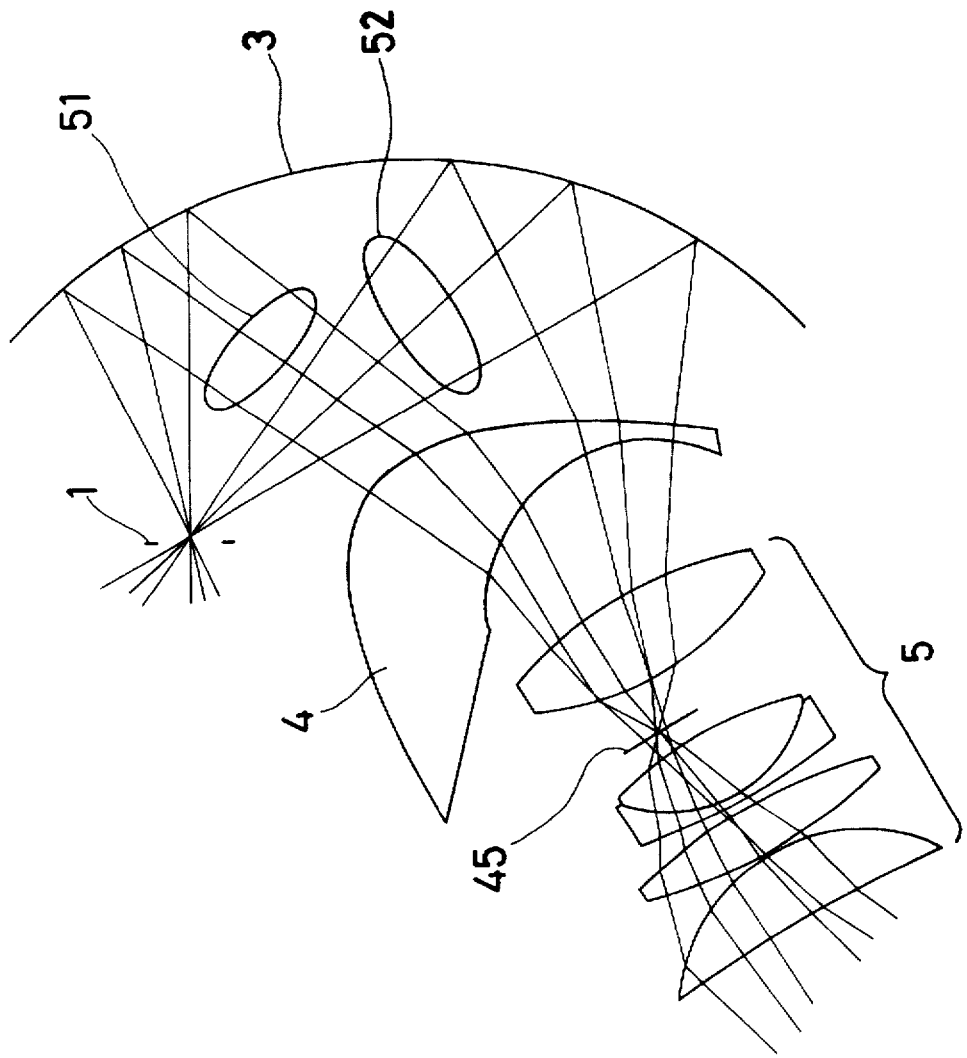
FIG. 2 illustrates a pupil ray trace in a horizontal plane of the apparatus shown in FIG. 1.
Figure 3A:
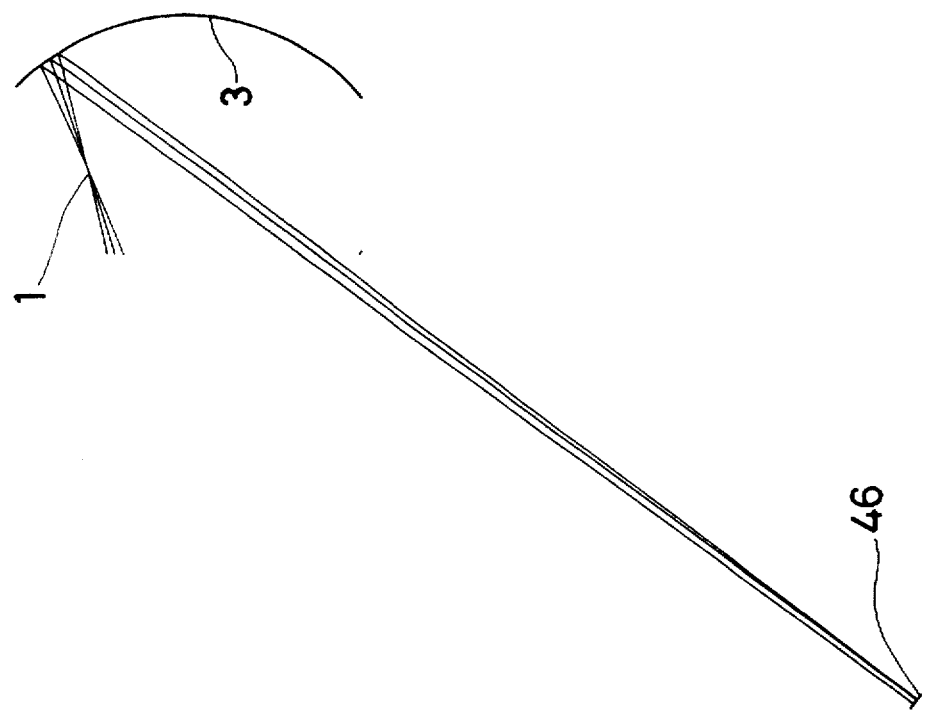
FIGS. 3(a) and 3(b) illustrate a trace of the inner pupil rays in the horizontal plane.
Figure 3B:
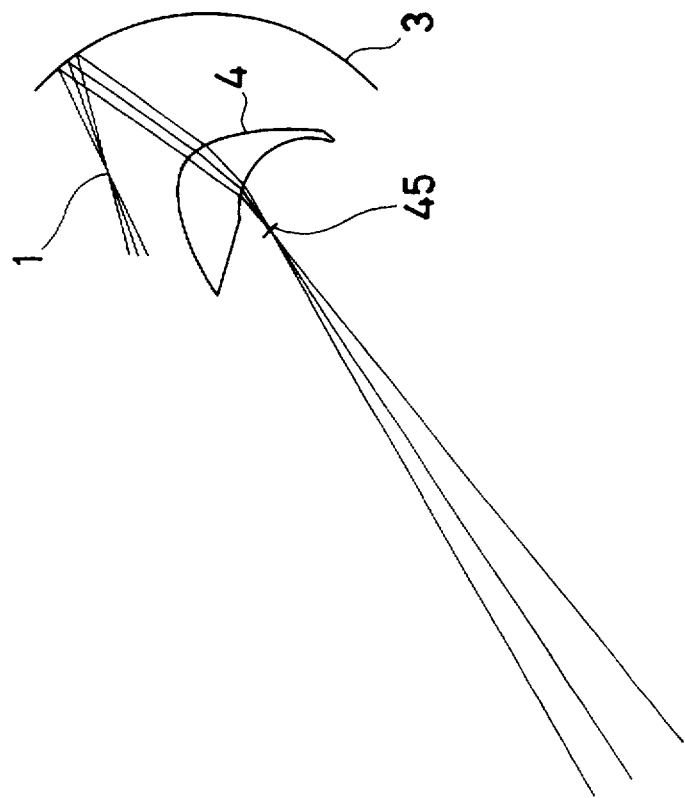
Figure 4A:
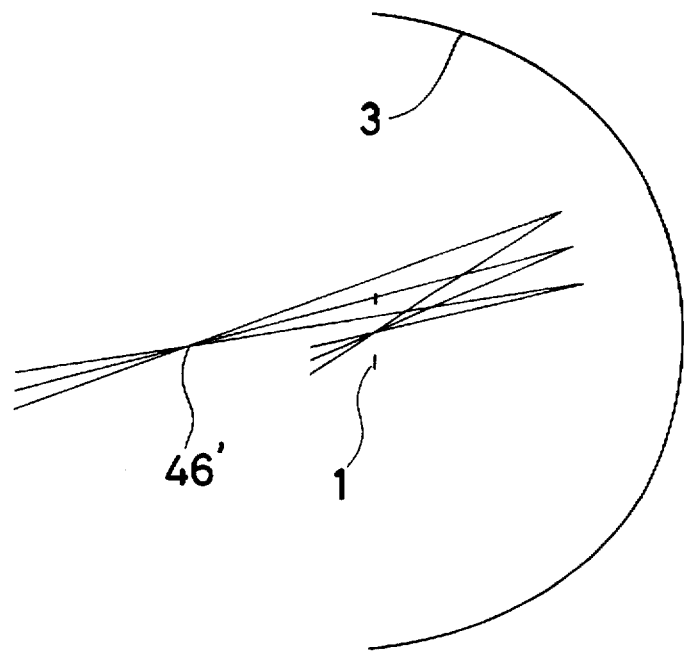
FIGS. 4(a) and 4(b) illustrate a trace of the inner pupil rays in the vertical plane.
Figure 4B:
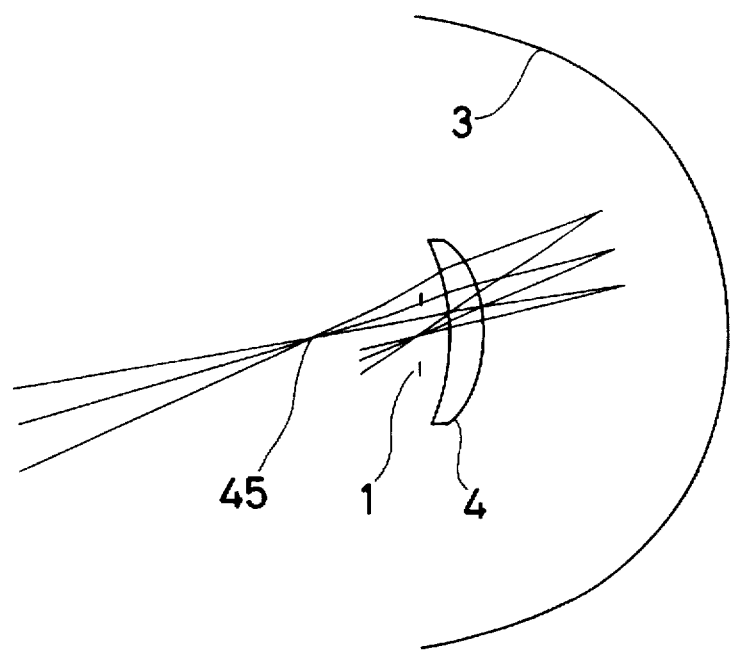
Figure 5A:
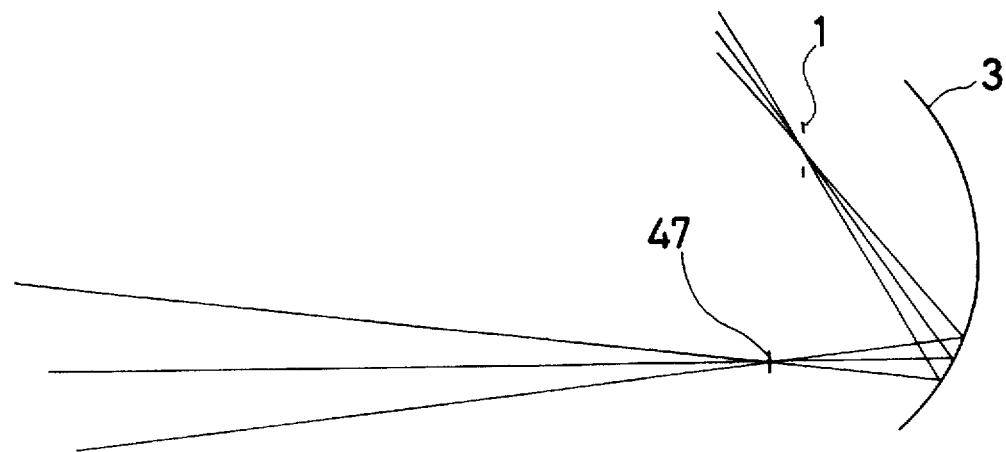
FIGS. 5(a) and 5(b) illustrate a trace of the outer pupil rays in the horizontal plane.
Figure 5B:
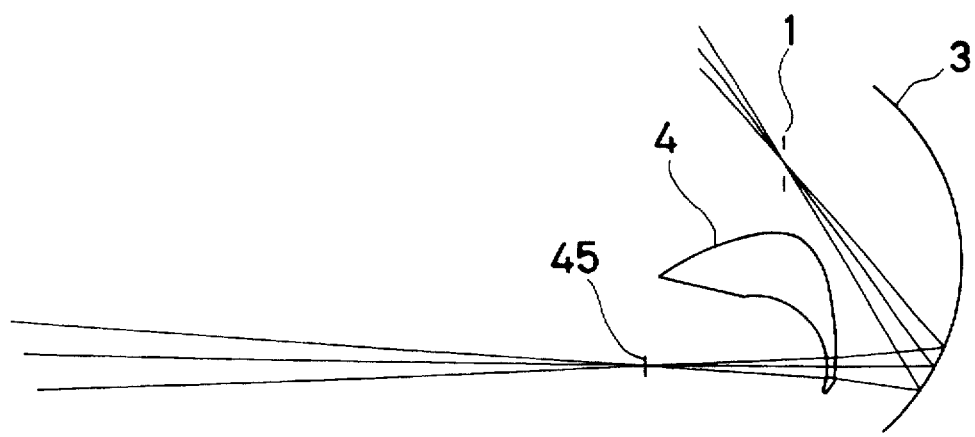
Figure 6A:
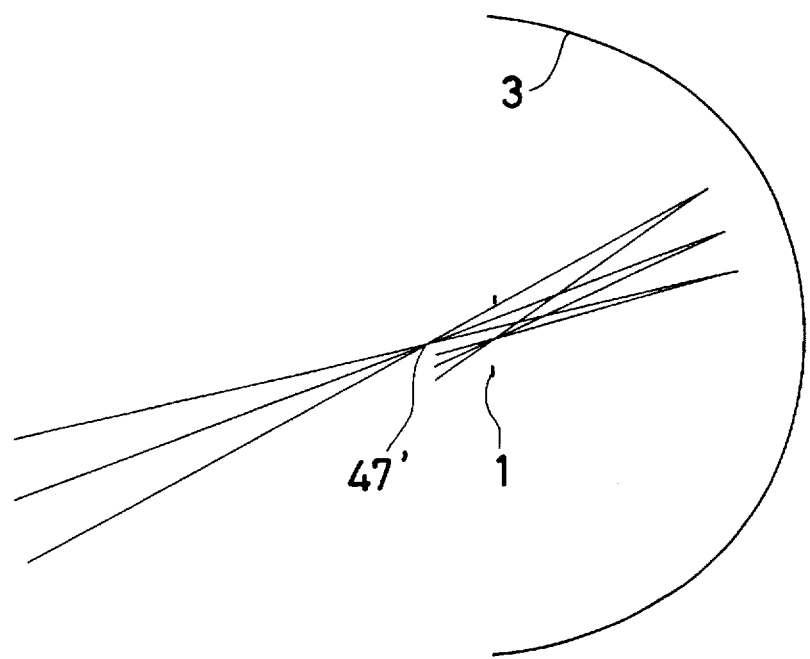
FIGS. 6(a) and 6(b) illustrate a trace of the outer pupil rays in the vertical plane.
Figure 6B:
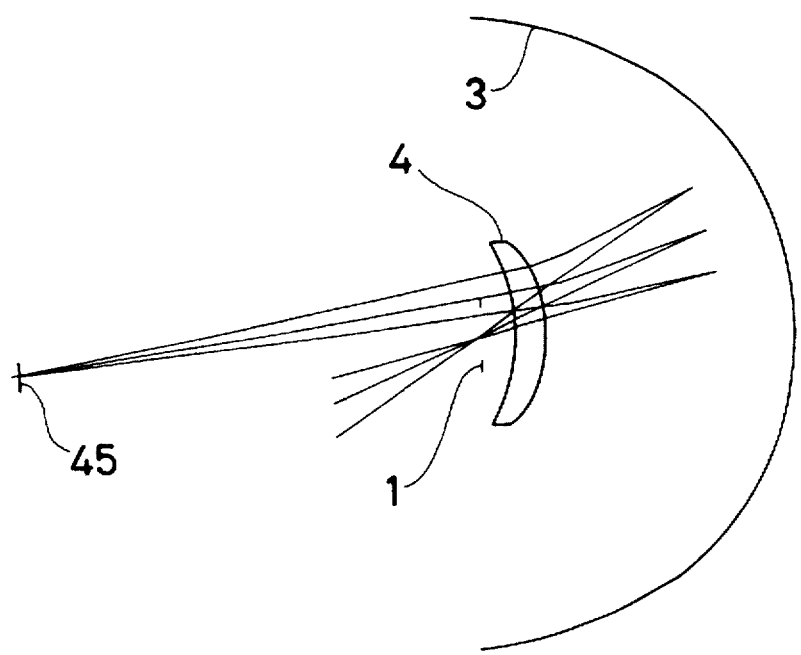
Figure 8:
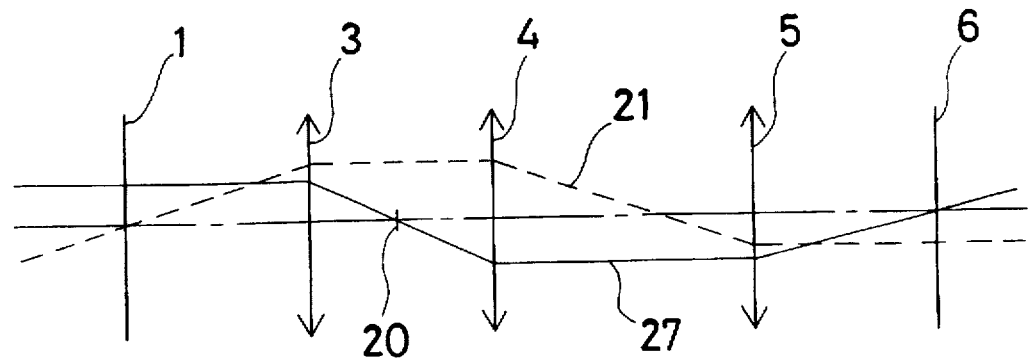
FIG. 8 shows power distribution to the entire optical system of the visual display apparatus according to the present invention and also illustrates a paraxial ray trace.
Figure 9:
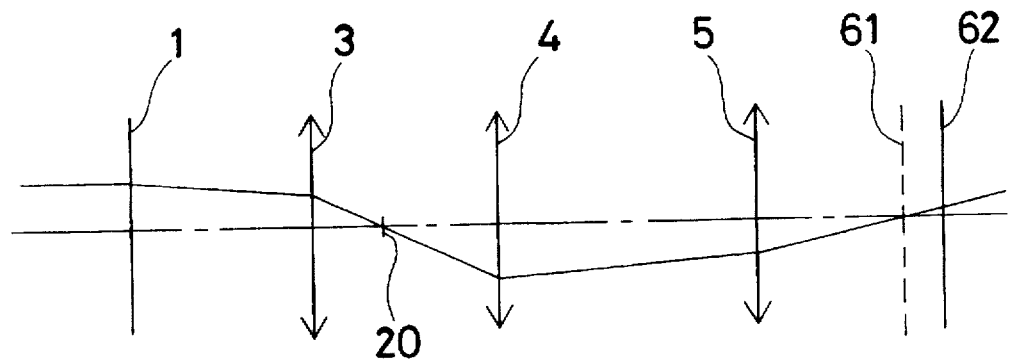
FIG. 9 illustrates a paraxial ray trace in the case of nearsightedness.
Figure 10:
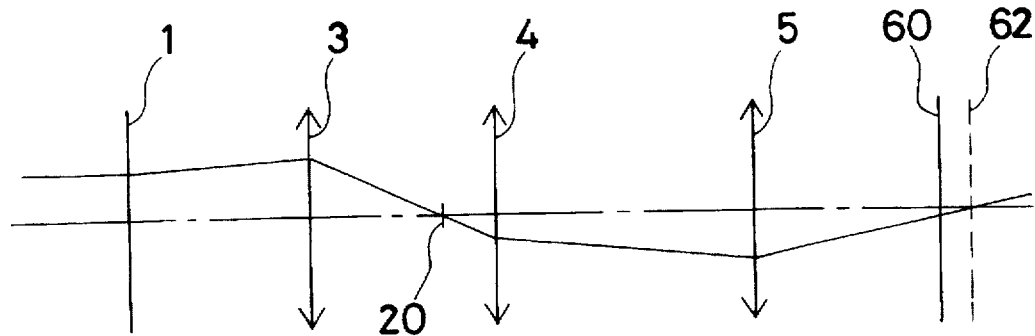
FIG. 10 illustrates a paraxial ray trace in the case of farsightedness.
Figure 11:
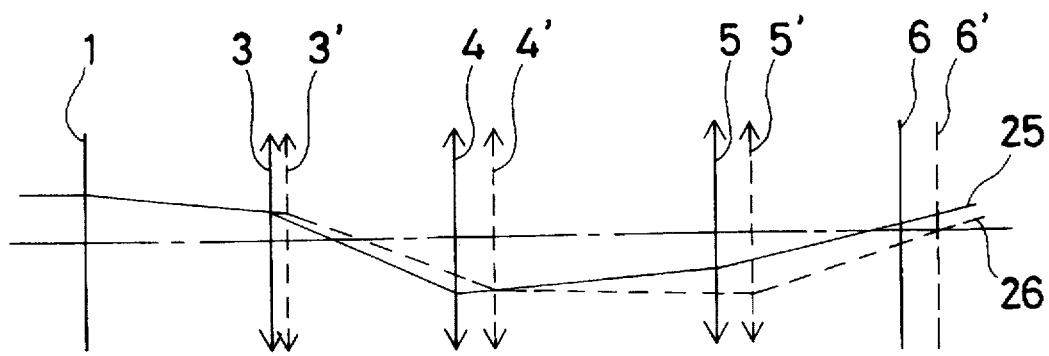
FIG. 11 illustrates a paraxial ray trace when an ocular optical system is used as a diopter correcting element.
Figure 12:
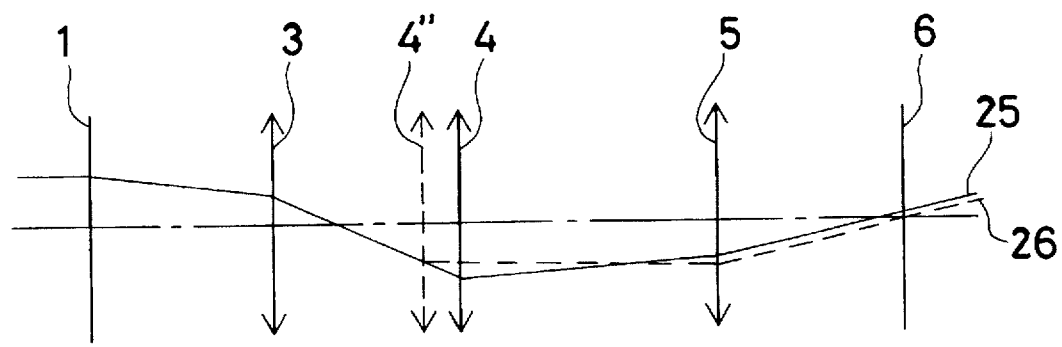
FIG. 12 illustrates a paraxial ray trace when a decentered correcting optical system is used as a diopter correcting element.
Figure 13:
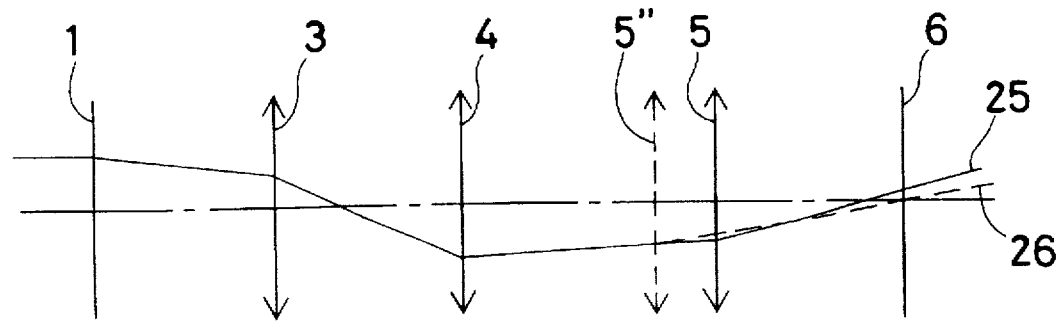
FIG. 13 illustrates a paraxial ray trace when a relay optical system is used as a diopter correcting element.
Figure 14:
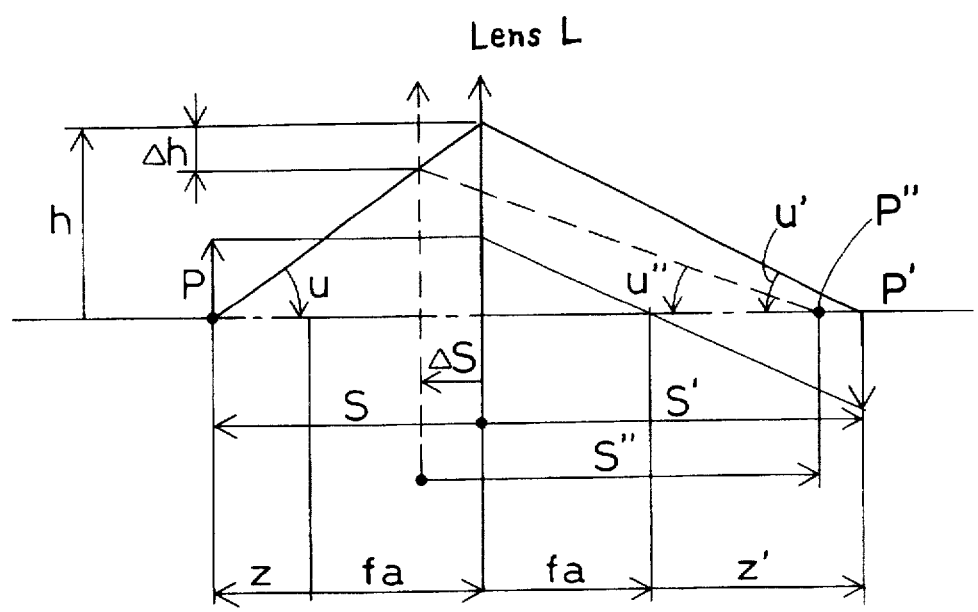
FIG. 14 is a view for explanation of the behavior of rays when an optical element having power is moved.

The visual display apparatus of the present invention will be described below by way of some examples. A coordinate system is defined as follows: With the observer's pupil 1 defined as the origin, the horizontal direction of the observer is taken as Y-axis, where the leftward direction is defined as positive direction; the direction of the observer's visual axis 2 is taken as Z-axis, where the direction toward the ocular magnifier 3 from the observer's eyeball 8 is defined as positive direction; and the vertical direction of the observer is taken as X-axis, where the downward direction is defined as positive direction.

Next, a method of setting a field angle for observation will be explained with reference to FIGS. 7(a), 7(b) and 7(c). FIG. 7(a) shows the field angle for right-eyed vision; FIG. 7(b) shows the field angle for left-eyed vision; and FIG. 7(c) shows the field angle for binocular vision. As shown in these figures, the horizontal field angle for right-eyed vision is set extending over from +25° to −60°, for example, and the hatched region extending over from −25° to +25° is defined as a binocular fusion region where images viewed with the left and right eyes fuse into a single image. A region extending over from −25° to −60° is set so as to be recognized with only one eye as an ear-side peripheral image. Since the performance of the optical system in the vertical direction is symmetrical with respect to the Y-axis, only an upper-half field angle of 33.75° is set. In other words, although the horizontal field angle is set extending over from +25° to −60° for one eye, in binocular vision it is recognized as an observation field angle of 120°. The vertical field angle is simply double the set field angle 33.75°, that is, 67.5°.

The following examples are visual display apparatuses for the right eye. A visual display apparatus for the left eye can be realized by disposing the constituent optical elements of each example in symmetrical relation to the apparatus for the right eye with respect to the XZ-plane.

In the figures showing the examples, reference numeral 1 denotes the position of the observer's pupil, 3 an ocular magnifier, 4 a decentered correcting optical system, 5 a relay optical system, and 6 a two-dimensional image display device. In the figures showing Examples 1 to 4, reference numeral 2 denotes the observer's visual axis when he or she looks straight forward, and 7 the visual axis after it has been reflected by the ocular magnifier 3.

The following Examples 1 to 12 satisfy the conditions of the first aspect of the present invention.

Figure 15:
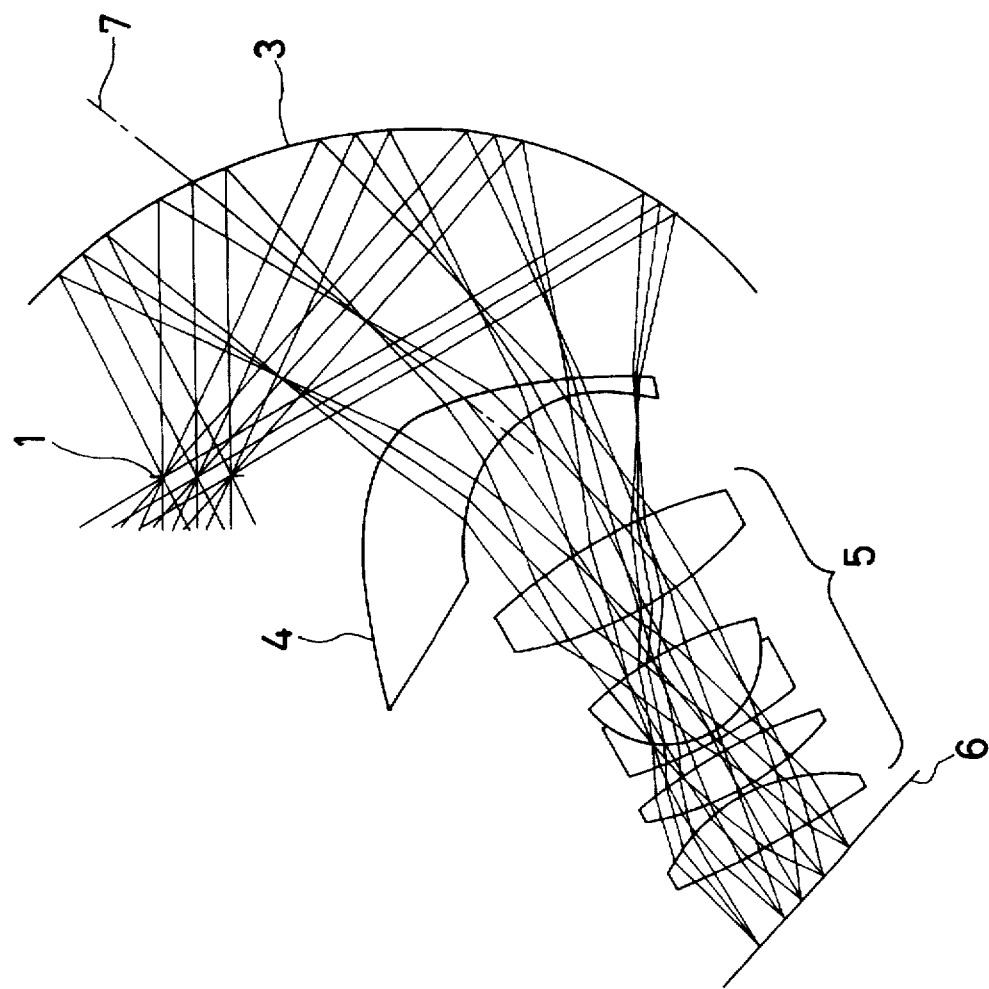
FIG. 15 illustrates an optical ray trace of the optical system of the visual display apparatus according to the present invention.
Figure 16:
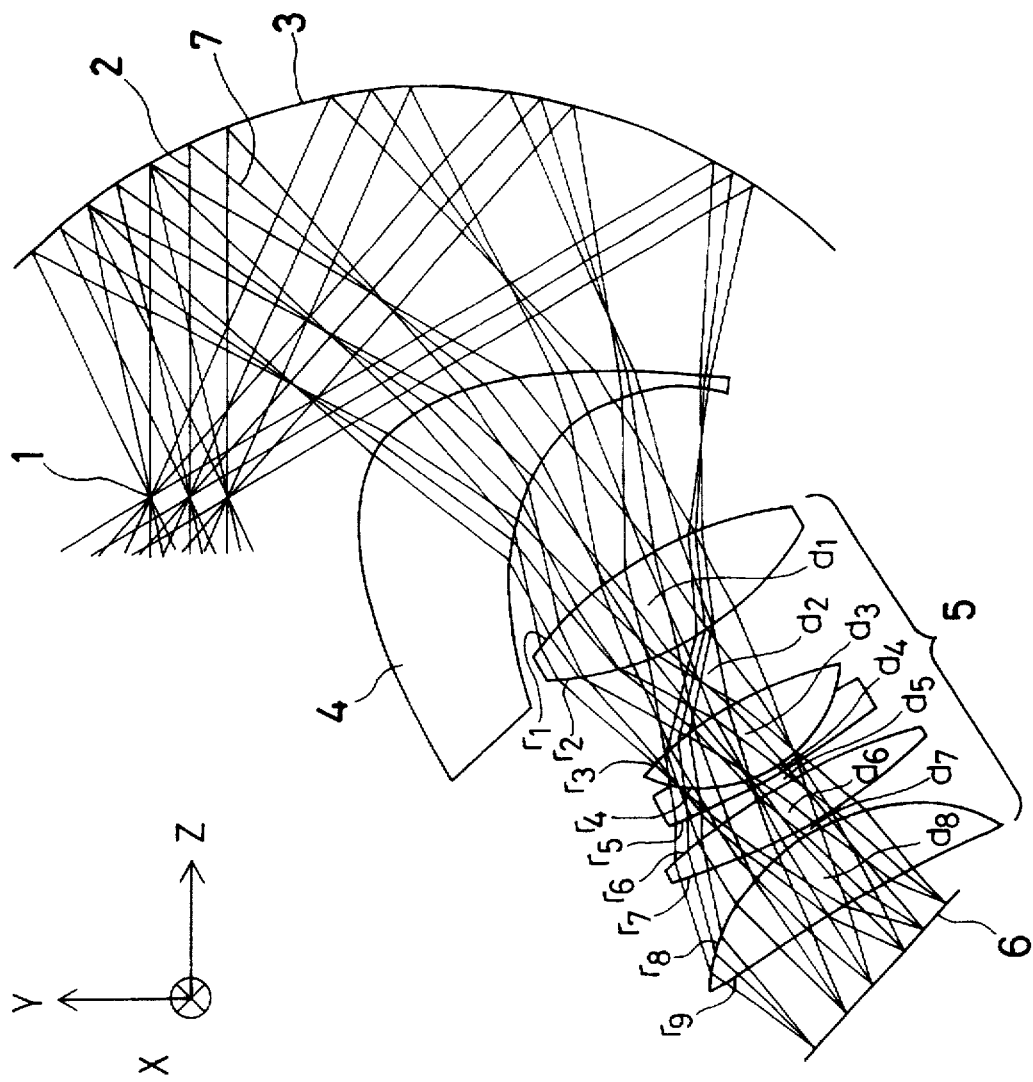
FIG. 16 is a horizontal sectional view showing the optical arrangement of Example 1 of the present invention.

FIG. 15 shows the arrangement of the optical system of Example 1. The surface of the ocular magnifier 3 and the surfaces of the decentered correcting optical system 4 are anamorphic aspherical surfaces. The relay optical system 5 is composed of 5 spherical lenses arranged in 4 lens units.

In this example, the horizontal field angle is 120°, while the vertical field angle is 67.5°, and the pupil diameter is 10 mm.

Figure 17:
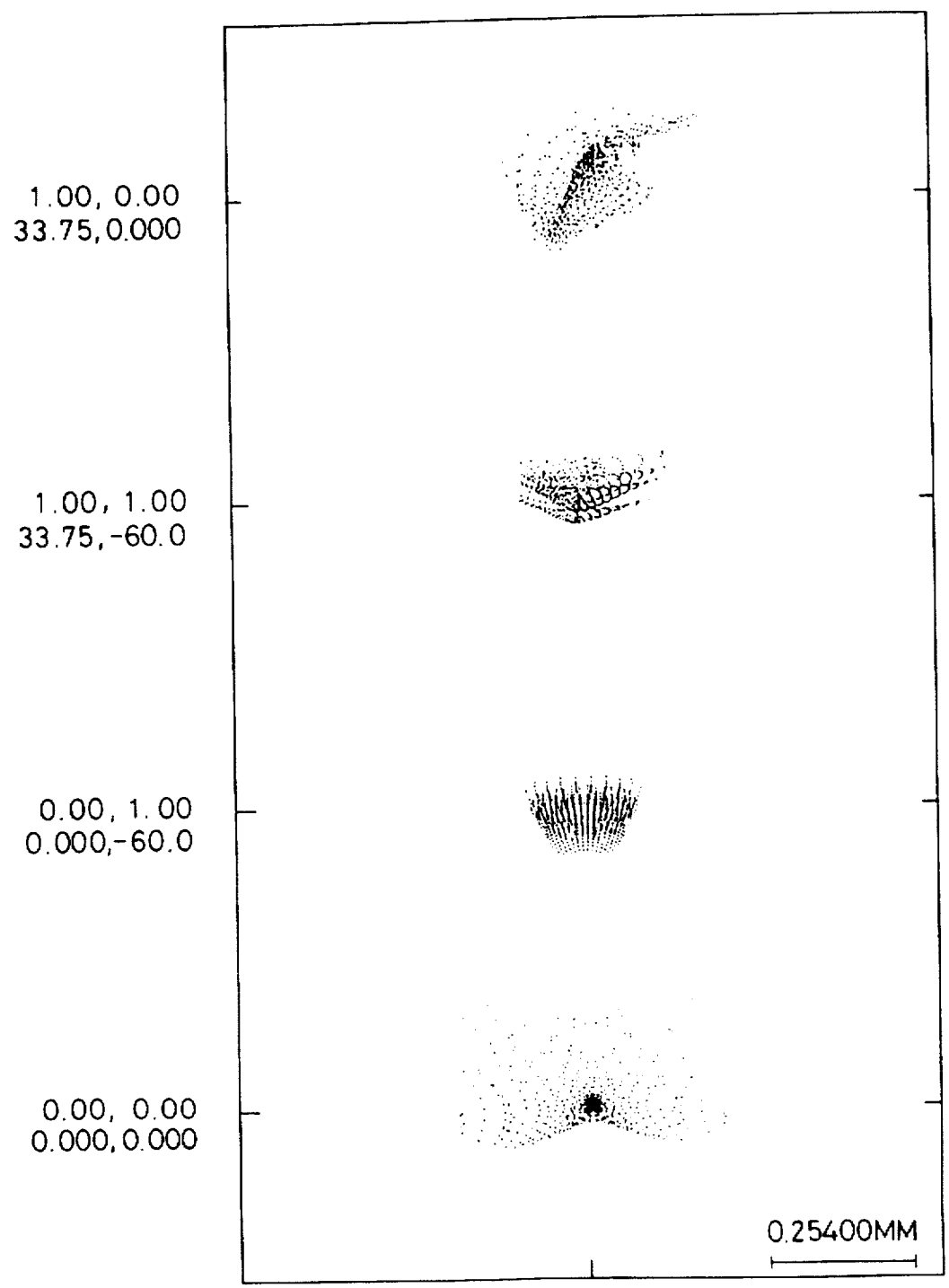
FIG. 17 is a part of a spot diagram showing the condition of aberration correction in Example 1.
Figure 18:
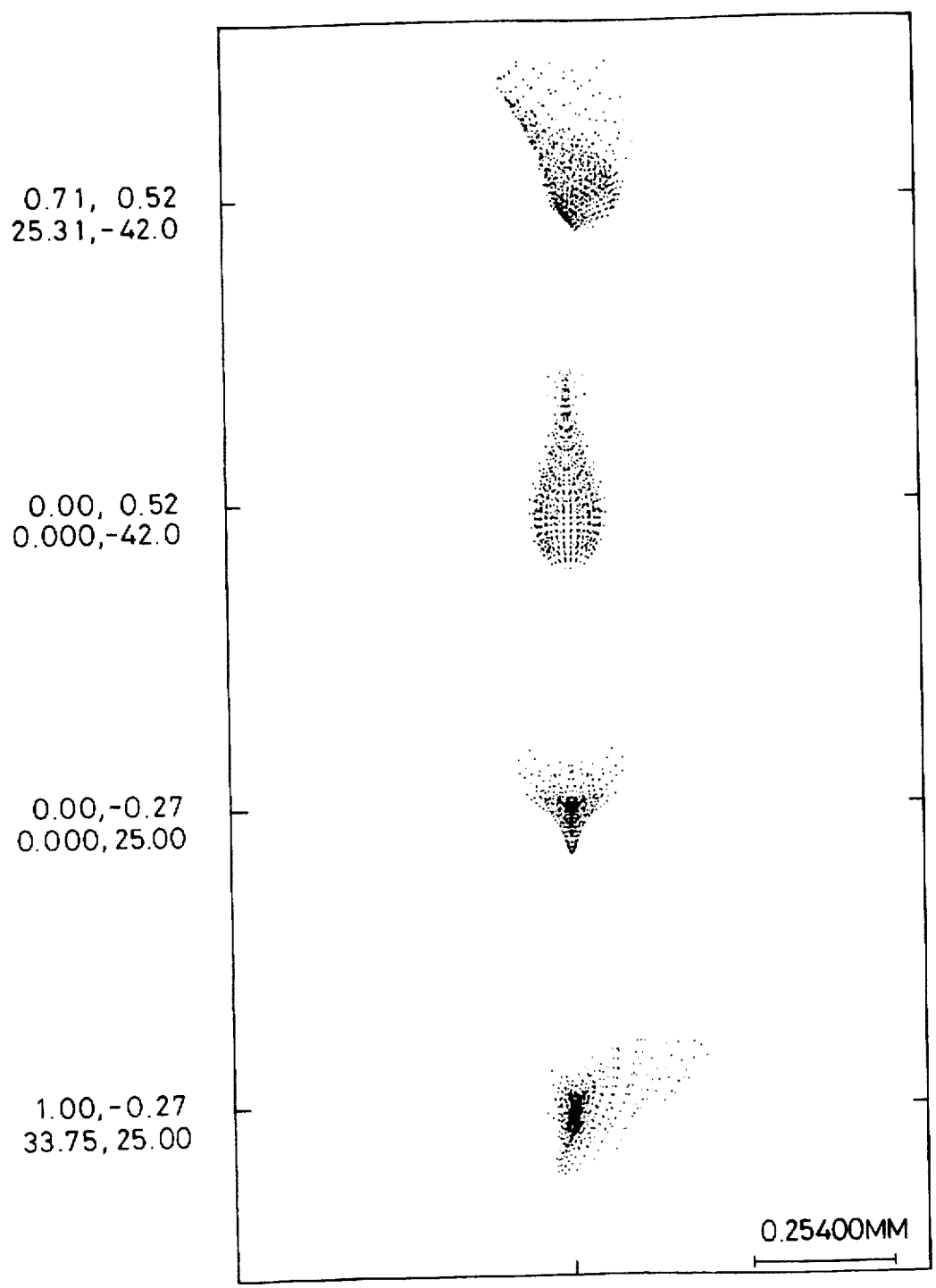
FIG. 18 is another part of the spot diagram showing the condition of aberration correction in Example 1.
Figure 19:
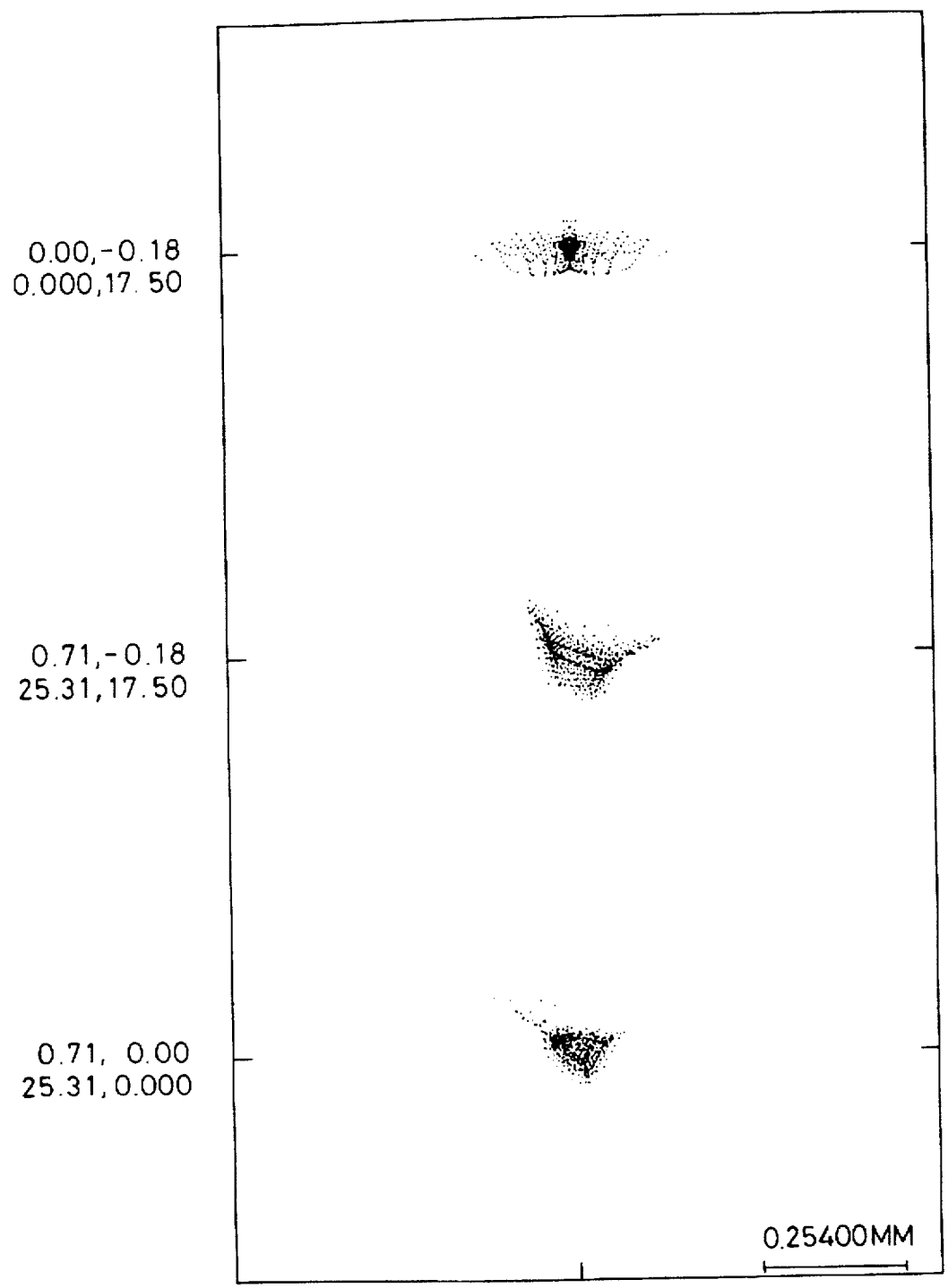
FIG. 19 is the other part of the spot diagram showing the condition of aberration correction in Example 1.

FIGS. 17 to 19 are spot diagrams showing the condition of aberration correction made in this example. In these figures, among four numerals on the left-hand side of the spot diagram, the upper two numerals represent coordinates (X, Y) when the coordinates (X, Y) of a rectangular image plane are expressed as follows: The coordinates of the center of the image plane are (0.00, 0.00); the coordinates of the center of the right-hand edge thereof are (0.00, −1.00); the coordinates of the top right corner thereof are (1.00, −1.00); and the coordinates of the center of the top edge thereof are (1.00, 0.00). The lower two numerals represent X- and Y-components (expressed by degrees) of angle made by the coordinate axes (X, Y) with respect to the visual axis (the center of the image plane).

Figure 20:
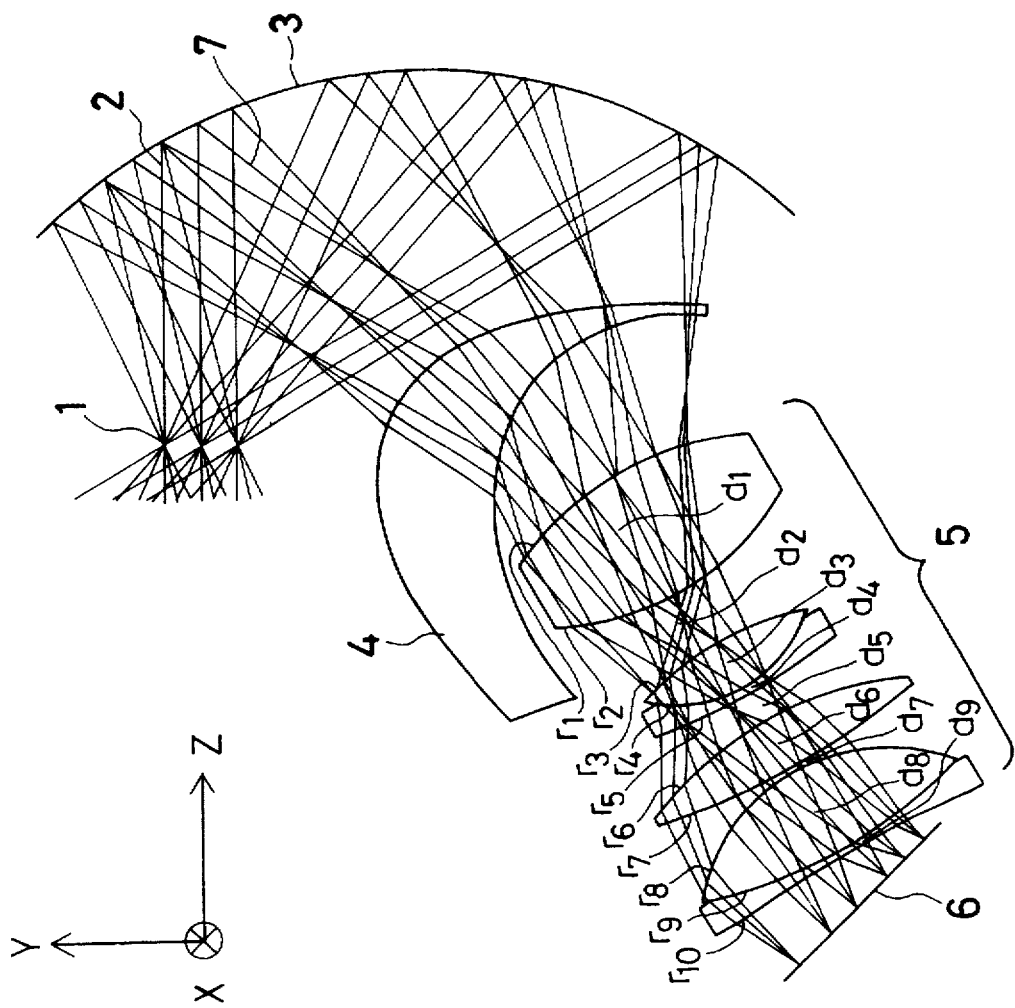
FIG. 20 is a horizontal sectional view showing the optical arrangement of Example 2 of the present invention.

FIG. 20 shows the arrangement of the optical system of. Example 2. The arrangement of Example 2 is the same as that of Example 1 except that the relay optical system 5 is composed of 6 lenses arranged in 4 lens units.

In the above-described example, the horizontal field angle is 120°, while the vertical field angle is 67.5°, and the pupil diameter is 10 mm.

Figure 21:
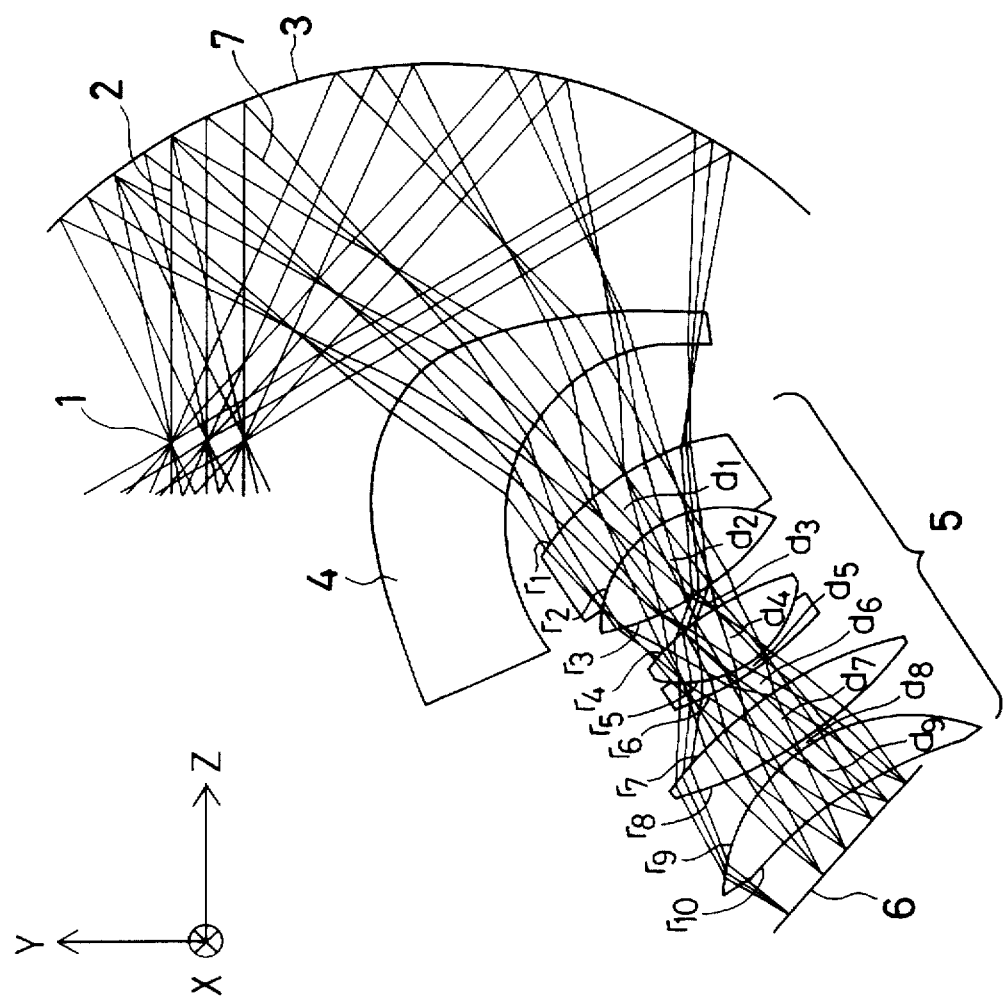
FIG. 21 is a horizontal sectional view showing the optical arrangement of Example 3 of the present invention.

FIG. 21 shows the arrangement of the optical system of Example 3. The arrangement of Example 3 is the same as that of Example 1 except that the relay optical system 5 is composed of 6 lenses arranged in 4 lens units.

In the above-described example, the horizontal field angle is 120°, while the vertical field angle is 67.5°, and the pupil diameter is 10 mm.

Figure 22:
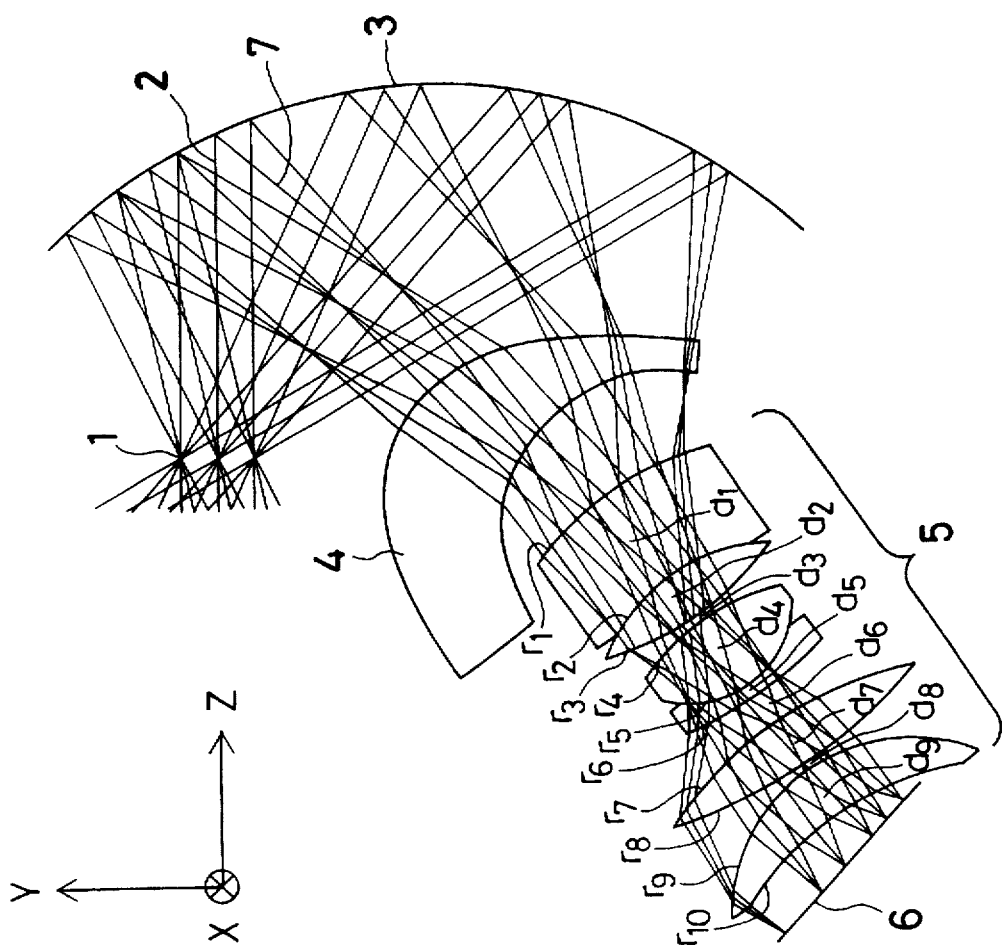
FIG. 22 is a horizontal sectional view showing the optical arrangement of Example 4 of the present invention.

FIG. 22 shows the arrangement of the optical system of Example 4. The arrangement of Example 4 is the same as that of Example 1 except that the ocular magnifier 3 has a toric surface, and that the first surface of the decentered correcting optical system 4 is an anamorphic surface, while the second surface is a spherical surface, and further that the relay optical system 5 is composed of 6 lenses arranged in 4 lens units.

In the above-described example, the horizontal field angle is 120°, while the vertical field angle is 67.5°, and the pupil diameter is 10 mm.

Examples 5 to 12, which mainly relate to diopter correction, will be explained below. It should be noted that description of the field angle is omitted.

Figure 23:
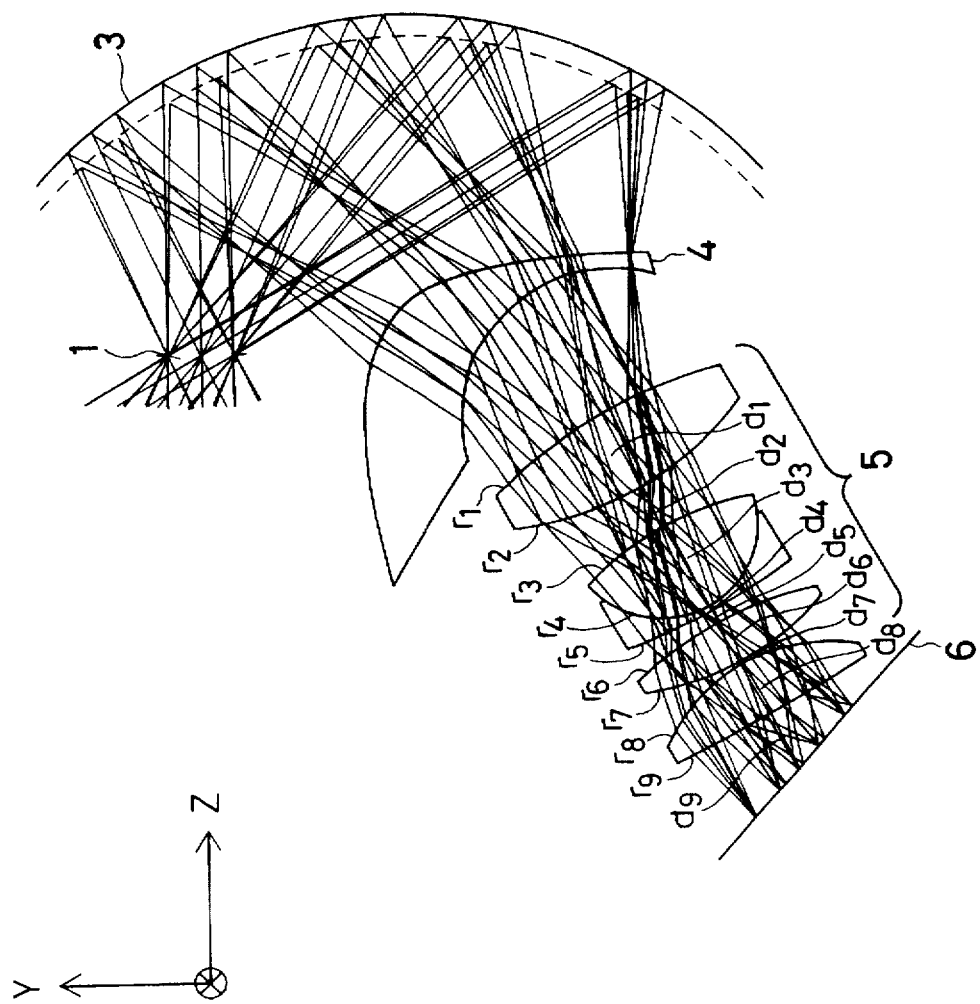
FIG. 23 is a horizontal sectional view showing the optical arrangement of Example 5 of the present invention.

FIG. 23 shows the arrangement of the optical system of Example 5. In the figure, the solid lines show the layout of the optical system at 0 diopter, and the dotted lines show the layout of the optical system at −6 diopters. Ray tracing is made by solid lines for both cases. In this example, the ocular magnifier 3 alone serves as a diopter correcting element. The ocular magnifier 3 moves in the YZ-plane according to diopter, thereby effecting diopter correction. In the case of nearsightedness, the ocular magnifier 3 moves so that the distance from the pupil 1 shortens (Z: minus), and also moves upward (Y: plus) as viewed in the figure. In the case of farsightedness, the ocular magnifier 3 moves reversely for both Z and Y.

In this example, diopter correction can also be effectively made by moving the ocular magnifier 3 in only the Z direction as a diopter correcting element.

Figure 24:
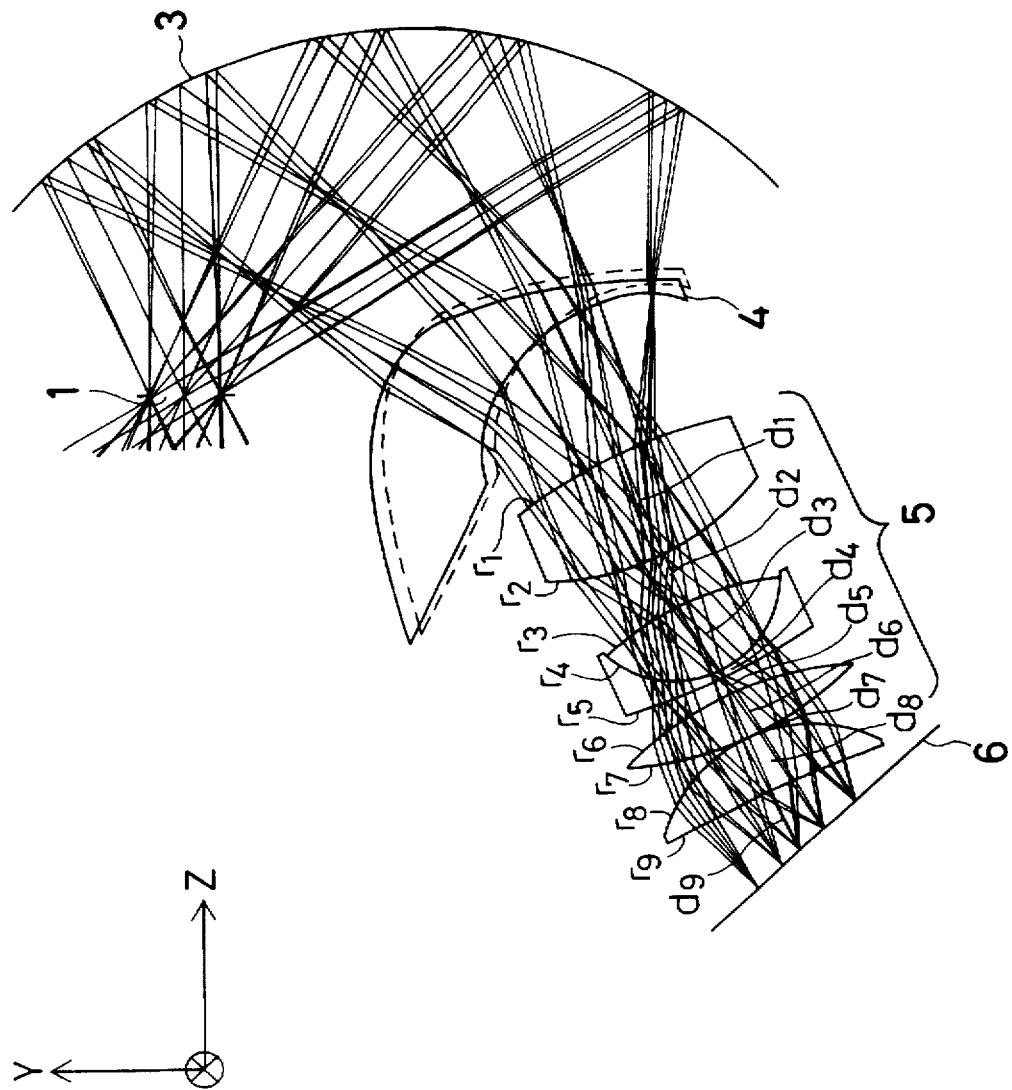
FIG. 24 is a horizontal sectional view showing the optical arrangement of Example 6 of the present invention.

FIG. 24 shows the arrangement of the optical system of Example 6. In the figure, the solid lines show the layout of the optical system at 0 diopter, and the dotted lines show the layout of the optical system at −6 diopters. Ray tracing is made by solid lines for both cases. In this example, the decentered correcting optical system 4 alone serves as a diopter correcting element. The decentered correcting optical system 4 moves in the YZ-plane, thereby effecting diopter correction. In the case of nearsightedness, the decentered correcting optical system 4 moves toward the ocular magnifier 3 (Z: plus), and also moves downward (Y: minus) as viewed in the figure. In the case of farsightedness, the decentered correcting optical system 4 moves reversely for both Z and Y. In other words, diopter correction can be effected by tilting the decentered correcting optical system 4 about a certain point.

Figure 25:
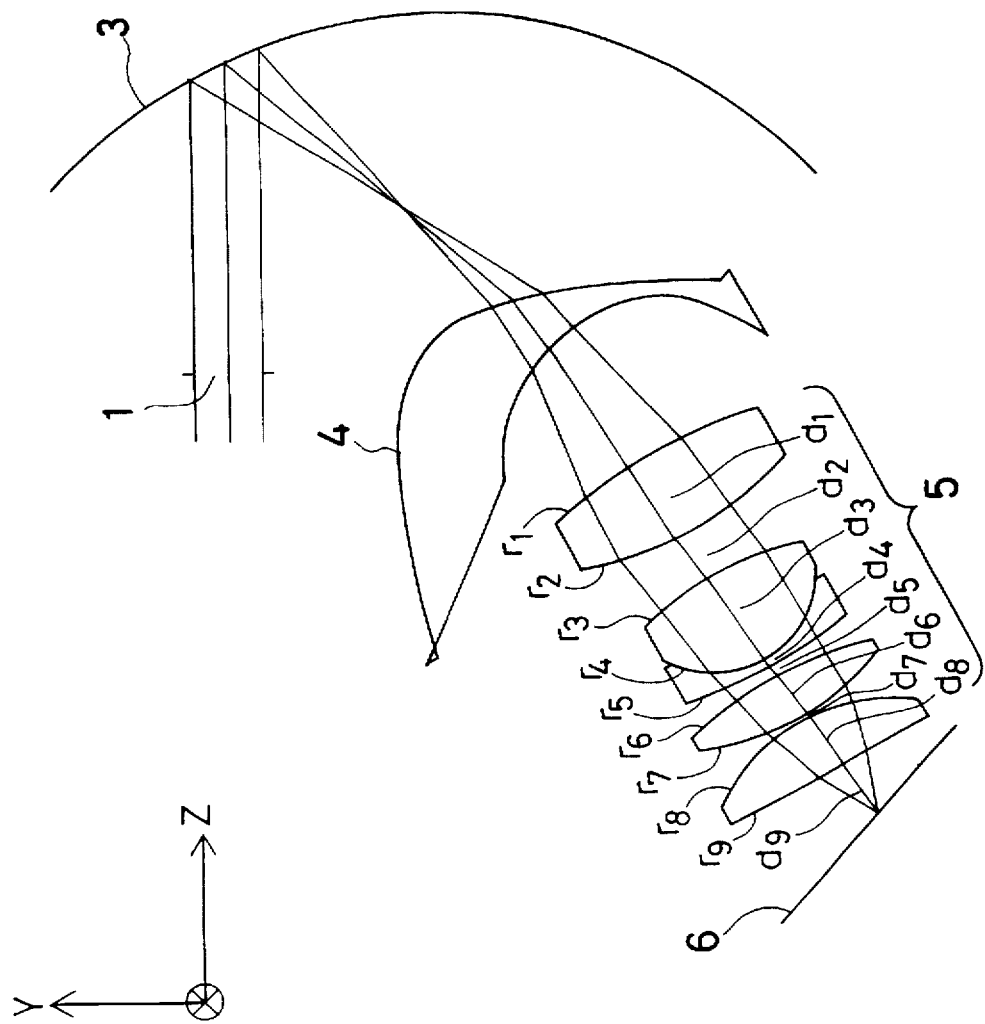
FIG. 25 is a horizontal sectional view showing the optical arrangement of Example 7 of the present invention at 0 diopter.
Figure 26:
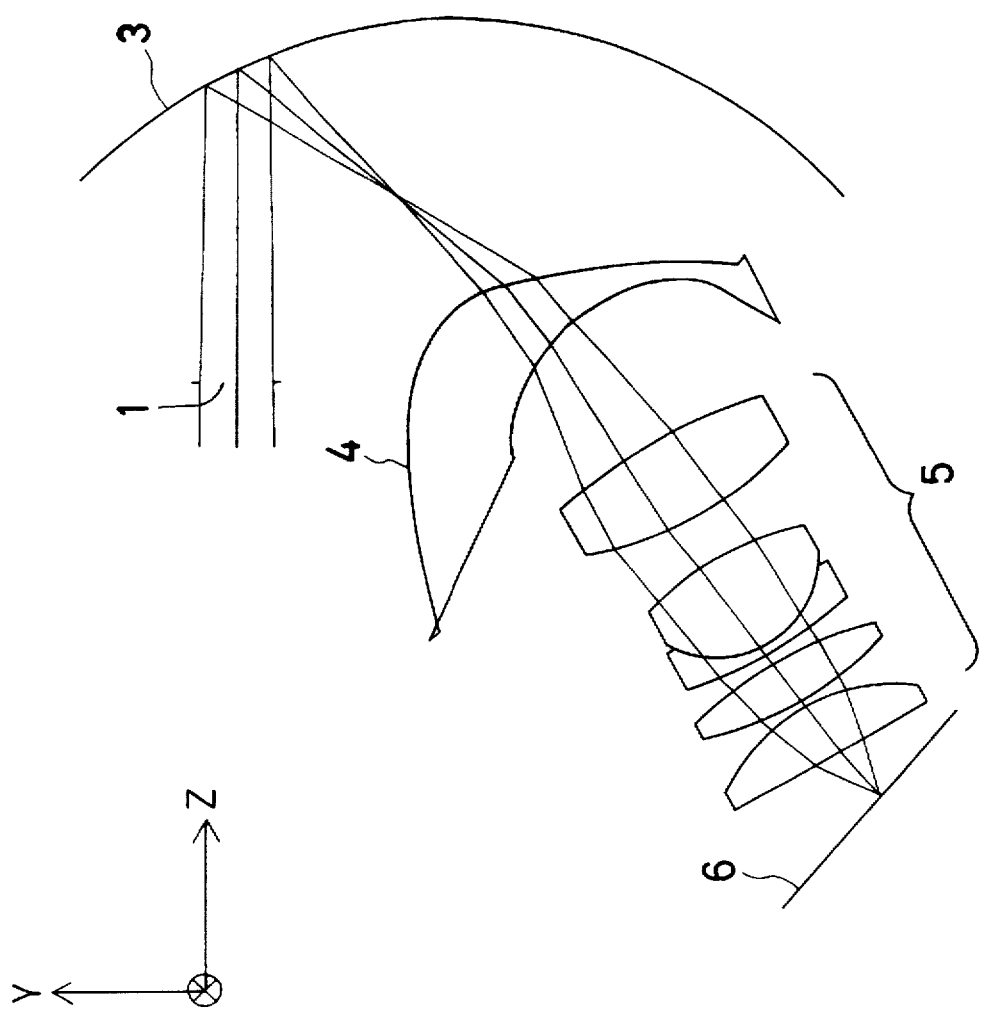
FIG. 26 is a horizontal sectional view showing the optical arrangement of Example 7 at −3 diopters.
Figure 27:
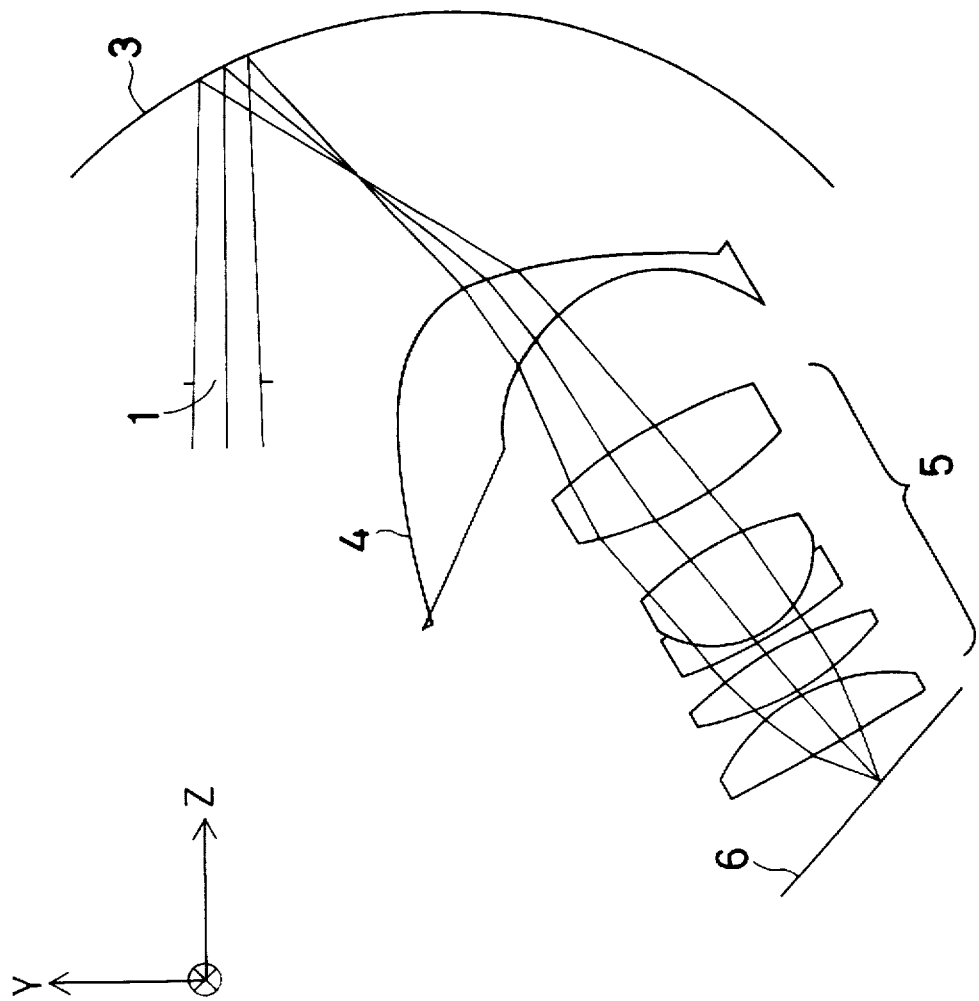
FIG. 27 is a horizontal sectional view showing the optical arrangement of Example 7 at −6 diopters.
Figure 28:
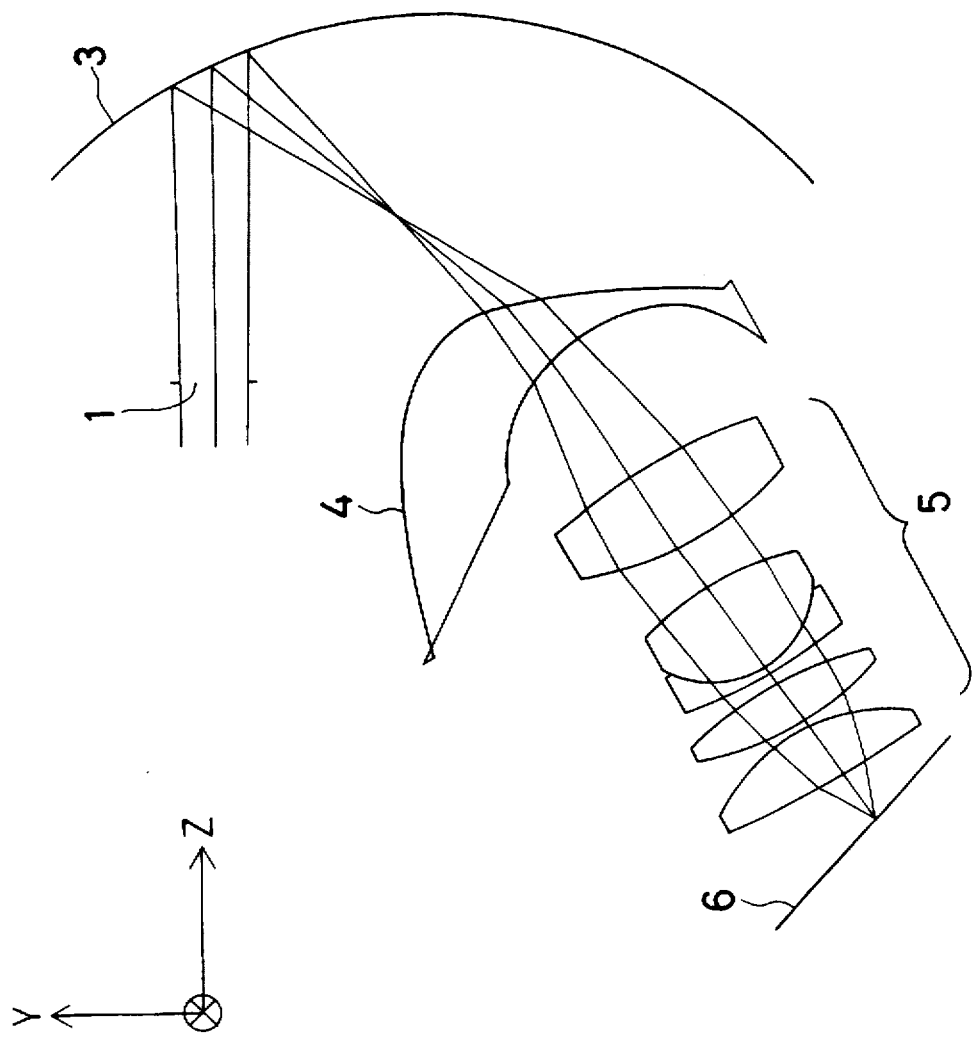
FIG. 28 is a horizontal sectional view showing the optical arrangement of Example 7 at +2 diopters.

FIGS. 25 to 27 show the arrangement of the optical system of Example 7. FIG. 25 shows the layout of the optical system at 0 diopter; FIG. 26 shows the layout at −3 diopters; FIG. 27 shows the layout at −6 diopters; and FIG. 28 shows the layout at +2 diopters. In these figures are shown only a ray on the visual axis and rays which pass through the edge of the pupil 1 and reach a point on the two-dimensional image display device 6 that is on the visual axis. In this example, the decentered correcting optical system 4, the relay optical system 5 and the two-dimensional image display device 6 serve as diopter correcting elements. Diopter correction is effected by simultaneously moving these optical elements. In the case of nearsightedness (FIGS. 26 and 27), the decentered correcting optical system 4, the relay optical system 5 and the two-dimensional image display device 6 move toward the ocular magnifier 3 (Z: plus) and also move upward (Y: plus). In the case of farsightedness, these optical elements move reversely for both Z and Y.

In Example 7, diopter correction can also be effected by moving the decentered correcting optical system 4, the relay optical system 5 and the two-dimensional image display device 6 in parallel along the optical axis of the relay optical system 5.

Figure 29:
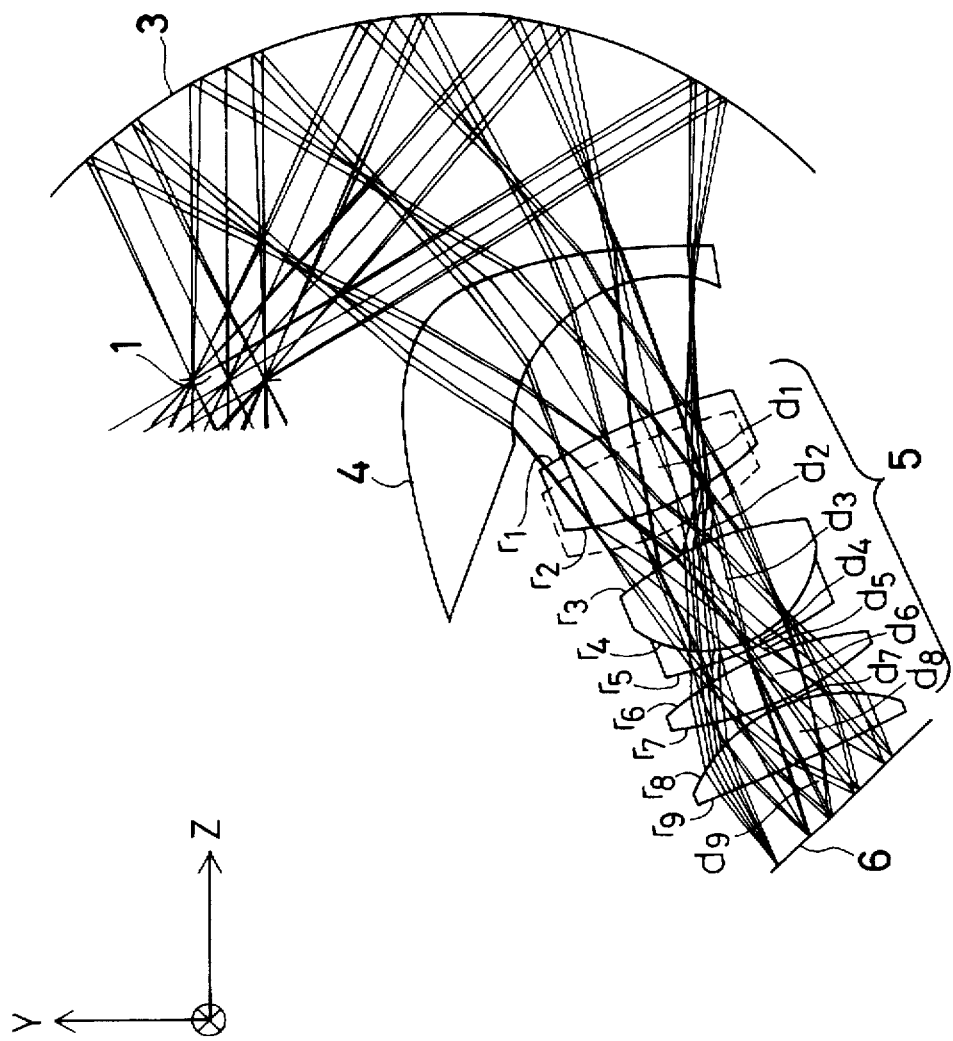
FIG. 29 is a horizontal sectional view showing the optical arrangement of Example 8 of the present invention.

FIG. 29 shows the arrangement of the optical system of Example 8. In the figure, the solid lines show the layout of the optical system at 0 diopter, and the dotted lines show the layout of the optical system at −6 diopters. Ray tracing is made by solid lines for both cases. In this example, the first lens of the relay optical system 5 alone serves as a diopter correcting element. The first lens moves in an off-axis manner according to diopter, thereby effecting diopter correction. However, there is no change in the overall length of the optical system. In the case of nearsightedness, the first lens moves toward the two-dimensional image display device 6 (Z: plus), and also moves upward (Y: plus) as viewed in the figure. In the case of farsightedness, the first lens moves reversely for both Z and Y.

Figure 30:
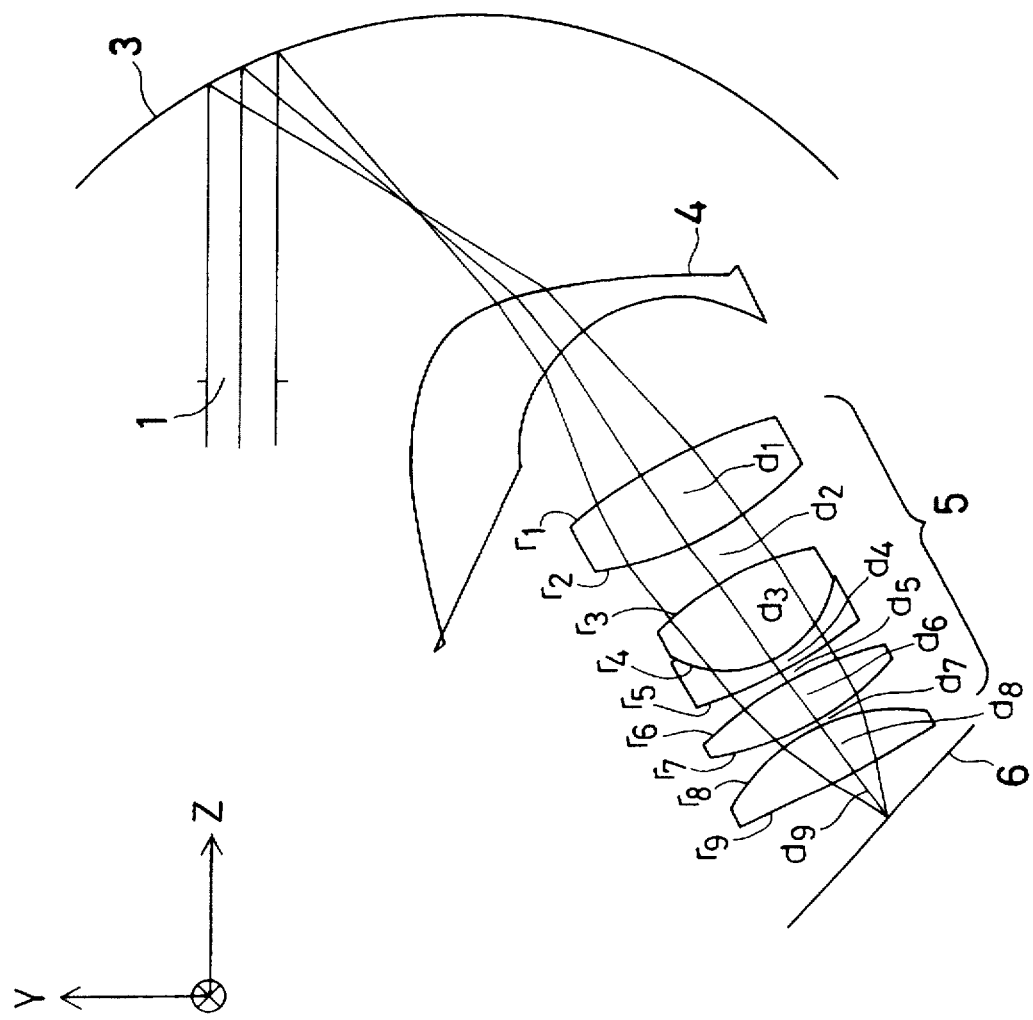
FIG. 30 is a horizontal sectional view showing the optical arrangement of Example 9 of the present invention at 0 diopter.
Figure 31:
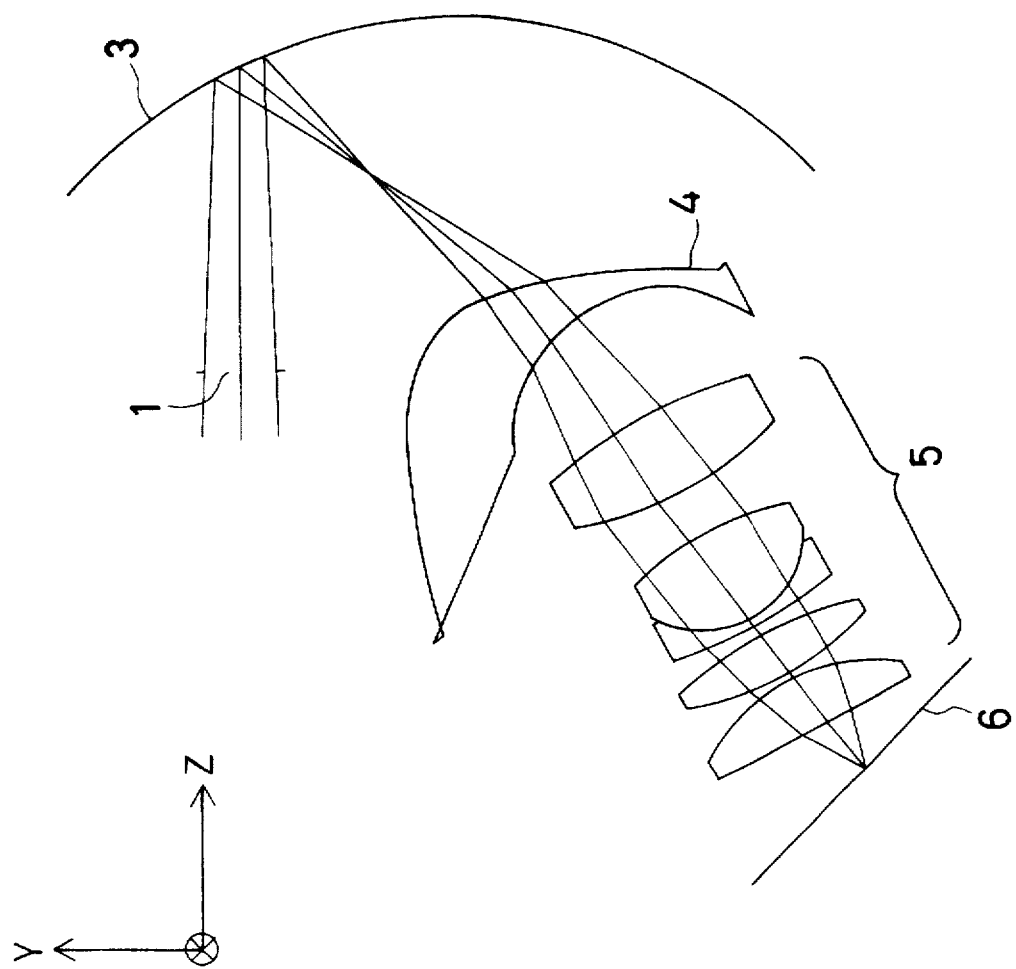
FIG. 31 is a horizontal sectional view showing the optical arrangement of Example 9 at −6 diopters.

FIGS. 30 and 31 show the arrangement of the optical system of Example 9. FIG. 30 shows the layout of the optical system at 0 diopter, and FIG. 31 shows the layout of the optical system at −6 diopters. In these figures are shown only a ray on the visual axis and rays which pass through the edge of the pupil 1 and reach a point on the two-dimensional image display device 6 that is on the visual axis. In this example, the whole relay optical system 5 serves as a diopter correcting element. The whole relay optical system 5 moves along the center axis of the relay optical system 5 in the YZ-plane without changing any spacing in the relay optical system 5, thereby effecting diopter correction. In the case of nearsightedness (FIG. 31), the whole relay optical system 5 moves toward the ocular magnifier 3 (Z: plus) and also move upward (Y: plus) as viewed in the figure. In the case of farsightedness, the whole relay optical system 5 moves reversely for both Z and Y.

Figure 32:
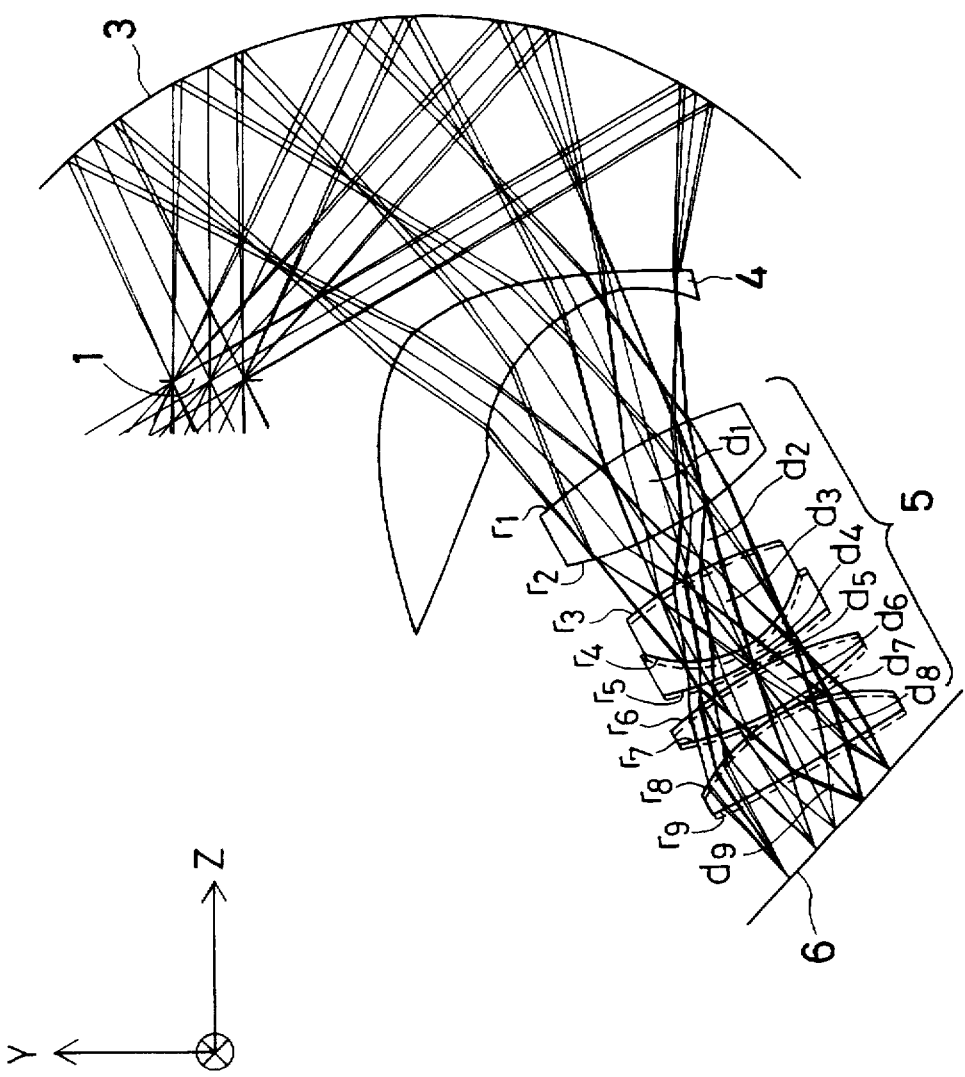
FIG. 32 is a horizontal sectional view showing the optical arrangement of Example 10 of the present invention.

FIG. 32 shows the arrangement of the optical system of Example 10. In the figure, the solid lines show the layout of the optical system at 0 diopter, and the dotted lines show the layout of the optical system at −6 diopters. Ray tracing is made by solid lines for both cases. In this example, only the second to fifth lenses of the relay optical system 5 serve as diopter correcting elements. The second to fifth lenses move in parallel along the center axis of the relay optical system 5, thereby effecting diopter correction. However, there is no change in the overall length of the optical system. In the case of nearsightedness, the second to fifth lenses move toward the two-dimensional image display device 6 as viewed in the figure, whereas, in the case of farsightedness, the second to fifth lenses move in the opposite direction to the above.

Figure 33:
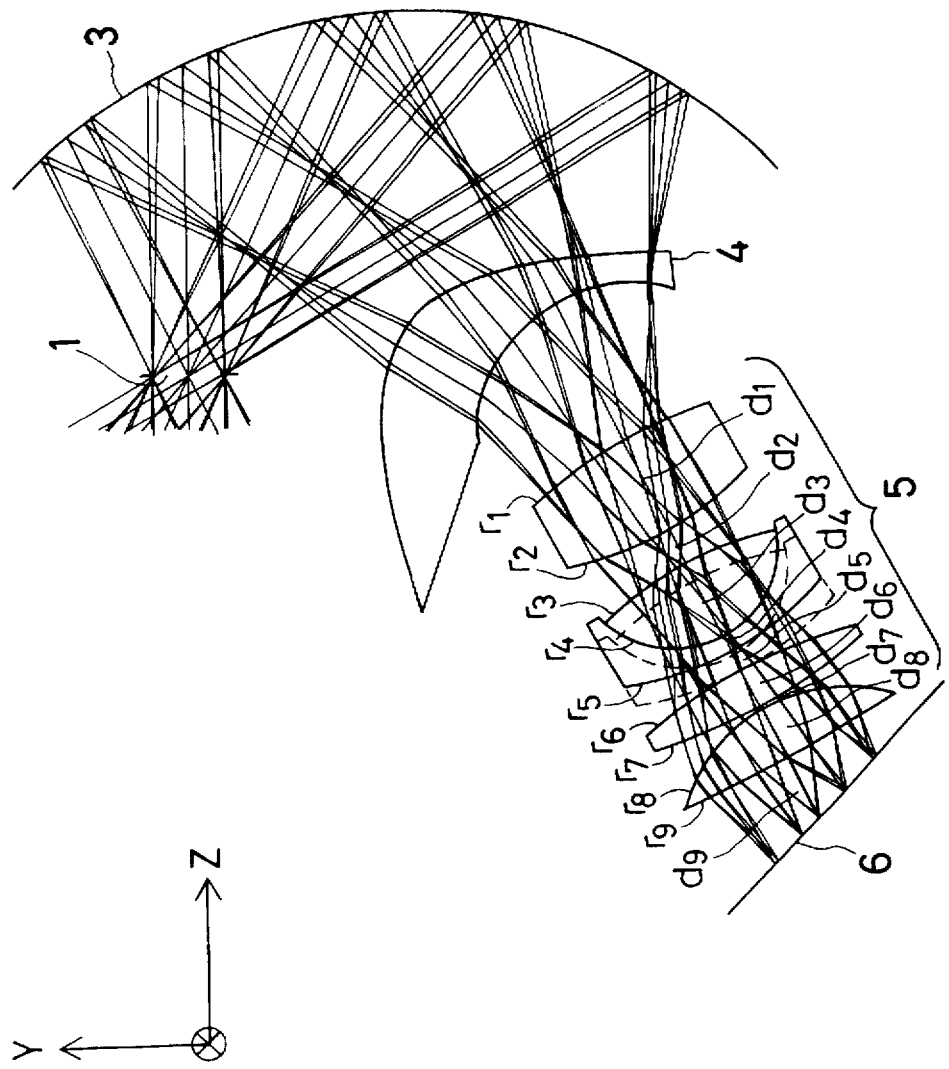
FIG. 33 is a horizontal sectional view showing the optical arrangement of Example 11 of the present invention.

FIG. 33 shows the arrangement of the optical system of Example 11. In the figure, the solid lines show the layout of the optical system at 0 diopter, and the dotted lines show the layout of the optical system at −6 diopters. Ray tracing is made by solid lines for both cases. In this example, only the second and third lenses, which are cemented together, in the relay optical system 5 serve as a diopter correcting element. The cemented lens move along the center axis of the relay optical system 5, thereby effecting diopter correction. However, there is no change in the overall length of the optical system. In the case of nearsightedness, the cemented lens moves toward the two-dimensional image display device 6 as viewed in the figure, whereas, in the case of farsightedness, the cemented lens moves in the opposite direction to the above.

Figure 34:
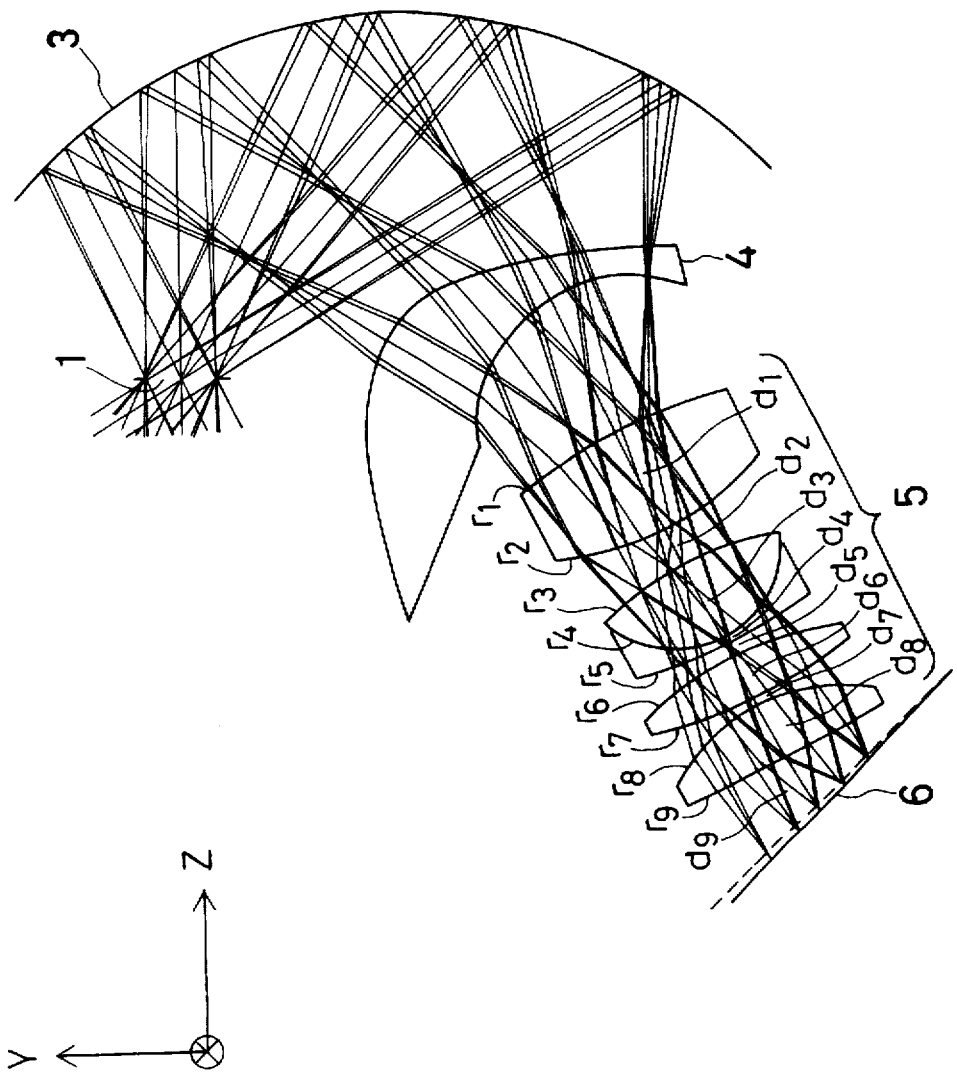
FIG. 34 is a horizontal sectional view showing the optical arrangement of Example 12 of the present invention.

FIG. 34 shows the arrangement of the optical system of Example 12. In the figure, the solid lines show the layout of the optical system at 0 diopter, and the dotted lines show the layout of the optical system at −6 diopters. Ray tracing is made by solid lines for both cases. In this example, only the two-dimensional image display device 6 serves as a diopter correcting element. The two-dimensional image display device 6 moves eccentrically to thereby effect diopter correction. In the case of nearsightedness, the two-dimensional image display device 6 moves so that the distance from the relay optical system 5 to the two-dimensional image display device 6 shortens and in such a manner as to rotate clockwise (A: minus). In the case of farsightedness, the two-dimensional image display device 6 moves so that the distance from the relay optical system 5 to the two-dimensional image display device 6 lengthens and in such a manner as to rotate counterclockwise (A: plus).

In Example 12, diopter correction can also be effected by moving the two-dimensional image display device 6 in a direction parallel to the refracted optical axis exiting from the relay optical system 5.

Constituent parameters of each example will be shown below. It should be noted that the surface Nos. are shown as ordinal numbers in backward tracing from the observer's iris position 1 toward the two-dimensional image display device 6.

As to the amount of decentration (eccentricity) and the tilt angle (inclination angle) in the constituent parameters, the ocular magnifier 3 is given eccentricities in the Y- and Z-axis directions. The eccentricity in the Y-axis direction is a distance by which the vertex of the ocular magnifier 3 decenters in the Y-axis direction from the visual axis (Z-axis direction) passing through the center of the exit pupil 1. The eccentricity in the Z-axis direction is a distance by which the vertex of the ocular magnifier 3 decenters in the Z-axis direction from a reference position given by the surface separation. The decentered correcting optical system 4 is given an eccentricity of the vertex of each of the surfaces from the center of the exit pupil 1 in each of the Y- and Z-axis positive directions, and an angle of inclination of the center axis passing through the vertex of each surface with respect to the Z-axis. The inclination angle of the center axis of each surface is given with the angle of rotation from the axis of the positive direction of the Z-axis toward the axis of the positive direction of the Y-axis (in the counterclockwise direction as viewed in the figure) defined as angle in the positive direction. Regarding the relay optical system 5, the vertex position of the first surface thereof is given in the same way as in the case of each surface of the decentered correcting optical system 4. A center axis that passes through the vertex of the first surface is an optical axis, and the angle of inclination of this optical axis is given in the same way as the above. With regard to the two-dimensional image display device 6, a coordinate system is defined as follows: The optical axis of the relay optical system 5 is taken as Z-axis, where the direction toward the ocular magnifier 3 from the two-dimensional image display device 6 is defined as positive direction; an axis that perpendicularly intersects the Z-axis in the plane of the figure is taken as Y-axis, where the leftward direction of the two-dimensional image display device 6 is defined as positive direction; and an axis normal to the plane of the figure is taken as X-axis, where the downward direction is defined as positive direction. The two-dimensional image display device 6 is given an eccentricity as a distance by which the center thereof shifts in the Y-axis positive direction in the coordinate system, and an angle of inclination of the normal to the surface thereof with respect to the Z-axis.

The non-rotationally symmetric aspherical configuration of each surface of the ocular magnifier 3 and the decentered correcting optical system 4 may be expressed by.

$$Z=[(X^2/R_X)+(Y^2/R_y)]/[1+\{1-(1+K_x)(X^2/R_x^2)-(1+K_y)(Y^2/R_y^2)\}^{1/2}]+AR[(1-AP)X^2+(1+AP)Y^2]^2+BR[(1-BP)X^2+(1+BP)Y^2]^3$$

where $R_y$ is the paraxial curvature radius of each surface in the YZ-plane (the plane of the figure); $R_x$ is the paraxial curvature radius in the XZ-plane; $K_x$ is the conical coefficient in the X-direction; $K_y$ is the conical coefficient in the Y-direction; AR and BR are rotationally symmetric 4th- and 6th-order aspherical coefficients, respectively; and AP and BP are asymmetric 4th- and 6th-order aspherical coefficients, respectively.

Regarding the surface separation, the spacing between the exit pupil 1 and the ocular magnifier 3 is shown as a distance in the Z-axis direction, and the spacing between the first surface of the relay optical system 5 and the image surface thereof (the two-dimensional image display device 6) is shown as a distance along the optical axis thereof. As to the relay optical system 5, the radii of curvature of the surfaces are denoted by $r_1$ to $r_i$, the surface separations by $d_1$ to $d_i$, the refractive indices for the spectral d-line by $n_1$ to $n_i$, and the Abbe's numbers by $v_1$ to $v_i$. It should be noted that the refractive index for the spectral d-line of the medium of the decentered correcting optical system 4 is denoted by n, and the Abbe's number thereof by $v$.

In Examples 5 to 12, the diopter of the basic design is 0 diopter. Amounts of diopter correction are −6 diopters, −3 diopters, and +2 diopters. As the amount of movement of the diopter correcting element, the surface separation or eccentricity or inclination angle corresponding to each amount of diopter correction are shown in order.

| Example 1 | | | | |
|---|---|---|---|---|
| Surface No. | Radius of curvature | Surface separation | Refractive index (Eccentricity) | Abbe's No. (Inclination angle) |
| 1 (1) | ∞(pupil) | 52.937 | | |
| 2 (3) | $R_y$ −70.986 | 0 | Y: −30.399 | A: 0.000° |
| | $R_x$ −55.670 | | Z: 0.000 | |
| | $K_y$ −0.135913 | | | |
| | $K_x$ 0.016895 | | | |
| | AR 0.165065 × $10^{-6}$ | | | |
| | BR −0.357359 × $10^{-10}$ | | | |
| | AP −1.10375 | | | |
| | BP −1.38177 | | | |
| 3 (4) | $R_y$ −13.310 | 0 | n = 1.492410 | $v$ = 57.7 |
| | $R_x$ −25.812 | | Y: −24.295 | A: 57.353° |
| | $K_y$ −1.238838 | | Z: 5.491 | |
| | $K_x$ −1.338735 | | | |
| | AR −0.457589 × $10^{-5}$ | | | |
| | BR −0.696261 × $10^{-10}$ | | | |
| | AP −1.80420 | | | |
| | BP −1.91510 | | | |
| 4 | $R_y$ −22.873 | 0 | Y: −54.239 | A: 25.312° |
| | $R_x$ −38.381 | | Z: 10.878 | |
| | $K_y$ −0.219669 | | | |
| | $K_x$ 6.895198 | | | |
| | AR −0.13467 × $10^{-4}$ | | | |
| | BR −0.811146 × $10^{-10}$ | | | |
| | AP −0.214307 | | | |
| | BP 4.23122 | | | |
| 5 ($r_1$) | −54.563 | ($d_1$) −12.012 | $n_1$ = 1.65518 | $v_1$ = 54.2 |
| | | | Y: −59.457 | A: 29.819° |
| | | | Z: −8.794 | |
| 6 ($r_2$) | 37.853 | ($d_2$) −10.295 | | |
| 7 ($r_3$) | −48.164 | ($d_3$) −9.954 | $n_2$ = 1.60958 | $v_2$ = 60.8 |
| 8 ($r_4$) | 17.835 | ($d_4$) −1 | $n_3$ = 1.75500 | $v_3$ = 27.6 |
| 9 ($r_5$) | 115.840 | ($d_5$) −1 | | |
| 10 ($r_6$) | −61.279 | ($d_6$) −7.098 | $n_4$ = 1.51922 | $v_4$ = 67.2 |
| 11 ($r_7$) | 68.453 | ($d_7$) −0.5 | | |
| 12 ($r_8$) | −26.153 | ($d_8$) −10.534 | $n_5$ = 1.60007 | $v_5$ = 61.4 |
| 13 ($r_9$) | −232.494 | ($d_9$) −8.705 | | |
| 14 (6) | ∞(image) | | Y: −2.387 | A: 18.330° |
| (1) $|R_{ym}/Exp\ I|$ = 1.34 | | | | |
| (2) $\theta_1$ = 17.35° | | | | |
| (3) $R_{y1}/R_{y2}$ = 0.58 | | | | |

| Example 2 | | | | |
|---|---|---|---|---|
| Surface No. | Radius of curvature | Surface separation | Refractive index (Eccentricity) | Abbe's No. (Inclination angle) |
| 1 (1) | ∞(pupil) | 53.193 | | |
| 2 (3) | $R_y$ −73.925 | 0 | Y: −31.587 | A: 0.000° |
| | $R_x$ −56.047 | | Z: 0.000 | |
| | $K_y$ −0.121576 | | | |
| | $K_x$ −0.002027 | | | |
| | AR 0 | | | |
| | BR 0 | | | |

-continued

| | | | | | |
|---|---|---|---|---|---|
| 3 (4) | AP | 0 | | | |
| | $R_y$ | −17.937 | 0 | n = 1.620000 | ν = 60.3 |
| | $R_x$ | −39.743 | | Y: −26.565 | A: 64.820° |
| | $K_y$ | −0.864551 | | Z: 3.376 | |
| | $K_x$ | 1.244101 | | | |
| | AR | 0 | | | |
| | BR | 0 | | | |
| | AP | 0 | | | |
| | BP | 0 | | | |
| 4 | $R_y$ | −22.713 | 0 | Y: −47.798 | A: 47.700° |
| | $R_x$ | −22.032 | | Z: 8.592 | |
| | $K_y$ | −0.467511 | | | |
| | $K_x$ | 0.697794 | | | |
| | AR | 0 | | | |
| | BR | 0 | | | |
| | AP | 0 | | | |
| | BP | 0 | | | |
| 5 ($r_1$) | | −47.696 | ($d_1$) −19.179 | $n_1$ = 1.62189 | $v_1$ = 59.9 |
| | | | | Y: −59.607 | A: 29.495° |
| | | | | Z: −5.653 | |
| 6 ($r_2$) | | 37.907 | ($d_2$) −8.797 | | |
| 7 ($r_3$) | | −41.178 | ($d_3$) −7.459 | $n_2$ = 1.57325 | $v_2$ = 63.0 |
| 8 ($r_4$) | | 18.809 | ($d_4$) −1 | $n_3$ = 1.75500 | $v_3$ = 27.6 |
| 9 ($r_5$) | | 98.492 | ($d_5$) −4.484 | | |
| 10 ($r_6$) | | −47.373 | ($d_6$) −7.908 | $n_4$ = 1.62000 | $v_4$ = 60.3 |
| 11 ($r_7$) | | 99.015 | ($d_7$) −0.1 | | |
| 12 ($r_8$) | | −25.681 | ($d_8$) −13.617 | $n_5$ = 1.62000 | $v_5$ = 60.3 |
| 13 ($r_9$) | | 67.228 | ($d_9$) −1 | $n_6$ = 1.75500 | $v_6$ = 27.6 |
| 14 ($r_{10}$) | | −280.298 | ($d_{10}$) −5.255 | | |
| 15 (6) | | ∞(image) | | Y: −3.444 | A: 15.880° |

(1) $|R_{ym}/E_{xp}|$ = 1.39
(2) $\theta_1$ = 24.82°
(3) $R_{y1}/R_{y2}$ = 0.79

Example 3

| Surface No. | | Radius of curvature | Surface separation | Refractive index (Eccentricity) | Abbe's No. (Inclination angle) |
|---|---|---|---|---|---|
| 1 (1) | | ∞(pupil) | 53.111 | | |
| 2 (3) | $R_y$ | −74.090 | 0 | Y: −31.367 | A: 0.000° |
| | $R_x$ | −57.656 | | Z: 0.000 | |
| | $K_y$ | −0.019788 | | | |
| | $K_x$ | 0.052441 | | | |
| | AR | 0 | | | |
| | BR | 0 | | | |
| | AP | 0 | | | |
| | BP | 0 | | | |
| 3 (4) | $R_y$ | −18.246 | 0 | n = 1.57802 | ν = 62.7 |
| | $R_x$ | −43.172 | | Y: −27.076 | A: 54.715° |
| | $K_y$ | −1.142012 | | Z: 6.016 | |
| | $K_x$ | 1.561471 | | | |
| | AR | 0 | | | |
| | BR | 0 | | | |
| | AP | 0 | | | |
| | BP | 0 | | | |
| 4 | $R_y$ | −24.911 | 0 | Y: −49.319 | A: 33.687° |
| | $R_x$ | −31.173 | | Z: 5.162 | |
| | $K_y$ | −0.127403 | | | |
| | $K_x$ | 2.912338 | | | |
| | AR | 0 | | | |
| | BR | 0 | | | |
| | AP | 0 | | | |
| | BP | 0 | | | |
| 5 ($r_1$) | | −39.173 | ($d_1$) −9.020 | $n_1$ = 1.75000 | $v_1$ = 25.0 |
| | | | | Y: −58.382 | A: 33.687° |
| | | | | Z: −5.795 | |
| 6 ($r_2$) | | −17.289 | ($d_2$) −11.270 | $n_2$ = 1.70000 | $v_2$ = 35.0 |
| 7 ($r_3$) | | 39.426 | ($d_3$) −3.284 | | |
| 8 ($r_4$) | | −40.170 | ($d_4$) −8.804 | $n_3$ = 1.62000 | $v_3$ = 60.3 |
| 9 ($r_5$) | | 16.227 | ($d_5$) −1 | $n_4$ = 1.75500 | $v_4$ = 27.6 |
| 10 ($r_6$) | | 80.847 | ($d_6$) −4.432 | | |
| 11 ($r_7$) | | −48.678 | ($d_7$) −8.248 | $n_5$ = 1.62000 | $v_5$ = 60.3 |
| 12 ($r_8$) | | 65.536 | ($d_8$) −0.221 | | |
| 13 ($r_9$) | | −25.065 | ($d_9$) −9.852 | $n_6$ = 1.71554 | $v_6$ = 47.1 |
| 14 ($r_{10}$) | | −70.239 | ($d_{10}$) −4.792 | | |
| 15 (6) | | ∞(image) | | Y: −1.482 | A: 15.041° |

-continued (1) $|R_{ym}/E_{xp}|$ = 1.40
(2) $\theta_1$ = 14.71°
(3) $R_{y1}/R_{y2}$ = 0.73

Example 4

| Surface No. | | Radius of curvature | Surface separation | Refractive index (Eccentricity) | Abbe's No. (Inclination angle) |
|---|---|---|---|---|---|
| 1 (1) | | ∞(pupil) | 53.274 | | |
| 2 (3) | $R_y$ | −73.049 | 0 | Y: −30.301 | A: 0.000° |
| | $R_x$ | −57.175 | | Z: 0.000 | |
| 3 (4) | $R_y$ | −17.366 | 0 | n = 1.52955 | ν = 66.2 |
| | $R_x$ | −30.921 | | Y: −25.702 | A: 61.081° |
| | $K_y$ | −0.807948 | | Z: 4.397 | |
| | $K_x$ | 0 | | | |
| | AR | 0 | | | |
| | BR | 0 | | | |
| | AP | 0 | | | |
| | BP | 0 | | | |
| 4 | | −22.473 | 0 | Y: −46.740 | A: 46.460° |
| | | | | Z: 4.511 | |
| 5 ($r_1$) | | −43.557 | ($d_1$) −14.786 | $n_1$ = 1.75500 | $v_1$ = 27.6 |
| | | | | Y: −56.346 | A: 34.010° |
| | | | | Z: −5.506 | |
| 6 ($r_2$) | | −25.022 | ($d_2$) −7.163 | $n_2$ = 1.74185 | $v_2$ = 44.9 |
| 7 ($r_3$) | | 44.490 | ($d_3$) −1.059 | | |
| 8 ($r_4$) | | −39.357 | ($d_4$) −11.045 | $n_3$ = 1.59962 | $v_3$ = 61.4 |
| 9 ($r_5$) | | 14.667 | ($d_5$) −1.880 | $n_4$ = 1.75500 | $v_4$ = 27.6 |
| 10 ($r_6$) | | 54.956 | ($d_6$) −4.503 | | |
| 11 ($r_7$) | | −49.367 | ($d_7$) −7.723 | $n_5$ = 1.73584 | $v_5$ = 45.4 |
| 12 ($r_8$) | | 67.508 | ($d_8$) −0.487 | | |
| 13 ($r_9$) | | −24.369 | ($d_9$) −8.229 | $n_6$ = 1.67363 | $v_6$ = 51.7 |
| 14 ($r_{10}$) | | −47.303 | ($d_{10}$) −5.210 | | |
| 15 (6) | | ∞(image) | | Y: −1.469 | A: 14.501° |

(1) $|R_{ym}/E_{xp}|$ = 1.37
(2) $\theta_1$ = 21.08°
(3) $R_{y1}/R_{y2}$ = 0.77

Example 5

| Surface No. | | Radius of curvature | Surface separation | Refractive index (Eccentricity) | Abbe's No. (Inclination angle) |
|---|---|---|---|---|---|
| 1 (1) | | ∞(pupil) | 53.085 | | |
| 2 (3) | $R_y$ | −73.261 | 0.000 | Y: −31.020 | A: 0.000° |
| | $R_x$ | −57.4666 | | Z: 0.000 | |
| | $K_y$ | 0.042534 | | | |
| | $K_x$ | 0.158972 | | | |
| | AR | 0.194999 × $10^{-6}$ | | | |
| | BR | −0.121401 × $10^{-10}$ | | | |
| | AP | −0.716898 | | | |
| | BP | −1.87289 | | | |

Amount of Diopter Correction

| | 0 D | −3 D | −6 D | +2 D |
|---|---|---|---|---|
| Y: | −31.020 | −30.836 | −30.898 | −31.056 |
| Z: | 0.000 | −1.627 | −3.651 | 1.165 |

| | | | | | |
|---|---|---|---|---|---|
| 3 (4) | $R_y$ | −13.488 | 0.000 | n = 1.48700 | ν = 70.4 |
| | $R_x$ | −34.244 | | Y: −29.708 | A: 51.600° |
| | $K_y$ | −1.881629 | | Z: 4.659 | |
| | $K_x$ | −1.761358 | | | |
| | AR | −0.330456 × $10^{-5}$ | | | |
| | BR | 0.305923 × $10^{-13}$ | | | |
| | AP | −1.90466 | | | |
| | BP | 0.189389 × $10^{+2}$ | | | |
| 4 | $R_x$ | −24.745 | 0.000 | Y: −53.649 | A: 27.011° |
| | $R_x$ | −48.961 | | Z: 9.443 | |
| | $K_y$ | −0.433533 8.516905 | | | |
| | AR | −0.188793 × $10^{-4}$ | | | |
| | BR | −0.254236 × | | | |

-continued

|  |  | $10^{-8}$ |  |  |  |
|---|---|---|---|---|---|
|  | AP | $-0.364870$ |  |  |  |
|  | BP | $1.26182$ |  |  |  |
| 5 ($r_1$) |  | $-75.875$ | ($d_1$) $-13.313$ | $n_1 = 1.65506$ | $v_1 = 54.2$ |
|  |  |  |  | Y: $-62.441$ | A: $28.541°$ |
|  |  |  |  | Z: $-11.132$ |  |
| 6 ($r_2$) |  | $47.757$ | ($d_2$) $-6.630$ |  |  |
| 7 ($r_3$) |  | $-43.357$ | ($d_3$) $-14.180$ | $n_2 = 1.60730$ | $v_2 = 61.0$ |
| 8 ($r_4$) |  | $14.881$ | ($d_4$) $-1.768$ | $n_3 = 1.75500$ | $v_3 = 27.6$ |
| 9 ($r_5$) |  | $77.898$ | ($d_5$) $-1.922$ |  |  |
| 10 ($r_6$) |  | $-60.167$ | ($d_6$) $-6.740$ | $n_4 = 1.52422$ | $v_4 = 66.7$ |
| 11 ($r_7$) |  | $45.128$ | ($d_7$) $-0.500$ |  |  |
| 12 ($r_8$) |  | $-26.477$ | ($d_8$) $-8.783$ | $n_5 = 1.64862$ | $v_5 = 55.2$ |
| 13 ($r_9$) |  | $542.733$ | ($d_9$) $-8.575$ |  |  |
| 14 (6) |  | ∞(image) |  | Y: $-3.299$ | A: $20.069°$ |

(1) $|R_{ym}/E_{xp}| = 1.38$
(2) $\theta_1 = 11.60°$
(3) $R_y/R_{y2} = 0.55$

Example 6

| Surface No. |  | Radius of curvature | Surface separation | Refractive index (Eccentricity) | Abbe's No. (Inclination angle) |
|---|---|---|---|---|---|
| 1 (1) |  | ∞(pupil) | 53.076 |  |  |
| 2 (3) | $R_y$ | $-73.399$ | 0.000 | Y: $-31.160$ | A: $0.000°$ |
|  | $R_x$ | $-55.786$ |  | Z: $0.000$ |  |
|  | $K_y$ | $0.025030$ |  |  |  |
|  | $K_x$ | $0.105299$ |  |  |  |
|  | AR | $0.192134 \times 10^{-6}$ |  |  |  |
|  | BR | $-0.845925 \times 10^{-11}$ |  |  |  |
|  | AP | $-0.679221$ |  |  |  |
|  | BP | $-1.99742$ |  |  |  |
| 3 (4) | R | $-13.871$ | 0.000 | $n = 1.48757$ | $v = 70.4$ |
|  | $R_x$ | $-50.632$ |  | Y: $-30.520$ | A: $52.349°$ |
|  | $K_y$ | $-1.760226$ |  | Z: $5.033$ |  |
|  | $K_x$ | $-1.980652$ |  |  |  |
|  | AR | $-0.327338 \times 10^{-5}$ |  |  |  |
|  | BR | $0.168168 \times 10^{-14}$ |  |  |  |
|  | AP | $-1.85576$ |  |  |  |
|  | BP | $0.184379 \times 10^{+2}$ |  |  |  |

Amount of Diopter Correction

|  | 0 D | $-3$ D | $-6$ D | $+2$ D |
|---|---|---|---|---|
| Y: | $-30.520$ | $-31.203$ | $-32.056$ | $-29.810$ |
| Z: | $5.033$ | $6.051$ | $6.586$ | $4.973$ |
| 4 | $R_x$ $-26.601$ | 0.000 | Y: $-54.878$ | A: $30.078°$ |
|  | $R_x$ $-46.355$ |  | Z: $9.483$ |  |
|  | $K_y$ $-0.323741$ |  |  |  |
|  | $K_x$ $9.225767$ |  |  |  |
|  | AR $-0.171300 \times 10^{-4}$ |  |  |  |
|  | BR $-0.225926 \times 10^{-8}$ |  |  |  |
|  | AP $-0.280508$ |  |  |  |
|  | BP $1.21717$ |  |  |  |

Amount of Diopter Correction

|  | 0 D | $-3$ D | $-6$ D | $+2$ D |
|---|---|---|---|---|
| Y: | $-54.878$ | $-55.561$ | $-56.414$ | $-54.168$ |
| Z: | $9.483$ | $10.501$ | $11.037$ | $9.424$ |
| 5 ($r_1$) | $-127.947$ | ($d_1$) $-15.585$ | $n_1 = 1.65610$ | $v_1 = 51.4$ |
|  |  |  | Y: $-62.930$ | A: $23.299°$ |
|  |  |  | Z: $-11.047$ |  |
| 6 ($r_2$) | $38.998$ | ($d_2$) $-7.840$ |  |  |
| 7 ($r_3$) | $-41.886$ | ($d_3$) $-11.552$ | $n_2 = 1.60813$ | $v_2 = 60.9$ |
| 8 ($r_4$) | $15.524$ | ($d_4$) $-1.024$ | $n_4 = -1.75500$ | $v_3 = 27.6$ |
| 9 ($r_5$) | $115.961$ | ($d_5$) $-2.833$ |  |  |
| 10 ($r_6$) | $-46.408$ | ($d_6$) $-6.991$ | $n_4 = 1.538969$ | $v_4 = 65.5$ |
| 11 ($r_7$) | $54.373$ | ($d_7$) $-0.100$ |  |  |
| 12 ($r_8$) | $-22.182$ | ($d_8$) $-8.670$ | $n_5 = 1.67345$ | $v_5 = 51.7$ |
| 13 ($r_9$) | $-286.952$ | ($d_9$) $-8.108$ |  |  |
| 14 (6) | ∞(image) |  | Y: $-4.107$ | A: $17.591°$ |

(1) $|R_{ym}/E_{xp}| = 1.38$

-continued (2) $\theta_1 = 12.35°$
(3) $R_{y1}/R_{y2} = 0.52$

Example 7

| Surface No. |  | Radius of curvature | Surface separation | Refractive index (Eccentricity) | Abbe's No. (Inclination angle) |
|---|---|---|---|---|---|
| 1 (1) |  | ∞(pupil) | 52.110 |  |  |
| 2 (3) | $R_y$ | $-73.386$ | 0.000 | Y: $-30.399$ | A: $0.000°$ |
|  | $R_x$ | $-57.821$ |  | Z: $0.000$ |  |
|  | $K_y$ | $-0.013413$ |  |  |  |
|  | $K_x$ | $0.187077$ |  |  |  |
|  | AR | $0.211715 \times 10^{-6}$ |  |  |  |
|  | BR | $-0.123706 \times 10^{-10}$ |  |  |  |
|  | AP | $-0.699451$ |  |  |  |
|  | BP | $-1.87248$ |  |  |  |
| 3 (4) | $R_y$ | $-13.448$ | 0.000 | $n = 1.49557$ | $v = 68.1$ |
|  | $R_x$ | $-33.307$ |  | Y: $-29.775$ | A: $51.842°$ |
|  | $K_y$ | $-1.812411$ |  | Z: $3.756$ |  |
|  | $K_x$ | $-1.78282$ |  |  |  |
|  | AR | $-0.333342 \times 10^{-5}$ |  |  |  |
|  | BR | $0.172171 \times 10^{-10}$ |  |  |  |
|  | AP | $-1.88807$ |  |  |  |
|  | BP | $0.245019 \times 10^{-2}$ |  |  |  |

Amount of Diopter Correction

|  | 0 D | $-3$ D | $-6$ D | $+2$ D |
|---|---|---|---|---|
| Y: | $-29.775$ | $-28.894$ | $-28.444$ | $-31.073$ |
| Z: | $3.756$ | $6.369$ | $7.904$ | $2.578$ |
| 4 | $R_y$ $-24.579$ | 0.000 | Y: $-54.132$ | A: $27.011°$ |
|  | $R_x$ $-48.534$ |  | Z: $8.204$ |  |
|  | $K_y$ $-0.454147$ |  |  |  |
|  | $K_x$ $8.753754$ |  |  |  |
|  | AR $-0.173802 \times 10^{-4}$ |  |  |  |
|  | BR $-0.221562 \times 10^{-10}$ |  |  |  |
|  | AP $-0.363497$ |  |  |  |
|  | BP $1.21388$ |  |  |  |

Amount of Diopter Correction

|  | 0 D | $-3$ D | $-6$ D | $+2$ D |
|---|---|---|---|---|
| Y: | $-54.132$ | $-53.251$ | $-52.802$ | $-55.431$ |
| Z: | $8.204$ | $10.820$ | $12.355$ | $7.028$ |
| 5 ($r_1$) | $-74.068$ | ($d_1$) $-12.780$ | $n_1 = 1.65830$ | $v_1 = 53.4$ |
|  |  |  | Y: $-63.115$ | A: $28.141°$ |
|  |  |  | Z: $-12.357$ |  |

Amount of Diopter Correction

|  | 0 D | $-3$ D | $-6$ D | $+2$ D |
|---|---|---|---|---|
| Y: | $-63.115$ | $-62.234$ | $-61.785$ | $-64.414$ |
| Z: | $-12.357$ | $-9.741$ | $-8.206$ | $13.533$ |
| 6 ($r_2$) | $48.464$ | ($d_2$) $-6.953$ |  |  |
| 7 ($r_3$) | $-43.580$ | ($d_3$) $-14.638$ | $n_2 = 1.60673$ | $v_2 = 61.0$ |
| 8 ($r_4$) | $14.806$ | ($d_4$) $-1.090$ | $n_3 = 1.75500$ | $v_3 = 27.6$ |
| 9 ($r_5$) | $77.638$ | ($d_5$) $-1.930$ |  |  |
| 10 ($r_6$) | $-57.886$ | ($d_6$) $-6.840$ | $n_4 = 1.52095$ | $v_4 = 67.0$ |
| 11 ($r_7$) | $47.786$ | ($d_7$) $-0.500$ |  |  |
| 12 ($r_8$) | $-26.205$ | ($d_8$) $-8.790$ | $n_5 = 1.64407$ | $v_5 = 55.9$ |
| 13 ($r_9$) | $633.324$ | ($d_9$) $-8.587$ |  |  |
| 14 (6) | ∞(image) |  | Y: $-3.335$ | A: $20.331°$ |

(1) $|R_{ym}/E_{xp}| = 1.41$
(2) $\theta_1 = 11.84°$
(3) $R_{y1}/R_{y2} = 0.55$

Example 8

| Surface No. |  | Radius of curvature | Surface separation | Refractive index (Eccentricity) | Abbe's No. (Inclination angle) |
|---|---|---|---|---|---|
| 1 (1) |  | ∞(pupil) | 50.101 |  |  |
| 2 (3) | $R_x$ | $-73.598$ | 0.000 | Y: $-31.260$ | A: $0.000°$ |

-continued

|  |  |  |  |  |  |
|---|---|---|---|---|---|
|  | $R_x$ | −56.177 |  | Z: 0.000 |  |
|  | $K_y$ | 0.016637 |  |  |  |
|  | $K_x$ | 0.032646 |  |  |  |
|  | AR | $0.139699 \times 10^{-6}$ |  |  |  |
|  | BR | $-0.317892 \times 10^{-11}$ |  |  |  |
|  | AP | −0.657673 |  |  |  |
|  | BP | −2.44464 |  |  |  |
| 3 (4) | $R_x$ | −13.756 | 0.000 | n = 1.487000 | ν = 70.4 |
|  | $R_x$ | −34.115 |  | Y: −29.353 | A: 54.266° |
|  | $K_y$ | −1.632557 |  | Z: 6.699 |  |
|  | $K_x$ | −2.108747 |  |  |  |
|  | AR | $-0.290348 \times 10^{-5}$ |  |  |  |
|  | BR | $0.255039 \times 10^{-13}$ |  |  |  |
|  | AP | −1.92215 |  |  |  |
|  | BP | 0.188898 | $\times 10^{+2}$ |  |  |
| 4 | $R_y$ | −26.430 | 0.000 | Y: −53.886 | A: 30.281° |
|  | $R_x$ | −48.040 |  | Z: 10.034 |  |
|  | $K_y$ | −0.313689 |  |  |  |
|  | $K_x$ | 9.414019 |  |  |  |
|  | AR | $-0.175022 \times 10^{-4}$ |  |  |  |
|  | BR | $-0.244922 \times 10^{-8}$ |  |  |  |
|  | AP | −0.14822 |  |  |  |
|  | BP | 1.11464 |  |  |  |
| 5 ($r_1$) |  | −108.846 | ($d_1$) −13.314 | $n_1$ = 1.65830 | $\nu_1$ = 53.4 |
|  |  |  |  | Y: −60.686 | A: 23.279° |
|  |  |  |  | Z: −11.426 |  |

Amount of Diopter Correction

|  | 0 D | −3 D | −6 D | +2 D |
|---|---|---|---|---|
| Y: | −60.686 | −60.916 | −60.231 | −60.688 |
| Z: | −11.426 | −9.596 | −8.022 | −12.485 |
| A: | 23.279° | 23.317° | 23.141° | 22.974° |

| 6 ($r_2$) | 43.058 | ($d_2$) −0.100 |  |  |
|---|---|---|---|---|
| 7 ($r_3$) | −42.178 | ($d_3$) −15.611 | $n_2$ = 1.60862 | $\nu_2$ = 60.9 |
| 8 ($r_4$) | 16.393 | ($d_4$) −1.000 | $n_3$ = 1.75500 | $\nu_3$ = 27.6 |
| 9 ($r_5$) | 86.440 | ($d_5$) −1.840 |  |  |
| 10 ($r_6$) | −46.337 | ($d_6$) −7.033 | $n_4$ = 1.53277 | $\nu_4$ = 66.0 |
| 11 ($r_7$) | 57.156 | ($d_7$) −0.500 |  |  |
| 12 ($r_8$) | −23.786 | ($d_8$) −8.478 | $n_5$ = 1.60729 | $\nu_5$ = 59.4 |
| 13 ($r_9$) | ∞ | ($d_9$) −8.124 |  |  |
| 14 (6) | ∞(image) |  | Y: −4.261 | A: 20.851° |

(1) $|R_{ym}/E_{xp}| = 1.47$
(2) $\theta_1 = 14.27°$
(3) $R_{y1}/R_{y2} = 0.52$

Example 9

| Surface No. |  | Radius of curvature | Surface separation | Refractive index (Eccentricity) | Abbe's No. (Inclination angle) |
|---|---|---|---|---|---|
| 1 (1) |  | ∞(pupil) | 53.097 |  |  |
| 2 (3) | $R_y$ | −73.663 | 0.000 | Y: −31.260 | A: 0.000° |
|  | $R_x$ | −57.403 |  | Z: 0.000 |  |
|  | $K_y$ | 0.013905 |  |  |  |
|  | $K_x$ | 0.161335 |  |  |  |
|  | AR | $0.198843 \times 10^{-6}$ |  |  |  |
|  | BR | $-0.121967 \times 10^{-10}$ |  |  |  |
|  | AP | −0.7245 |  |  |  |
|  | BP | −1.82362 |  |  |  |
| 3 (4) | $R_x$ | −13.710 | 0.000 | n = 1.48727 | ν = 70.4 |
|  | $R_x$ | −35.716 |  | Y: −29.254 | A: 51.817° |
|  | $K_y$ | −1.815291 |  | Z: 5.283 |  |
|  | $K_x$ | −2.465664 |  |  |  |
|  | AR | $-0.317435 \times 10^{-5}$ |  |  |  |
|  | BR | $0.762415 \times 10^{-14}$ |  |  |  |
|  | AP | −1.92706 |  |  |  |
|  | BP | $0.326050 \times 10^{+2}$ |  |  |  |
| 4 |  | −25.618 | 0.000 | Y: −53.360 | A: 28.030° |
|  | K | −48.338 |  | Z: 9.244 |  |
|  | $K_y$ | −0.277791 |  |  |  |
|  | $K_x$ | 9.212224 |  |  |  |
|  | AR | $-0.189344 \times 10^{-4}$ |  |  |  |
|  | BR | $-0.269312 \times 10^{-8}$ |  |  |  |
|  | AP | −0.249264 |  |  |  |
|  | BP | 1.118061 |  |  |  |
| 5 ($r_1$) |  | −88.343 | (d) −13.657 | $n_1$ = 1.65283 | $\nu_1$ = 54.6 |
|  |  |  |  | Y: −63.000 | A: 27.694° |
|  |  |  |  | Z: −11.353 |  |

Amount of Diopter Correction

|  | 0 D | −3 D | −6 D | +2 D |
|---|---|---|---|---|
| Y: | −63.000 | −61.983 | −60.790 | −63.790 |
| Z: | −11.353 | −9.207 | −7.127 | −12.508 |

| 6 ($r_2$) | 44.464 | ($d_2$) −6.464 |  |  |
|---|---|---|---|---|
| 7 ($r_3$) | −42.982 | ($d_3$) −13.850 | $n_2$ = 1.60668 | $\nu_2$ = 61.0 |
| 8 ($r_4$) | 14.998 | ($d_4$) −1.659 | n = 1.75500 | $\nu_3$ = 27.6 |
| 9 ($r_5$) | 80.629 | ($d_5$) −1.906 |  |  |
| 10 ($r_6$) | −55.103 | ($d_6$) −7.029 | $n_4$ = 1.52606 | $\nu_4$ = 66.5 |
| 11 ($r_7$) | 49.694 | ($d_7$) −0.500 |  |  |
| 12 ($r_8$) | −25.903 | ($d_8$) −8.681 | $n_5$ 1.65437 | $\nu_5$ = 54.3 |
| 13 ($r_9$) | 465.261 | ($d_9$) −8.482 |  |  |
| 14 (6) | ∞(image) |  | Y: −3.757 | A: 19.959° |

(1) $|R_{ym}/E_{xp}| = 1.39$
(2) $\theta_1 = 11.82°$
(3) $R_{y1}/R_{y2} = 0.54$

Example 10

| Surface No. |  | Radius of curvature | Surface separation | Refractive index (Eccentricity) | Abbe's No. (Inclination angle) |
|---|---|---|---|---|---|
| 1 (1) |  | ∞(pupil) | 53.100 |  |  |
| 2 (3) | $R_y$ | −73.606 | 0.000 | Y: −31.260 | A: 0.000° |
|  | $R_x$ | −57.661 |  | Z: 0.000 |  |
|  | $K_y$ | 0.015884 |  |  |  |
|  | $K_x$ | 0.170305 |  |  |  |
|  | AR | $0.209773 \times 10^{-6}$ |  |  |  |
|  | BR | $-0.123045 \times 10^{-10}$ |  |  |  |
|  | AP | −0.712283 |  |  |  |
|  | BP | −1.87849 |  |  |  |
| 3 (4) | $R_y$ | −13.519 | 0.000 | n = 1.499128 | ν = 66.9 |
|  | $R_x$ | −32.574 |  | Y: −28.940 | A: 52.275° |
|  | $K_y$ | −1.762494 |  | Z: 5.282 |  |
|  | $K_x$ | −1.699031 |  |  |  |
|  | AR | $-0.339816 \times 10^{-5}$ |  |  |  |
|  | BR | $0.350594 \times 10^{-13}$ |  |  |  |
|  | AP | −1.92936 |  |  |  |
|  | BP | $0.187523 \times 10^{+2}$ |  |  |  |
| 4 | $R_y$ | −24.789 | 0.000 | Y: −53.723 | A: 27.023° |
|  | $R_x$ | −48.321 |  | Z: 9.562 |  |
|  | $K_y$ | −0.416644 |  |  |  |
|  | $K_x$ | 9.042948 |  |  |  |
|  | AR | $-0.167185 \times 10^{-4}$ |  |  |  |
|  | BR | $-0.223181 \times 10^{-8}$ |  |  |  |
|  | AP | −0.350362 |  |  |  |
|  | BP | 1.21427 |  |  |  |
| 5 ($r_1$) |  | −77.812 | ($d_1$) −13.018 | $n_1$ = 1.65830 | $\nu_1$ = 53.4 |
|  |  |  |  | Y: −62.540 | A: 28.249° |
|  |  |  |  | Z: −11.013 |  |
| 6 ($r_2$) | 46.896 | ($d_2$) −7.184 |  |  |

Amount of Diopter Correction

|  | 0 D | −3 D | −6 D | +2 D |
|---|---|---|---|---|
| $d_2$: | −7.184 | −7.585 | −7.990 | −6.906 |

| 7 ($r_3$) | −43.477 | ($d_3$) −13.915 | $n_2$ = 1.60691 | $\nu_2$ = 61.0 |
|---|---|---|---|---|
| 8 ($r_4$) | 14.861 | ($d_4$) −1.711 | $n_3$ = 1.75500 | $\nu_3$ = 27.6 |
| 9 ($r_5$) | 78.040 | ($d_5$) −1.714 |  |  |
| 10 ($r_6$) | −57.351 | ($d_6$) −6.712 | $n_4$ = 1.52154 | $\nu_4$ = 66.5 |

-continued

| | | | | |
|---|---|---|---|---|
| 11 ($r_7$) | 48.030 | ($d_7$) −0.500 | | |
| 12 ($r_8$) | −26.135 | ($d_8$) −8.719 | $n_5$ = 1.64277 | $v_5$ = 56.1 |
| 13 ($r_9$) | 738.733 | ($d_9$) −8.719 | | |

Amount of Diopter Correction

| | 0 D | −3 D | −6 D | +2 D |
|---|---|---|---|---|
| $d_0$: | −8.719 | −8.318 | −7.913 | −8.997 |
| 14 (6) | ∞(image) | | Y: −3.484 | A: 19.864° |

(1) $|R_{ym}/E_{xp}|$ = 1.39
(2) $\theta_1$ = 12.28°
(3) $R_{y1}/R_{y2}$ = 0.55

Example 11

| Surface No. | Radius of curvature | Surface separation | Refractive index (Eccentricity) | Abbe's No. (Inclination angle) |
|---|---|---|---|---|
| 1 (1) | ∞(pupil) | 53.085 | | |
| 2 (3) | $R_y$ −73.924 | 0.000 | Y: −31.260 | A: 0.000° |
| | $R_x$ −56.952 | | Z: 0.000 | |
| | $K_y$ 0.058605 | | | |
| | $K_x$ 0.160130 | | | |
| | AR 0.182638 × $10^{-6}$ | | | |
| | BR −0.104505 × $10^{-10}$ | | | |
| | AP −0.746331 | | | |
| | BP −2.00536 | | | |
| 3 (4) | $R_y$ −13.612 | 0.000 | n = 1.50290 | $v$ = 68.7 |
| | $R_x$ −45.101 | | Y: −31.408 | A: 53.699° |
| | $K_y$ −1.724643 | | Z: 5.778 | |
| | $K_x$ −1.72200 | | | |
| | AR −0.342277 × $10^{-5}$ | | | |
| | BR −0.137301 × $10^{-13}$ | | | |
| | AP −1.98932 | | | |
| | BP −0.301739 × $10^{+2}$ | | | |
| 4 | $R_y$ −25.089 | 0.000 | Y: −54.154 | A: 29.313° |
| | $R_x$ −46.811 | | Z: 8.646 | |
| | $K_y$ −0.530464 | | | |
| | $K_x$ 9.488797 | | | |
| | AR −0.171237 × $10^{-4}$ | | | |
| | BR −0.258917 × $10^{-8}$ | | | |
| | AP −0.347729 | | | |
| | BP 1.27900 | | | |
| 5 ($r_1$) | −88.462 | ($d_1$) −14.712 | $n_4$ = 1.65830 | $v_1$ = 53.4 |
| | | | Y: −62.952 | A: 28.218° |
| | | | Z: −11.834 | |
| 6 ($r_2$) | 43.684 | ($d_2$) −5.446 | | |

Amount of Diopter Correction

| | 0 D | −3 D | −6 D | +2 D |
|---|---|---|---|---|
| $d_2$: | −5.446 | −7.123 | −8.516 | −4.296 |

| 7 ($r_3$) | −44.951 | ($d_3$) −12.595 | $n_2$ = 1.60994 | $v_2$ = 60.8 |
|---|---|---|---|---|
| 8 ($r_4$) | 14.874 | ($d_4$) −2.376 | $n_3$ = 1.75327 | $v_3$ = 27.7 |
| 9 ($r_5$) | 51.059 | ($d_5$) −3.170 | | |

Amount of Diopter Correction

| | 0 D | −3 D | −6 D | +2 D |
|---|---|---|---|---|
| $d_5$: | −3.170 | −1.493 | −0.100 | −4.320 |

| 10 ($r_6$) | −61.976 | ($d_6$) −5.987 | $n_4$ = 1.50649 | $v_4$ = 68.3 |
|---|---|---|---|---|
| 11 ($r_7$) | 94.648 | ($d_7$) −0.500 | | |
| 12 ($r_8$) | −24.786 | ($d_8$) −8.420 | $n_5$ = 1.62119 | $v_5$ = 60.1 |
| 13 ($r_9$) | 163.122 | ($d_9$) −8.337 | | |
| 14 (6) | ∞(image) | | Y: −3.568 | A: 17.761° |

(1) $|R_{ym}/E_{xp}|$ = 1.39
(2) $\theta_1$ = 13.70°
(3) $R_{y1}/R_{y2}$ = 0.54

Example 12

| Surface No. | Radius of curvature | Surface separation | Refractive index (Eccentricity) | Abbe's No. (Inclination angle) |
|---|---|---|---|---|
| 1 (1) | ∞(pupil) | 53.065 | | |
| 2 (3) | $R_y$ −74.342 | 0.000 | Y: −31.260 | A: 0.000° |
| | $R_x$ −56.047 | | Z: 0.000 | |
| | $K_y$ 0.109508 | | | |
| | $K_x$ 0.074377 | | | |
| | AR 0.152766 × $10^{-6}$ | | | |
| | BR −0.816826 × $10^{-11}$ | | | |
| | AP −0.768729 | | | |
| | BP −2.05126 | | | |
| 3 (4) | $R_y$ −13.925 | 0.000 | n = 1.48790 | $v$ = 70.4 |
| | $R_x$ −50.846 | | Y: −30.694 | A: 58.108° |
| | $K_y$ −1.847003 | | Z: 6.291 | |
| | $K_x$ 1.515165 | | | |
| | AR −0.314470 × $10^{-5}$ | | | |
| | BR 0.124164 × $10^{10}$ | | | |
| | AP −1.99405 | | | |
| | BP 1.19458 | | | |
| 4 | $R_y$ −26.418 | 0.000 | Y: −58.926 | A: 30.697° |
| | $R_x$ −47.419 | | Z: 9.510 | |
| | $K_y$ −0.123396 | | | |
| | $K_x$ 9.710738 | | | |
| | AR −0.183304 × $10^{-4}$ | | | |
| | BR −0.381076 × $10^{-8}$ | | | |
| | AP −0.254281 | | | |
| | BP 1.24106 | | | |
| 5 ($r_1$) | −101.150 | ($d_1$) −15.559 | $n_1$ = 1.65830 | $v_1$ = 53.4 |
| | | | Y: 63.452 | A: 25.215° |
| | | | Z: −9.946 | |
| 6 ($r_2$) | 41.905 | ($d_2$) −5.749 | | |
| 7 ($r_3$) | −41.227 | ($d_3$) −12.741 | $n_2$ = 1.60849 | $v_2$ = 60.9 |
| 8 ($r_4$) | 15.255 | ($d_4$) −1.000 | $n_3$ = 1.75500 | $v_3$ = 27.6 |
| 9 ($r_5$) | 92.419 | ($d_5$) −2.122 | | |
| 10 ($r_6$) | 44.796 | ($d_6$) −7.472 | $n_4$ = 1.53638 | $v_4$ = 65.7 |
| 11 ($r_7$) | 58.162 | ($d_7$) −0.500 | | |
| 12 ($r_8$) | −25.005 | ($d_8$) −8.807 | $n_5$ = 1.66520 | $v_5$ = 52.8 |
| 13 ($r_9$) | 3628.295 | ($d_9$) −7.748 | | |

Amount of Diopter Correction

| | 0 D | −3 D | −6 D | +2 D |
|---|---|---|---|---|
| $d_0$: | −7.748 | −8.409 | −8.195 | −8.745 |
| 14 (6) | ∞(image) | | Y: −4.891 | A: 20.999° |

Amount of Diopter Correction

| | 0 D | −3 D | −6 D | +2 D |
|---|---|---|---|---|
| Y: | −4.891 | −2.109 | −1.580 | −2.947 |
| A: | 20.999° | 19.946° | 18.887° | 21.673° |

(1) $|R_{ym}/E_{xp}|$ = 1.40
(2) $\theta_1$ = 13.11°
(3) $R_{y1}/R_{y2}$ = 0.53

Among the above-described Examples 4 to 12, Examples 8 and 12, in which diopter correction is effected by eccentrically moving a diopter correcting element, provide particularly favorable correcting effect. Examples 5, 6, 8, 10 and 11, in which diopter correction is effected without changing the pupil position 1 and the position of the two-dimensional image display device 6, enable the movable portion to be reduced in size. Further, since there is no change in the overall size of the apparatus, the apparatus can be made even more compact.

Figure 35:
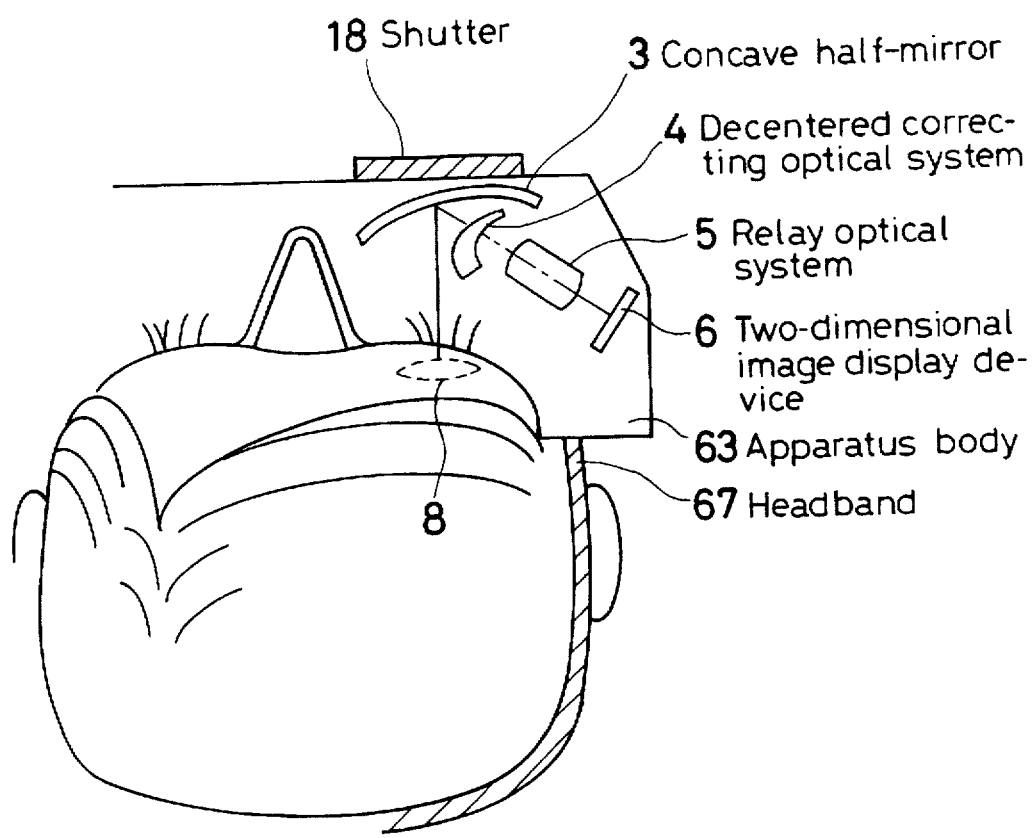
FIG. 35 is a sectional view of one head-mounted visual display apparatus that employs the visual display apparatus of the present invention.

Incidentally, the visual display apparatus having the above-described optical arrangement may be formed as a seethrough type head-mounted visual display apparatus. FIG. 35 shows one example of the optical arrangement of such a visual display apparatus. The display apparatus (HMD) 63 is composed of a concave half-mirror 3 disposed in front of each of the left and right eyeballs 8 (in FIG. 35, the eyeball and the optical system are illustrated for the right eye only), a shutter 18, e.g., a liquid crystal optical element, which is disposed in front of the HMD 63, a two-dimensional image display device 6 such as a liquid crystal display device, and a relay optical system 5 for leading an image of the two-dimensional image display device 6 to the concave half-mirror 3, together with a decentered correcting optical system 4. An image (electronic image) displayed on the two-dimensional image display device 6 is led to the concave half-mirror 3 through the relay optical system 5 and the decentered correcting optical system 4. The concave half-mirror 3 forms the displayed image as an aerial enlarged image and leads it to the eyeball 8. When the shutter 18 is open, a scene or other image in the outside world passes through the concave half-mirror 3 and is combined with the image displayed on the two-dimensional image display device 6 for observation. Alternatively, the outside world image alone is observed with the display of the electronic image turned off.

Figure 36:
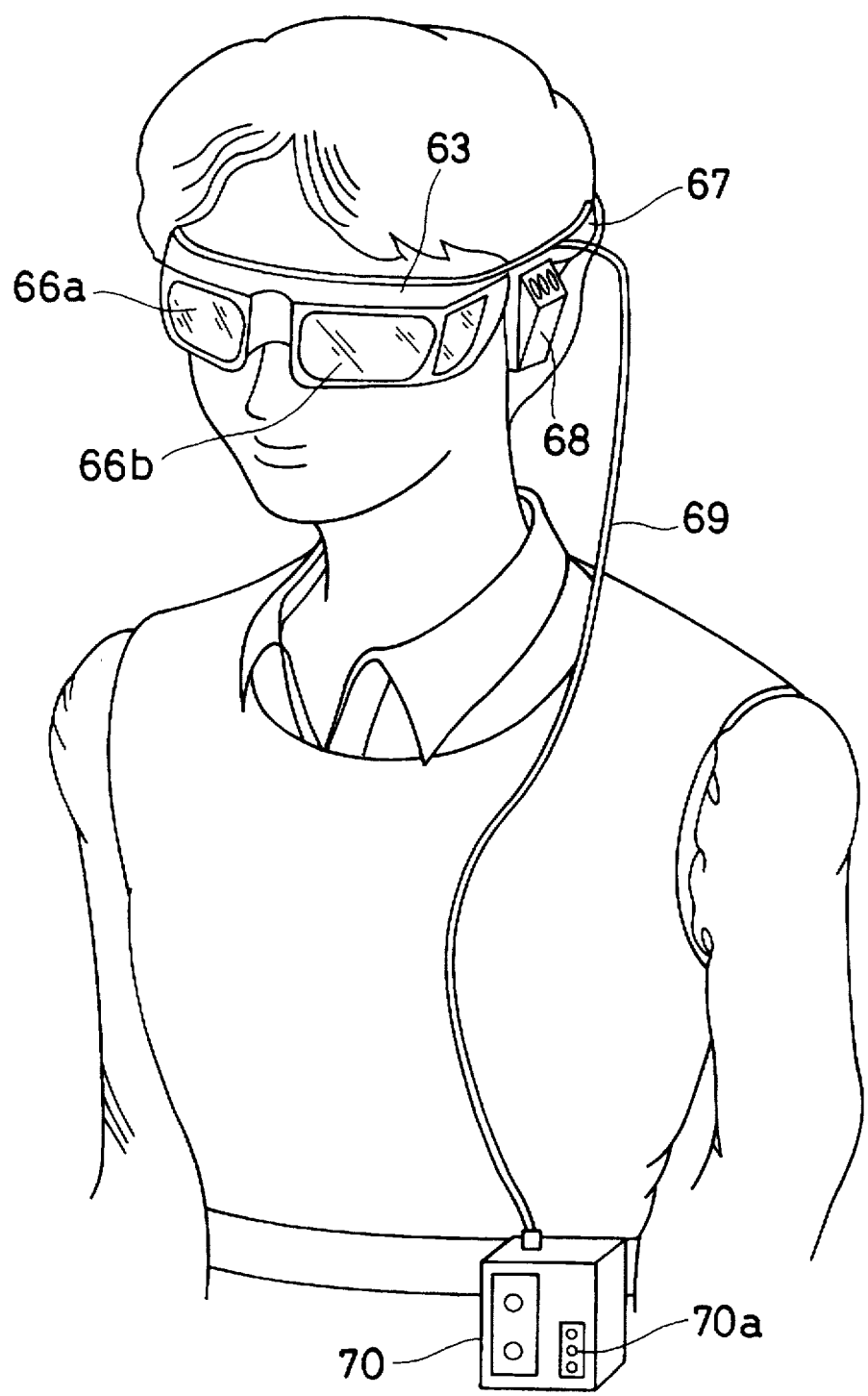
FIG. 36 shows one example of the mode of using the head-mounted visual display apparatus arranged as shown in FIG. 35.

Examples of the mode of using the HMD 63 will be shown below. FIG. 36 shows one example of the mode of using the HMD 63 arranged as shown in FIG. 35. The HMD 63 has a band 67 attached thereto so that the HMD 63 can be fitted to the observer's head through the band 67. It should be noted that the band 67 as a support member may be arranged such that the condition in which the HMD 63 is fastened to the observer's head can be adjusted by using a screw or other similar member. Alternatively, the support member may be arranged such that a rigid head contact member is adjustably pressed on the observer's head by the pressure of a spring or the like. It is also possible to fasten the HMD 63 to the observer's head by using a rubber band. Any of these arrangements may be selected appropriately.

In addition, a headphone 68 is attached to the band 67 to enable the user to enjoy listening to stereophonic sound in addition to image observation. The HMD 63 having the headphone 38 is connected with a reproducing unit 70, e.g., a portable video cassette unit, through an image and sound transmitting cord 69. Therefore, the user can enjoy not only observing an image but also listening to sound with the reproducing unit 70 retained on a desired position, e.g., a belt, as illustrated in the figure. It should be noted that reference numeral 70a denotes a switch and volume control part of the reproducing unit 70. Reference numerals 66a and 66b denote image display units for the observer's right and left eyes.

Figure 37:
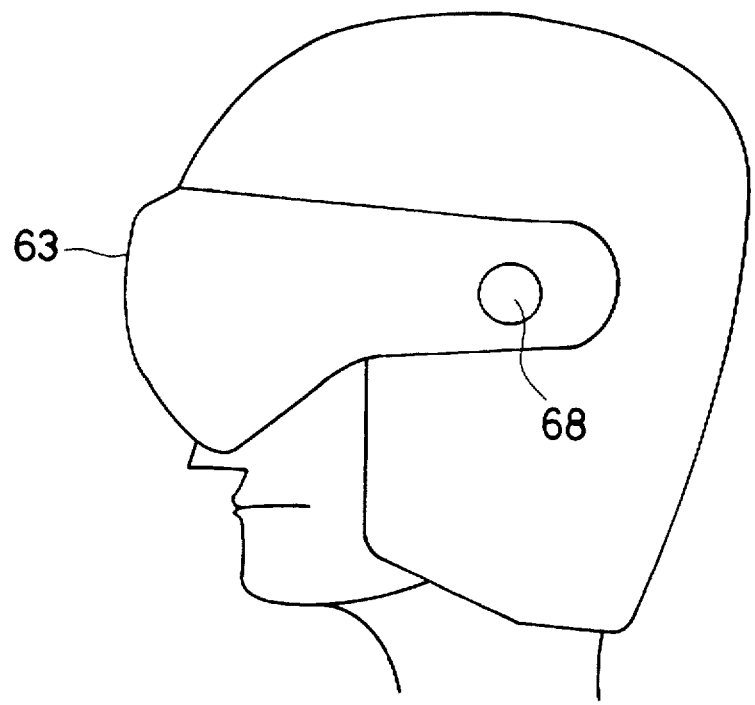
FIG. 37 shows another example of the mode of using the head-mounted visual display apparatus arranged as shown in FIG. 35.
Figure 38A:
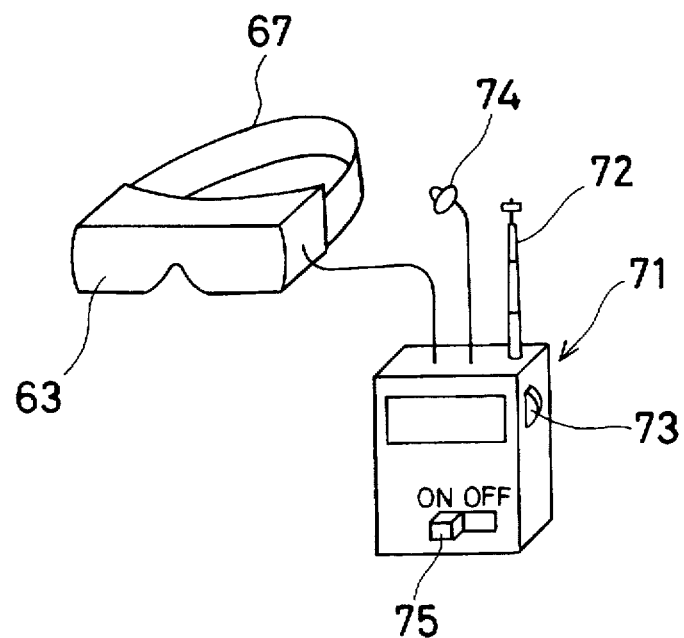
FIGS. 38(a) and 38(b) show other examples of the mode of using the head-mounted visual display apparatus arranged as shown in FIG. 35.
Figure 38B:
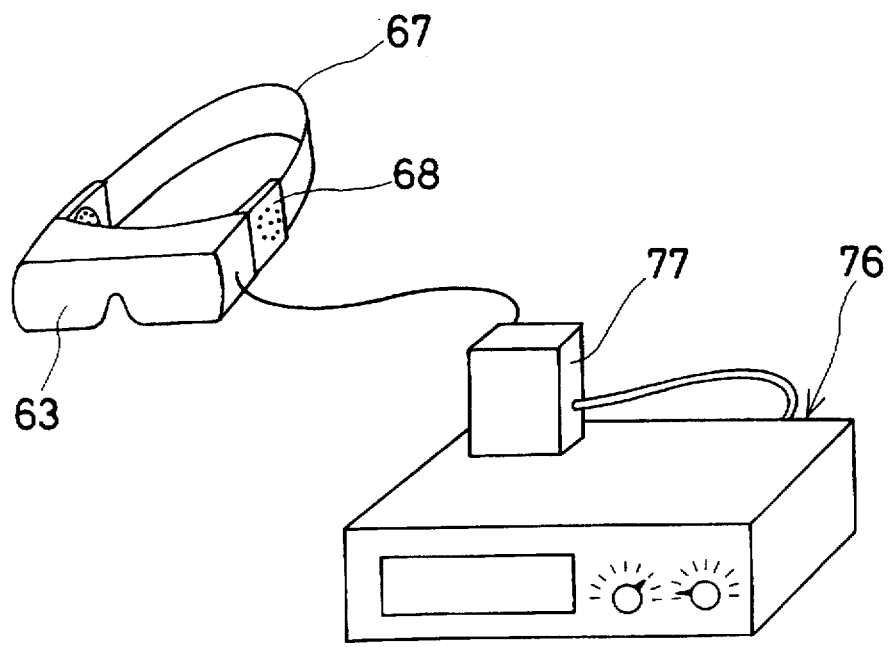
Figure 39:
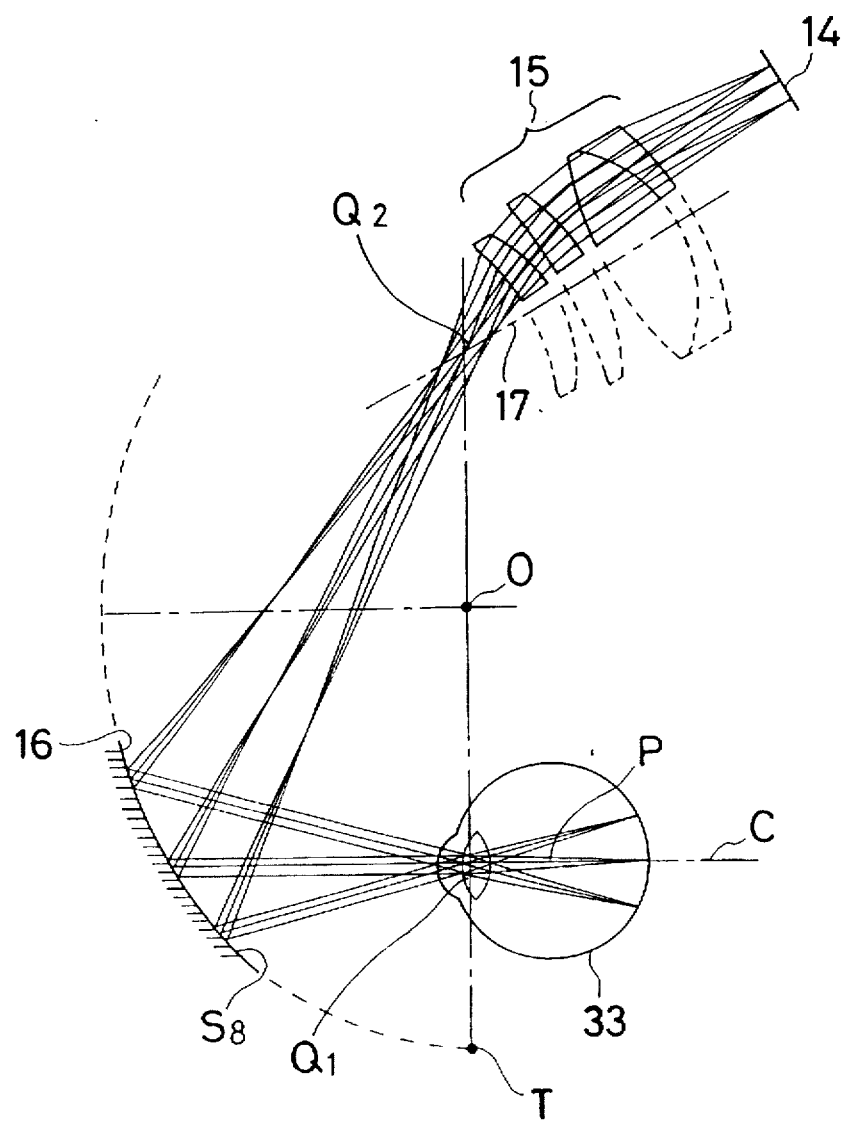
FIG. 39 shows the arrangement of one head-mounted visual display apparatus proposed by the present applicant.
Figure 40:
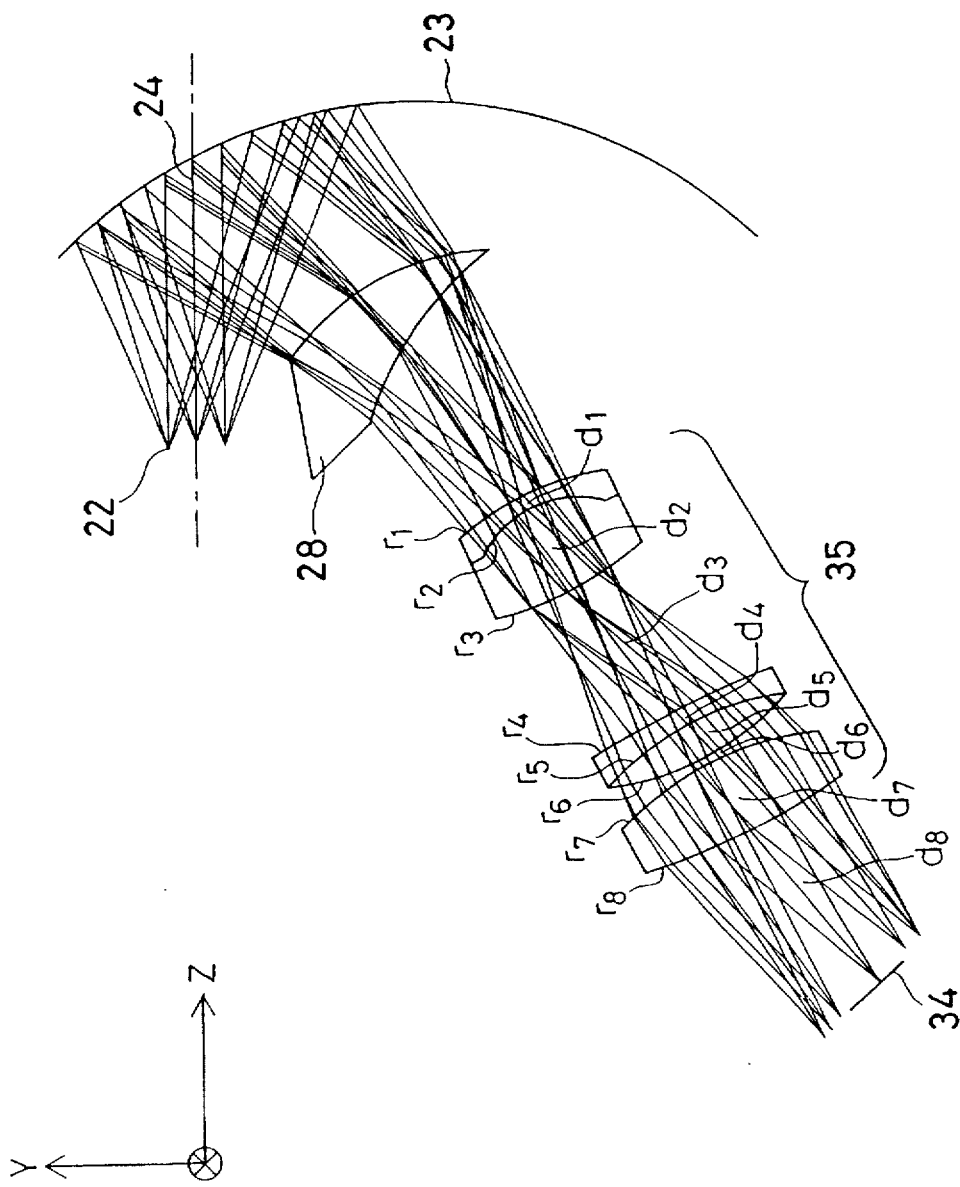
FIG. 40 shows the arrangement of another head-mounted visual display apparatus proposed by the present applicant.

FIGS. 37, 38(a) and 38(b) show other examples of the mode of using the HMD 63. In FIG. 37, the HMD 63 incorporating the visual display apparatus of the present invention is arranged in the form of a helmet-type visual display apparatus. Reference numeral 68 denotes a headphone. Although not shown, a reproducing unit (70) such as that shown in FIG. 36 is connected to the HMD 63 through an image and sound transmitting cord 69, as a matter of course.

FIGS. 38(a) and 38(b) show examples of the mode of using the HMD 63 in combination with a TV tuner or a video deck. FIG. 38(a) shows a combination of the HMD 63 and a TV tuner 71, in which reference numeral 72 denotes a TV signal receiving antenna, 73 a TV channel selecting knob, 74 an earphone, and 75 an ON/OFF switch.

FIG. 38(b) shows a combination of the HMD 63 and a video deck 76, in which reference numeral 77 denotes an image processing device.

Although the visual display apparatus of the present invention has been described above by way of some examples, it should be noted that the present invention is not necessarily limited to these examples, and that various changes and modifications may be imparted thereto.

As will be clear from the foregoing description, according to the first aspect of the present invention, it is possible to provide a compact and lightweight visual display apparatus which enables observation of an image that is clear throughout the image field at a field angle of 120° when the user observes with both eyes, and which has a large exit pupil diameter.

According to the second aspect of the present invention, it is possible to provide a visual display apparatus which provides a wide field angle and high resolution and which enables diopter correction to be realized simply by moving at least one of the optical elements of the optical system of the apparatus, which is a relatively complicated optical system.

What we claim is:

1. A visual display apparatus comprising a two-dimensional image display device for displaying an image for observation, a relay optical system for projecting a real image of said two-dimensional image display device in the air, an ocular magnifier for projecting said real image in the air as an enlarged image and for reflectively bending an optical axis, and a decentered correcting optical system disposed between said relay optical system and said ocular magnifier and having surfaces decentered with respect to each other, wherein said decentered correcting optical system is arranged such that a vertex of the surface thereof which is closer to said ocular magnifier lies inward of a visual axis after it has been reflected by said ocular magnifier, and an ocular magnifier-side surface is an aspherical surface which is formed from such a curved surface that refractive power reaches a maximum in the vicinity of the surface vertex and becomes weaker as the distance from the surface vertex increases toward the outer side.

2. A visual display apparatus according to claim 1, which satisfies the following condition:

$$1.3 < |R_{ym}/E_{xp}| < 2.6 \quad (1)$$

where $R_{ym}$ is the radius of curvature in a horizontal cross-section of said ocular magnifier containing the observer's visual axis when he or she looks straight forward, and $E_{xp}$ is the distance from the exit pupil position of said visual display apparatus to the center of said ocular magnifier in the direction of the observer's visual axis when he or she looks straight forward.

3. A visual display apparatus according to claim 1, which satisfies the following condition:

$$-10° < \theta_i < 30° \quad (2)$$

where $\theta_i$ is the angle of inclination of said ocular magnifier-side surface of said decentered correcting optical system with respect to the visual axis after it has been reflected by said ocular magnifier.

4. A visual display apparatus according to claim 1, wherein said decentered correcting optical system is relatively thick in wall thickness in the vicinity of the vertex of said ocular magnifier-side surface and relatively thin at the outer side thereof.

5. A visual display apparatus according to claim 1, wherein all lenses constituting said relay optical system are coaxial with respect to each other.

6. A visual display apparatus according to claim 1, wherein said two-dimensional image display device is tilted with respect to a center axis of said relay optical system.

7. A visual display apparatus according to claim 1, which satisfies the following condition:

$$0.4 < R_{y1}/R_{y2} < 1.2 \quad (3)$$

where $R_{y1}$ is the radius of curvature in a YZ-plane of said ocular magnifier-side surface of said decentered correcting optical system, and $R_{y2}$ is the radius of curvature in the YZ-plane of the relay optical system-side surface of said decentered correcting optical system.

8. A visual display apparatus according to claim 1, wherein either said ocular magnifier or said decentered correcting optical system has an anamorphic surface.

9. A visual display apparatus according to claim 1, wherein either said ocular magnifier or said decentered correcting optical system has an aspherical surface.

10. A visual display apparatus comprising:

a two-dimensional image display device for displaying an image for observation;

a relay optical system for projecting a real image of said two-dimensional image display device in the air;

an ocular magnifier for projecting said real image in the air as an enlarged image and for reflectively bending an optical axis; and a decentered correcting optical system disposed between said relay optical system and said ocular magnifier and having surfaces decentered with respect to each other, wherein at least one lens constituting said relay optical system moves in a space reserved between said two-dimensional image display device and said ocular magnifier to correct diopter, and wherein even if at least one lens constituting said relay optical system is moved, there is no change in the distance from the observer's pupil to said two-dimensional image display device.

11. A visual display apparatus comprising:

a two-dimensional image display device for displaying an image for observation;

a relay optical system for projecting a real image of said two-dimensional image display device in the air;

an ocular magnifier for projecting said real image in the air as an enlarged image and for reflectively bending an optical axis; and a decentered correcting optical system disposed between said relay optical system and said ocular magnifier and having surfaces decentered with respect to each other, wherein said decentered correcting optical system moves in a space reserved between said two-dimensional image display device and said ocular magnifier to correct diopter, and wherein even if said decentered correcting optical system is moved, there is no change in the distance from the observer's pupil to said two-dimensional image display device.

12. A visual display apparatus comprising:

a two-dimensional image display device for displaying an image for observation;

a relay optical system for projecting a real image of said two-dimensional image display device in the air;

an ocular magnifier for projecting said real image in the air as an enlarged image and for reflectively bending an optical axis; and a decentered correcting optical system disposed between said relay optical system and said ocular magnifier and having surfaces decentered with respect to each other, wherein said ocular magnifier is moved to correct diopter, and wherein even if said ocular magnifier is moved, there is no change in the distance from the observer's pupil to said two-dimensional image display device.

13. A visual display apparatus according to any one of claims 1 to 12, which is accommodated in a body of an image display apparatus and has a support member whereby said image display apparatus body can be fitted on the observer's face.

14. A visual display apparatus according to claim 13, wherein said image display apparatus body is further provided with means for transmitting sound to the observer.

15. A visual display apparatus according to claim 14, wherein said image display apparatus body further has a reproducing device for transmitting image and sound signals to said two-dimensional image display device and said sound transmitting means, respectively.

16. A visual display apparatus according to claim 10, 11, or 12, which is accommodated in a body of an image display apparatus and has a support member whereby said image display apparatus body can be fitted on the observer's face.

17. A visual display apparatus according to claim 10, 11 or 12, wherein said at least one lens constituting said relay optical system, or said decentered correcting optical system or said ocular magnifier moves with an eccentricity from the optical axis.

18. A visual display apparatus according to claim 17, which is accommodated in a body of an image display apparatus and has a support member whereby said image display apparatus body can be fitted on the observer's face.

* * * * *